United States Patent
Bartlett et al.

(10) Patent No.: US 12,422,010 B1
(45) Date of Patent: Sep. 23, 2025

(54) MAGNETORHEOLOGICAL ELASTOMER (MRE) APPARATUSES, METHODS, AND SYSTEMS, INCLUDING BUSHINGS FOR VIBRATIONAL DAMPING OR ISOLATION

(71) Applicants: Iowa State University Research Foundation, Inc., Ames, IA (US); LINK MFG., LTD., Sioux Center, IA (US)

(72) Inventors: Michael D. Bartlett, Blacksburg, VA (US); David C. Jiles, Ames, IA (US); Edward J. Barron, Blacksburg, VA (US); Winnie M. Kiarie, Ames, IA (US); William E. Ott, Sioux Center, IA (US); Tye B. Davis, Sioux Center, IA (US)

(73) Assignees: Iowa State University Research Foundation, Inc., Ames, IA (US); Link Mfg., Ltd., Sioux Center, IA (US)

( * ) Notice: Subject to any disclaimer, the term of this patent is extended or adjusted under 35 U.S.C. 154(b) by 994 days.

(21) Appl. No.: 17/453,608

(22) Filed: Nov. 4, 2021

Related U.S. Application Data

(60) Provisional application No. 63/198,689, filed on Nov. 4, 2020.

(51) Int. Cl.
*F16F 1/36* (2006.01)
*F16F 1/373* (2006.01)
(Continued)

(52) U.S. Cl.
CPC .......... *F16F 1/3615* (2013.01); *F16F 1/3732* (2013.01); *F16F 15/002* (2013.01);
(Continued)

(58) Field of Classification Search
CPC .. F16F 1/3615; F16F 1/361; F16F 1/38; F16F 1/387; F16F 1/3732; F16F 15/002;
(Continued)

(56) References Cited

U.S. PATENT DOCUMENTS

| 1,713,515 A | 5/1929 | Bechereau |
| 2,099,807 A | 11/1937 | Gregory |

(Continued)

FOREIGN PATENT DOCUMENTS

| CN | 105799438 A | 7/2016 |
| DE | 102010052151 A1 | 5/2012 |

(Continued)

OTHER PUBLICATIONS

Yu et al., "Thermal effects on the laminated magnetorheological elastomer isolator", Smart Mater. Struct., vol. 25, 115039, pp. 1-13, 2016.
(Continued)

*Primary Examiner* — Thomas W Irvin
(74) *Attorney, Agent, or Firm* — McKee, Voorhees & Sease, PLC

(57) ABSTRACT

An isolator designed through the inclusion of a magnetorheological elastomer (MRE) along and at or near an electromagnetic coil. A variety of factors can be balanced to produce an isolator that takes advantage of the radially axial coil. One non-limiting embodiment of the design uses a two-part coil bobbin geometry; wherein the axial center of the bobbin is a nonmagnetic material which allows passage of the magnetic field, while the end pieces are made of a high permeability material that limits the stray magnetic field and improves the magnetic flux density through the MRE by providing a pathway of least magnetic reluctance. The MRE changes stiffness and damping properties in response to the strength of the magnetic field, which can be controlled by
(Continued)

changing the current through the electromagnetic coil. Feedback and feedforward control systems can allow for real time adaptation by the isolator in response to changing external stimuli. The isolator is useful for a variety of uses. Non-limiting examples are for reducing whole body vibrations for operators of trucks and heavy machinery, as well as for creating greater comfort for patients in ambulance gurneys and passengers in airplane seats.

20 Claims, 58 Drawing Sheets
(29 of 58 Drawing Sheet(s) Filed in Color)

(51) Int. Cl.
F16F 15/00 (2006.01)
F16F 15/08 (2006.01)
H01F 1/44 (2006.01)
B60G 17/015 (2006.01)
B60G 17/02 (2006.01)

(52) U.S. Cl.
CPC .............. F16F 15/08 (2013.01); H01F 1/447 (2013.01); B60G 17/0157 (2013.01); B60G 17/02 (2013.01); B60G 2204/41 (2013.01); B60G 2204/62 (2013.01); B60G 2206/73 (2013.01); B60G 2500/22 (2013.01); B60G 2600/182 (2013.01); B60G 2600/73 (2013.01); B60G 2800/162 (2013.01); B60G 2800/916 (2013.01); F16F 2222/06 (2013.01); F16F 2224/025 (2013.01); F16F 2228/066 (2013.01); F16F 2230/18 (2013.01); F16F 2234/02 (2013.01)

(58) Field of Classification Search
CPC .. F16F 15/08; F16F 2222/06; F16F 2224/025; F16F 2228/066; F16F 2230/18; F16F 2234/02; B60G 17/0157; B60G 17/02; B60G 2204/41; B60G 2204/62; B60G 2206/73; B60G 2500/22; B60G 2600/182; B60G 2600/73; B60G 2800/162; B60G 2800/916; H01F 1/447
USPC ............................................. 267/141, 140.15
See application file for complete search history.

(56) References Cited

U.S. PATENT DOCUMENTS

| | | | |
|---|---|---|---|
| 2,421,822 A | 6/1947 | Wood | |
| 2,427,427 A | 9/1947 | Tykeson | |
| 2,574,420 A | 11/1951 | Seddon | |
| 2,639,141 A | 5/1953 | Gabriel | |
| 2,705,634 A | 4/1955 | Sampson et al. | |
| 3,053,526 A | 9/1962 | Kendall | |
| 3,129,973 A | 4/1964 | Maruhn | |
| 3,393,005 A | 7/1968 | Herrmann et al. | |
| 3,508,784 A | 4/1970 | Small | |
| 3,847,492 A | 11/1974 | Kennicutt et al. | |
| 3,895,818 A | 7/1975 | Fearon | |
| 3,904,226 A | 9/1975 | Smalley | |
| 3,948,341 A | 4/1976 | Foster | |
| 4,382,604 A | 5/1983 | Nakagawa | |
| 4,390,187 A | 6/1983 | Maeda | |
| 4,438,970 A | 3/1984 | Boucher | |
| 4,862,983 A | 9/1989 | Kreft | |
| 4,871,189 A | 10/1989 | Van Breemen | |
| 4,934,667 A | 6/1990 | Pees et al. | |
| 5,060,919 A | 10/1991 | Takano et al. | |
| 5,189,621 A | 2/1993 | Onari et al. | |
| 5,273,308 A | 12/1993 | Griffiths | |
| 5,335,695 A | 8/1994 | Pierce | |
| 5,344,189 A | 9/1994 | Tanaka et al. | |
| 5,375,823 A | 12/1994 | Navas | |
| 5,390,121 A | 2/1995 | Wolfe | |
| 5,403,031 A | 4/1995 | Gottschalk et al. | |
| 5,433,423 A | 7/1995 | Whightsil | |
| 5,448,976 A | 9/1995 | Treinies et al. | |
| 5,452,919 A | 9/1995 | Hoyle et al. | |
| 5,466,007 A | 11/1995 | Smith | |
| 5,553,911 A | 9/1996 | Bodin et al. | |
| 5,759,133 A | 6/1998 | Treinies et al. | |
| 5,779,009 A | 7/1998 | Iwasaki | |
| 5,785,345 A | 7/1998 | Barlas et al. | |
| 5,814,999 A * | 9/1998 | Elie | B60G 17/019 |
| | | | 324/699 |
| 5,816,587 A * | 10/1998 | Stewart | F16F 1/361 |
| | | | 280/124.105 |
| 5,955,674 A | 9/1999 | Mcgovern et al. | |
| 5,967,597 A | 10/1999 | Vander Kooi et al. | |
| 5,994,859 A | 11/1999 | Deng et al. | |
| 6,070,681 A | 6/2000 | Catanzarite et al. | |
| 6,072,297 A | 6/2000 | Xu et al. | |
| 6,073,714 A | 6/2000 | Mchorse et al. | |
| 6,109,381 A | 8/2000 | Stuyvenberg et al. | |
| 6,128,959 A | 10/2000 | Mcgovern et al. | |
| 6,138,629 A | 10/2000 | Masberg et al. | |
| 6,168,229 B1 | 1/2001 | Vander Kooi et al. | |
| 6,206,121 B1 | 3/2001 | Michel | |
| 6,311,993 B1 | 11/2001 | Hulstein et al. | |
| 6,363,613 B1 * | 4/2002 | Wolf | B60G 21/0551 |
| | | | 267/293 |
| 6,397,985 B2 | 6/2002 | Wiebe | |
| 6,431,557 B1 | 8/2002 | Terborn et al. | |
| 6,443,437 B1 | 9/2002 | Beyene et al. | |
| 6,471,198 B2 | 10/2002 | Herbst | |
| 6,502,837 B1 | 1/2003 | Hamilton et al. | |
| 6,540,038 B2 | 4/2003 | Taylor et al. | |
| 6,573,659 B2 | 6/2003 | Toma et al. | |
| 6,644,632 B1 | 11/2003 | Jaberg | |
| 6,732,033 B2 | 5/2004 | LaPlante et al. | |
| 6,758,294 B2 | 7/2004 | Peddycord et al. | |
| 6,832,143 B2 | 12/2004 | Trudeau et al. | |
| 6,834,873 B1 | 12/2004 | Vander Kooi et al. | |
| 6,845,989 B2 | 1/2005 | Fulton et al. | |
| 6,880,839 B2 | 4/2005 | Keeler et al. | |
| 6,904,344 B2 | 6/2005 | LaPlante et al. | |
| 7,066,474 B2 | 6/2006 | Hiebert et al. | |
| 7,070,157 B2 | 7/2006 | Huprikar et al. | |
| 7,086,507 B2 | 8/2006 | Hitchcock et al. | |
| 7,140,669 B2 | 11/2006 | Bollinger et al. | |
| 7,216,925 B1 | 5/2007 | Abele et al. | |
| 7,331,627 B2 | 2/2008 | Van Den Brink et al. | |
| 7,416,190 B2 | 8/2008 | Sandbulte et al. | |
| 7,503,586 B2 | 3/2009 | Ramsey | |
| 7,530,577 B2 | 5/2009 | Sandbulte et al. | |
| 7,735,516 B2 | 6/2010 | Morris | |
| 8,192,106 B2 | 6/2012 | Vogler et al. | |
| 8,302,988 B2 | 11/2012 | Noble | |
| 8,413,997 B1 | 4/2013 | Coombs et al. | |
| 8,473,157 B2 | 6/2013 | Savaresi et al. | |
| 9,139,061 B2 | 9/2015 | Delorenzis | |
| 9,157,529 B2 | 10/2015 | Westnedge et al. | |
| 9,283,993 B2 | 3/2016 | Rager et al. | |
| 9,290,221 B2 | 3/2016 | Conaway et al. | |
| 9,352,628 B2 | 5/2016 | Barton et al. | |
| 9,358,854 B1 | 6/2016 | Sandbulte et al. | |
| 9,481,416 B2 | 11/2016 | Conaway et al. | |
| 9,581,214 B2 | 2/2017 | Sun et al. | |
| 9,829,060 B2 | 11/2017 | Batsch et al. | |
| 9,835,218 B2 * | 12/2017 | Inoue | B60K 5/04 |
| 9,937,766 B1 | 4/2018 | Bobb et al. | |
| 10,543,730 B2 | 1/2020 | Davis et al. | |
| 10,569,813 B2 | 2/2020 | Davis et al. | |
| 10,569,814 B2 | 2/2020 | Hulstein et al. | |
| 10,570,978 B2 * | 2/2020 | Rumpel | F16F 1/387 |
| 10,630,158 B2 * | 4/2020 | Terashima | H02K 33/02 |
| 10,844,923 B2 * | 11/2020 | Inoue | F16F 1/361 |
| 11,021,049 B2 * | 6/2021 | Inoue | B29C 45/14491 |
| 11,338,865 B2 | 5/2022 | Davis et al. | |
| 2001/0007419 A1 | 7/2001 | Abo et al. | |

(56) References Cited

U.S. PATENT DOCUMENTS

| | | |
|---|---|---|
| 2003/0111810 A1 | 6/2003 | Fulton et al. |
| 2003/0151222 A1 | 8/2003 | Sutton et al. |
| 2003/0193149 A1 | 10/2003 | Russell et al. |
| 2005/0236792 A1 | 10/2005 | Hedenberg |
| 2008/0184623 A1 | 8/2008 | Heigl et al. |
| 2008/0185549 A1 | 8/2008 | Steinbuchel et al. |
| 2009/0085377 A1 | 4/2009 | Hayes et al. |
| 2009/0200718 A1 | 8/2009 | Roemer et al. |
| 2010/0283581 A1 | 11/2010 | Heigl et al. |
| 2011/0035104 A1 | 2/2011 | Smith |
| 2011/0266727 A1 | 11/2011 | Knevels |
| 2015/0137463 A1 | 5/2015 | McLennan et al. |
| 2015/0344083 A1 | 12/2015 | Safiejko |
| 2016/0333957 A1* | 11/2016 | Inoue ................... B60K 5/1208 |
| 2017/0225729 A1 | 8/2017 | Yakimishyn |
| 2019/0061847 A1 | 2/2019 | Barton et al. |
| 2019/0077468 A1 | 3/2019 | Hulstein et al. |
| 2019/0154098 A1* | 5/2019 | Inoue ....................... F16F 1/361 |
| 2019/0315219 A1* | 10/2019 | Inoue ................... B60K 5/1283 |
| 2020/0171910 A1* | 6/2020 | Kuroda .............. B60G 21/0551 |
| 2020/0255069 A1 | 8/2020 | Davis et al. |
| 2022/0242494 A1 | 8/2022 | Davis et al. |

FOREIGN PATENT DOCUMENTS

| | | |
|---|---|---|
| DE | 102011120428 A1 | 6/2012 |
| EP | 0867315 A2 | 9/1998 |
| WO | 2006071172 A1 | 7/2006 |
| WO | 2006093458 A1 | 9/2006 |
| WO | 2009144174 A1 | 12/2009 |
| WO | 2009150508 A1 | 12/2009 |

OTHER PUBLICATIONS

Machine Translation of CN105799438A, accessed on Oct. 16, 2021.
Elahinia, Mohammad, "Reducing Noise and Vibration of Hydraulic Hybrid And Plug-In Hybrid Electric Vehicles", Phase I Final Report, The University of Toledo University Transportation Center and the U.S. Department of Transportation, 32 pages, Feb. 2012.
Li et al., "A state-of-the-art review on magnetorheological elastomer devices", University of Wollongong, 38 pages, 2014.
Savaresi et al., "Semi-Active Suspension Control Design for Vehicles", Chapter 1, 42 pages, 2010.
Machine Translation of abstract of DE102010052151A1, accessed on May 17, 2022.
Machine Translation of abstract of DE102011120428A1, accessed on May 17, 2022.
Link Manufacturing Ltd., Air Control Kit (1350-1004), Installation Instructions Parts List; Jan. 14, 2016, 4 pages.
Elahinia, Mohammad, "Reducing Noise and Vibration of Hydraulic Hybrid and Plug-In Hybrid Electric Vehicles", Phase 1 Final Report, Prepared for the University of Toledo University Transportation Center and the U.S. Department of Transportation, 16 pages, Mar. 2009.

* cited by examiner

STEP 1: ATTACH COIL SPACERS TO NON-MAGNETIS INTERLAYER WITH SCREWS.

STEP 2: WIND COIL TO THICKNESS OF COIL SPACERS.

STEP 3: INSERT WOUND PART INTO BUSHING.

STEP 4: SCREW LOCKING LAYERS TO COIL SPACERS VIA INTER SCREWS HOLES.
SCREW LOCKING LAYERS INTO OUTER STEEL BUSHING VIA
THE OUTER SCREWS HOLES..

STEP 5: FILL INNER LAYER WITH MRE USING MOLD.

PICTURE OF THE V2 MAGNETORHEOLOGICAL ELASTOMER BUSHING.

Basic geometric design of bushing version 2

Variation of flux density at different positions along the MRE

*Magnetic flux density throughout the MRE with an applied current of 3 amps and 3500 coil turns.*

Magnetic flux density induced at different radial positions in the MRE

DEMONSTRATION OF IMPROVED MAGNETIC FLUX DENSITY OF V2 BUSHING COMPARED TO THAT OF A MRE LOCATED ON THE OUTSIDE OF THE COIL.

IMPROVED THERMAL MANAGEMENT OF THE V2 BUSHING WHEN COMPARED TO A BUSHING THAT HAD DIRECT CONTACT BETWEEN THE COIL AND MRE.

IMPROVED THERMAL MANAGEMENT OF THE V2 BUSHING WHEN COMPARED TO A BUSHING THAT HAD DIRECT CONTACT BETWEEN THE COIL AND MRE.

STORAGE MODULUS DEPENDENCE ON FREQUENCY AND TEMPERATURE FOR 30 SHORE MRE.

ADHESION DATA FOR ALUMINUM UNABRADED AND PHYSICALLY ABRADED SAMPLES.

ADHESION DATA FOR STAINLESS STEEL UNABRADED AND PHYSICALLY ABRADED SAMPLES.

SOLENOID EMBEDDED IN MRE AND PRODUCES RADIAL MAGNETIC FIELD ALONG AXIS

SOLENOID EMBEDDED IN MRE WITH THROUGH-BORE AND PRODUCES RADIAL MAGNETIC FIELD ALONG AXIS

SOLENOID RADIALLY SURROUNDS SOLID BLOCK OF MRE AND PRODUCES RADIAL MAGNETIC FIELD ALONG AXIS

SOLENOID SURROUNDS MRE WITH THROUGH-HOLE AND PRODUCES RADIAL MAGNETIC FIELD ALONG AXIS

SOLENOID AND INTERLAYER RADIALLY SURROUND MRE AND PRODUCES RADIAL MAGNETIC FIELD ALONG AXIS, AND FLANGES AT OPPOSITE ENDS OF SOLENOID PREVENT STRAY FIELD

MAGNETORHEOLOGICAL ELASTOMER (MRE) APPARATUSES, METHODS, AND SYSTEMS, INCLUDING BUSHINGS FOR VIBRATIONAL DAMPING OR ISOLATION

CROSS-REFERENCE TO RELATED APPLICATIONS

This application claims the benefit of U.S. Provisional Patent Application No. 63/198,689 filed on Nov. 4, 2020, all of which is herein incorporated by reference in its entirety.

BACKGROUND OF THE INVENTION

Field of the Invention

Embodiments of the present invention relate to the use of magnetorheological elastomers (MREs) in isolators and other devices and/or systems for, e.g., semi-active or active adjustment of mechanical properties in use. In one example, the stiffness of the MRE can be varied. One example of stiffness adjustment is for motion damping or vibration isolation. In one example, principles of the present invention can be applied to design of a viable MRE-based suspension bushing (SSB) that can semi-actively change its stiffness and damping characteristics under the effect of an external magnetic field.

State of the Art

Magnetorheological Elastomers (MREs) constitute a group of materials referred to as "smart" materials. These materials exhibit field-dependent material properties which include change in damping and stiffness properties of the material when subjected to an external magnetic field.

The use of MREs for these adjustable properties has been reported in a variety of different technical areas or arts. Motion damping or vibration isolation are just a few.

Background and discussion of application of MREs to motion damping or vibration isolation can be found in the literature. Two examples include U.S. Pat. No. 7,086,507 to inventors Hitchcock et al. and U.S. Pat. No. 9,581,214 to inventors Sun et al., both of which are incorporated herein by reference in their entirety. U.S. Pat. No. 7,806,507 places multiple wire coils outside and along a side of an elongated flat MRE material. The axis of each coil is transversely through the MRE material and creates a local magnetic field at and near its location relative the MRE strip to adjust stiffness. U.S. Pat. No. 9,581,214, which is also incorporated herein by reference in its entirety, discusses MRE using nanotubes as the magnetorheological materials in MRE and stacking magnetizable plates in the MRE that can be near or surrounded by a coil through which current can be controlled to produce stiffness changes in the MRE.

Other attempts at using MRE to control stiffness can be found at the following, each of which is incorporated by reference herein:

CN 105799438 entitled Rigidity Adjustable Bushing.
U.S. Pat. No. 5,816,587 entitled Method and Apparatus for Reducing Brake Shudder
U.S. Pat. No. 5,814,999 entitled Method and Apparatus for Measuring Displacement and Force.
Yu et al, 2016. Smart Mater. Struct. 25 115039 entitled Thermal Effects on the Laminated Magnetorheological Elastomer Isolator.

The inventors have recognized that a number of factors may affect the performance of MREs. And those factors can at least sometimes be competing or even antagonistic. For example, from finite element analysis, the magnetic flux density developed within MRE was observed to depend on the permeability, thickness, and magnetic shielding of the MRE. Additionally, the geometry and the electromagnetic circuit design have strong influences on the magnetic flux density and heat transfer properties. With respect to use of MRE in a semi-active suspension bushing (SSB), for effective performance of the SSB, high magnetic flux density is needed to effect large changes in stiffness. This requires a large, multi-turn coil leading to significant amount of heat output that can degrade the MRE.

In some operating conditions, an SSB can experience high operating and ambient temperatures. If too high, MRE performance can severely degrade or lead to MRE failure. High flux density can be achieved with high current, but this can produce high temperatures. An SSB can experience high loads, which indicates robust structural parts, but space constraints can limit overall size, selection, and design geometry, including how the MRE material is installed and cooperates with other components.

Thus, the inventors have discovered that a variety of design factors must be considered and balanced for any MRE application, including how such factors cooperate or interact, and that there is room for improvement in the state of the art.

SUMMARY

Objects, Features, and Advantages of Some Embodiments of the Invention Objects, features, and/or advantages of some embodiments of the present invention relate to semi-active, adaptive, and/or active magnetorheological elastomer (MRE) apparatuses, methods, and systems, including bushings for vibrational damping or isolation, that improve over or solve problems and deficiencies in the state of the art.

Various types of electronically controllable suspension systems for heavy duty trucks, trailers, buses, automobiles, and other vehicles are known. By way of example only, these systems generally include active systems, semi-active systems, and adaptive systems. In some embodiments of active suspension systems, actuators can exert an independent force on the suspension to improve the ride characteristics. Both semi-active and adaptive suspension systems can vary properties of the suspension, such as stiffness or damping, to achieve a better ride, better road-holding, a combination of the two, and/or some other effect. Semi-active suspension systems generally differ from adaptive suspension systems, however, in that the characteristics of the suspension typically change more rapidly in a semi-active suspension system. Semi-active suspension systems generally differ from active suspension systems in that typically less energy is used in semi-active suspension systems and, in contrast to active suspension systems, typically no direct force is applied to the suspension system via power input from a control system. Instead, a small amount of energy is typically used to change the characteristic (e.g., damping) of the suspension system.

See, e.g., U.S. Pat. No. 10,569,813 to inventors Davis et al., incorporated by reference herein in its entirety, for background information on such suspension systems, including those that can use motion damping or vibration isolation bushings. See, e.g., Savaresi, Sergio & Poussot-Vassal, Charles & Spelta, Cristiano & Sename, Olivier & Dugard, Luc. (2010). Semi-Active Suspension Control Design for Vehicles. Semi-Active Suspension Control Design for Vehicles. 10.1016/C2009-0-63839-3, Chapter 1, incorporated by reference herein, for background information on use of the term semi-active in the context of at least electronically-controlled suspension systems.

Although some embodiments of the invention are described herein in the context of use with suspension systems (e.g., vehicle suspension systems), it will be understood that embodiments of the invention are not limited to use with such systems, but could also be used with a wide variety of other systems including, for example, as a platform mount for, e.g., vibrating machinery or for occupants on a standing platform near vibrating machinery, such as where the frequency of vibration is subject to change. In such embodiment, for example, the devices described herein could be used as a moving notch filter. Other uses or applications are possible.

Balancing at least the foregoing complexities, apparatus, methods, and systems are disclosed herein that improve over or solve problems and deficiencies in the state of the art. The apparatus, methods, or systems optimize the magnetic flux density and decreases the heat generated due to resistive losses. The design has been observed to have under certain operating parameters and conditions substantially improved (e.g., in some demonstrated cases on the order of a 24% increase for at least some configurations) in average magnetic flux density throughout the MRE than certain other state-of-the-art configurations, and also with uniform radial distribution and a significant decrease in the heat generated.

Additionally, embodiments of the disclosed example in the form of an apparatus have, through thermal analysis, microstructure characterization, adhesion testing, and optimization of the bushing system geometry shown to have additional enhancements for MRE based bushing systems.

Aspects of the disclosed embodiments can be applied to a variety of SSB form factors and designs, and further can be applied to uses other than SSBs for MRE with adjustable stiffness.

Other objects, features, and advantages of some embodiments of the invention include, but are not limited to, apparatuses, systems, and methods as above-described which:
  a. Effectively balance a variety of factors including selection of MRE material and its parameters, selection of a coil and its parameters, selection of assembly geometry and parameters, and selection of operating parameters for a given application.
  b. Can balance a variety of factors to promote effective magnetic field generation and control at the MRE, including magnetic flux density.
  c. Can balance a variety of factors to promote effective thermal management at the MRE.
  d. Can balance both magnetic field and thermal characteristics.
  e. Can allow a range of control of MRE stiffness.
  f. Can allow implementation in a variety of form factors and sizes, including relatively small scale.
  g. Can be relatively economical in terms of cost of materials, cost of manufacturing, and cost of operation.
  h. Allows a variety of applications.
  i. Can be controlled semi-actively or actively or adaptively.

Aspects of the Invention

One aspect of the invention relates to a radial vibrational isolator that includes a magnetorheological elastomer (MRE) at or near, and at least substantially along, the magnetic axis of an electromagnetic coil; without appreciable magnetic shielding between the coil and the MRE. A variety of factors balanced to produce an isolator that takes advantage of a radial axial coil in terms of, at least, selection of:
  a. MRE material and its properties and makeup;
  b. coil and its characteristics, including number of turns per amount of energy to drive it;
  c. magnetic shielding and/or lack thereof (e.g., use of non-magnetic or magnetic materials for certain parts or components);
  d. relationship of components, including adhesion of MRE to other components; and
  e. operating parameters of the final assembled device.

In some embodiments it may be beneficial to use a two-part coil bobbin geometry; where the axial center of the bobbin is a nonmagnetic material which allows passage of the magnetic field of the coil, while end pieces at opposite ends are made of a high permeability material that limits the stray magnetic field and improves the magnetic flux density through the MRE by providing a pathway of least magnetic reluctance. The coil wire is wound around the exterior of the non-magnetic material, and the MRE is within the core of the coil on the interior side of the bobbin non-magnetic axial center. The MRE changes stiffness and damping properties in response to the strength of the magnetic field, which can be controlled by changing the current through the electromagnetic coil. Feedback and feedforward control systems will allow for real time adaptation by the isolator in response to changing external stimuli. This has the potential to be useful for a variety of applications. Non-limiting examples are reducing whole body vibrations for operators of trucks and heavy machinery, as well as for creating greater comfort for patients in ambulance gurneys and passengers in airplane seats, and for other uses. This bobbin configuration can be used in analogous ways for applications other than a radial vibrational isolator that benefit from controllable change of stiffness of the MRE.

In other embodiments, having an electromagnetic coil (sometimes called solenoid) with coiled (e.g., copper) wire between an outer cylinder or case and the MRE at or near the coil can increase the magnetic field generated by the coil. In one example, the outer cylinder or case is made of high permeability material that limits stray magnetic field and improves magnetic flux density through the MRE. This allows the required current to be decreased which will help reduce the heat generated by the copper wire when the current is applied.

In other embodiments, the coil can be at least partially directed embedded in the MRE, with at least a portion of the MRE in the core of the coil, or directly at or near the coil.

Additionally, in embodiments where MRE is adhered to either the coil or to device surfaces, better adherence can promote better performance of the device, including useful life. In some embodiments, techniques are used to enhance adhesion of MRE to such surfaces, as can be important in vibrational isolators. It has been discovered that there can be challenges in at least maintaining adhesion of a coil embedded in MRE for applications that involve compression, elongation, or other movement of the MRE by an external load or force. Challenges with adhesion, including between MRE and copper wire, risk adhesion failure over operating life and could be partially due to the interface between the copper wire and the MRE. In some embodiments, by placing a non-magnetic interlayer between the copper wire and the MRE, such as discussed above regarding the nonmagnetic axis center of a bobbin, the MRE will have a more homogenous surface to bond with. The non-magnetic interlayer allows passage of the magnetic field from the coil without substantial magnetic losses to assist both separation of the coil from the MRE but yet also promoting the strongest magnetic field at the MRE per unit of electrical energy through the coil. And, as indicated, aspects of such embodiments can include techniques to improve adhesion of MRE to such surfaces.

Other aspects of the invention are set forth in this description and its appended drawings, including but not limited to descriptions of optimization of a radially-positioned coil to MRE and:

a. the types and distribution of magnetic particles used in the MRE to promote effective operation;
b. MRE parameters to promote effective operation, including thickness and adherence to other components;
c. coil parameters to promote effective options, including material, number of turns, position, and shielding and position of shielding;
d. processes and techniques to promote adhesion of MRE to components, including component surfaces of different types of materials; and
e. operating parameters, including interplay with other factors, including but not limited to coil parameters, shielding, and amperage to balance and/or optimize magnetic flux density at the MRE while managing thermal conditions.

These and other objects, features, aspects, and advantages of the invention will become more apparent with reference to the accompanying description, claims, and drawings.

BRIEF DESCRIPTION OF THE DRAWINGS AND APPENDICES

The appended drawings include diagrammatic illustrations of various embodiments and aspects according to embodiments of the invention.

The patent or application file contains at least one drawing executed in color. Copies of this patent or patent application publication with color drawing(s) will be provided by the Office upon request and payment of the necessary fee.

FIG. 1 illustrates a generalized aspect according to the invention, an MRE material radially along, and at or near, an electromagnetic coil and without appreciable magnetic shielding between the coil and MRE. The left side illustrates one embodiment of a semi-active radial bushing Version 1 (or V1) with the coil partially embedded in the MRE. The center illustrates another embodiment of a semi-active radial bushing Version 2 (or V2) with the MRE inside the core of the coil. The right side illustrates another embodiment Version 3 (or V3) with the same general geometry as V2, the coil external of the MRE, but with different design parameters including different dimensions of components including MRE thickness.

FIG. 2 is a diagrammatic depiction, not to scale, of the geometry of embodiments V2 and V3 of a radial vibrational isolator according to aspects of the invention, including MRE inside the core of the coil and along an axis, and further including a two-part coil bobbin having a non-magnetic axial center that passes the magnetic field of the coil and contains the MRE, as well as opposite high magnetic permeability end pieces that limit stray magnetic field of the coil and improve magnetic flux density through the MRE. FIG. 2 also includes, diagrammatically, mounting hardware and a control system for semi-active operation of electrical current thought the coil to adjust stiffness of the MRE in the context of a vibration isolator (e.g. SSB).

Figure 1:
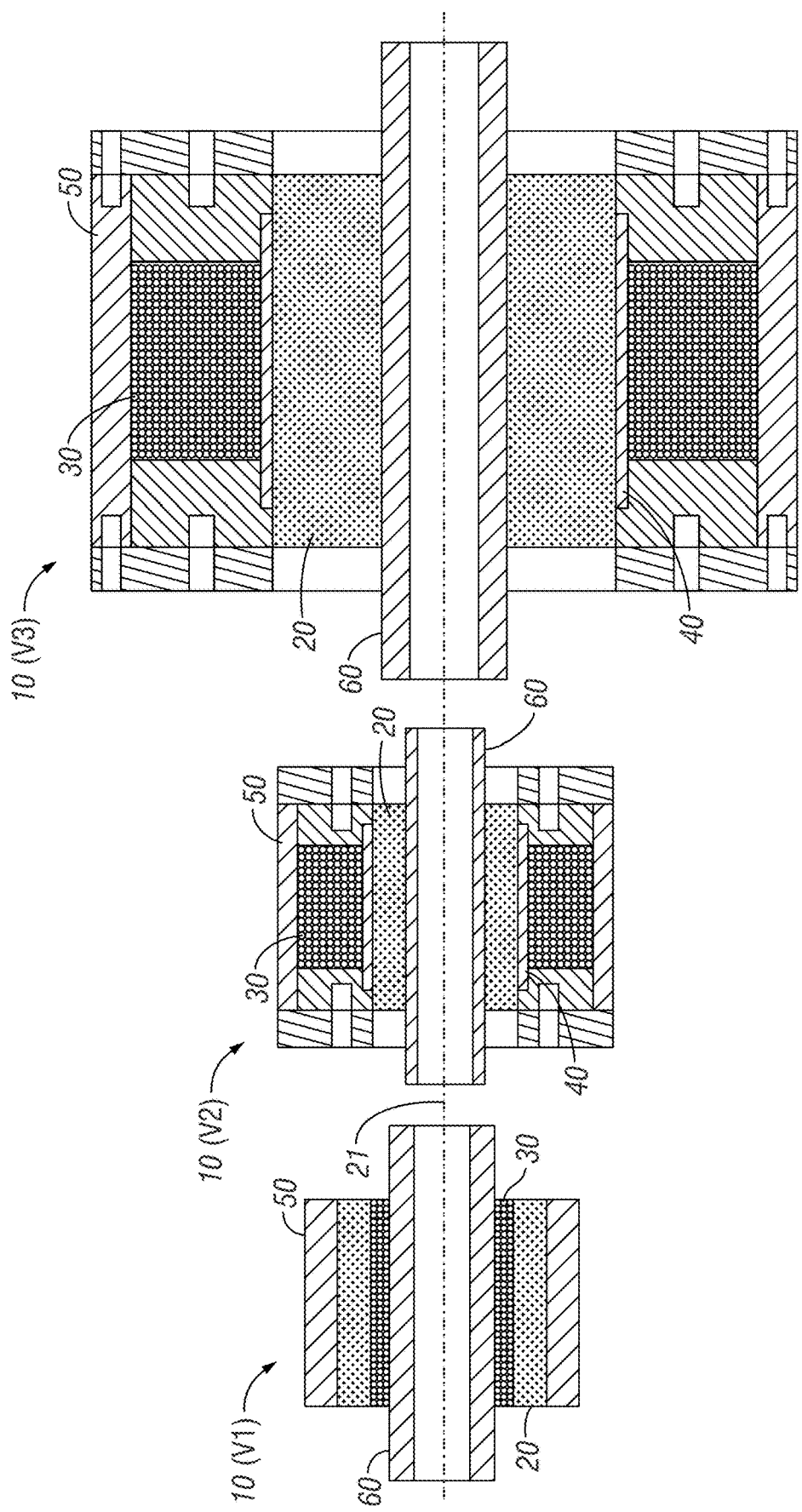

FIGS. 5A-F, 6, 7A-B, 8A-B, and 9 are assembled perspectives, assembled cross-sectional, exploded, isolated, and isometric views, respectively, of one specific example of a device using the aspects of the geometry of V2 of FIG. 1.

Figure 10A:
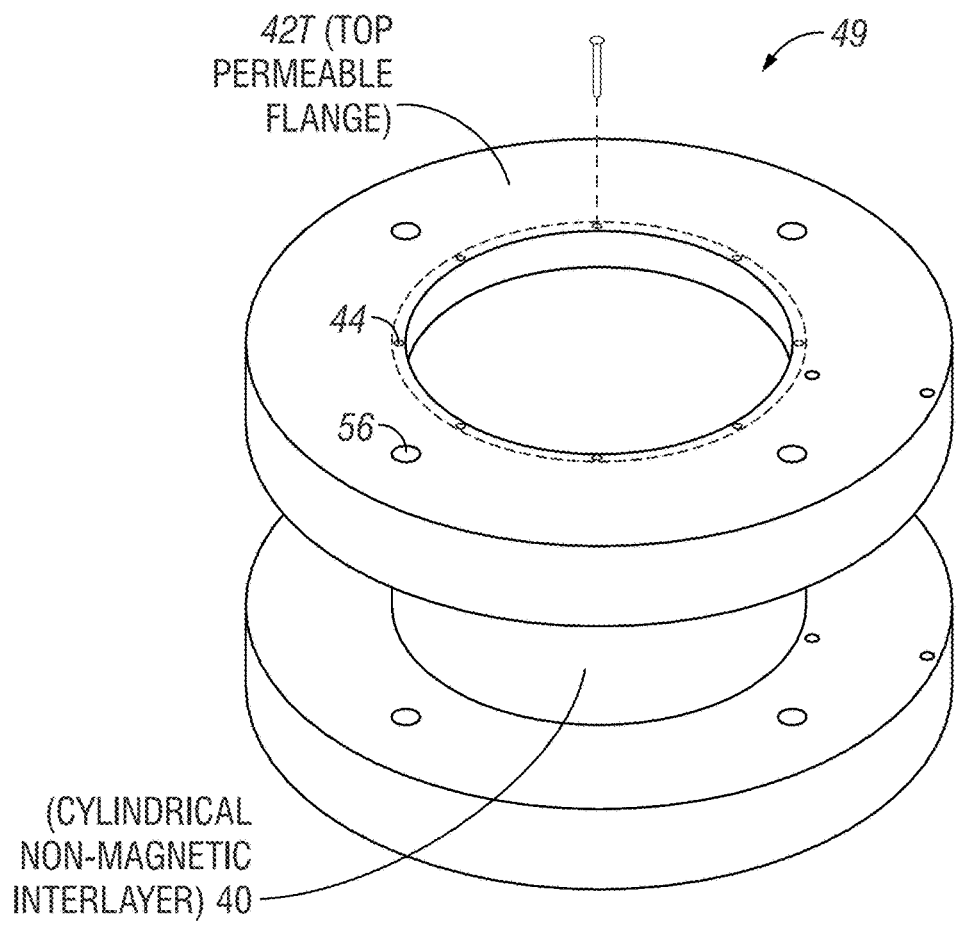
Figure 10B:
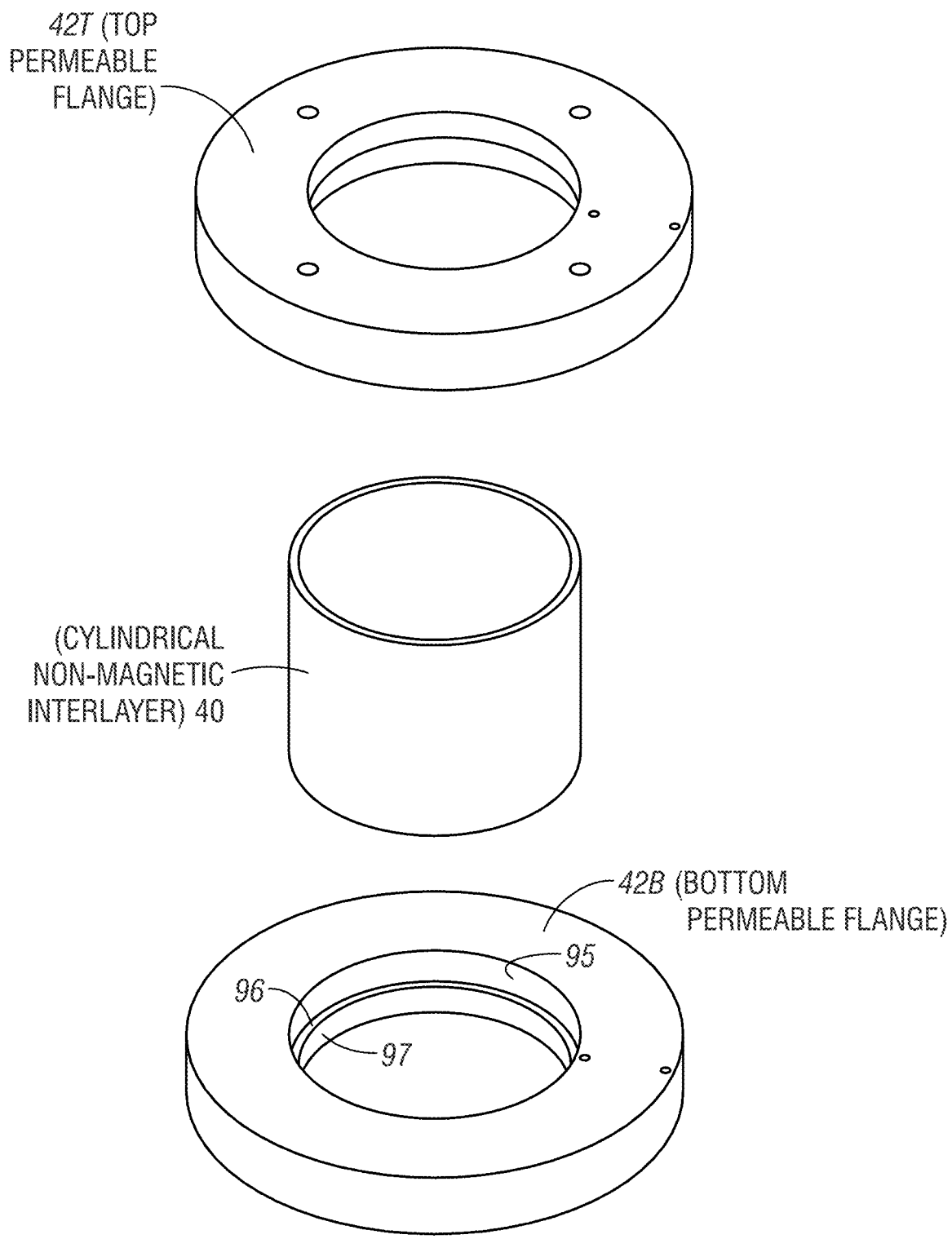

FIGS. 10A-B to 14A-D show steps in assembling the example V2 of FIGS. 5A-F to 9. FIG. 10B is an exploded view of feature that can be used to assemble non-magnetic interlayer 40 and its coil spacers 42T and B.

FIGS. 15A-F are diagrams and graphs showing efficacy and performance of embodiment V2.

Figure 16A:
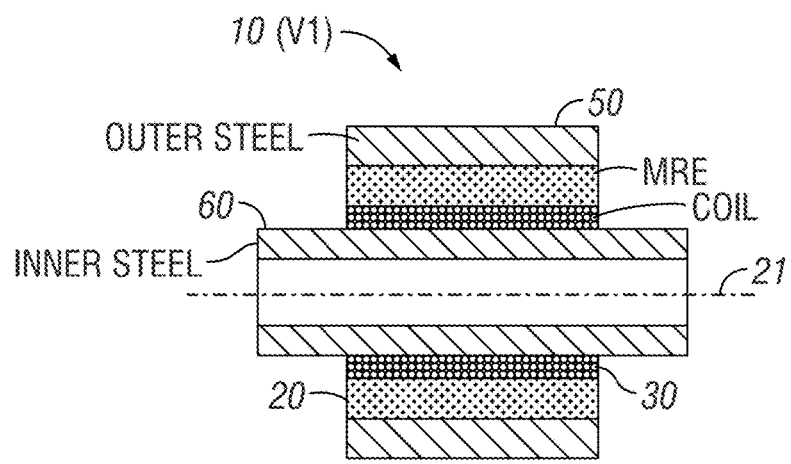
Figure 16B:
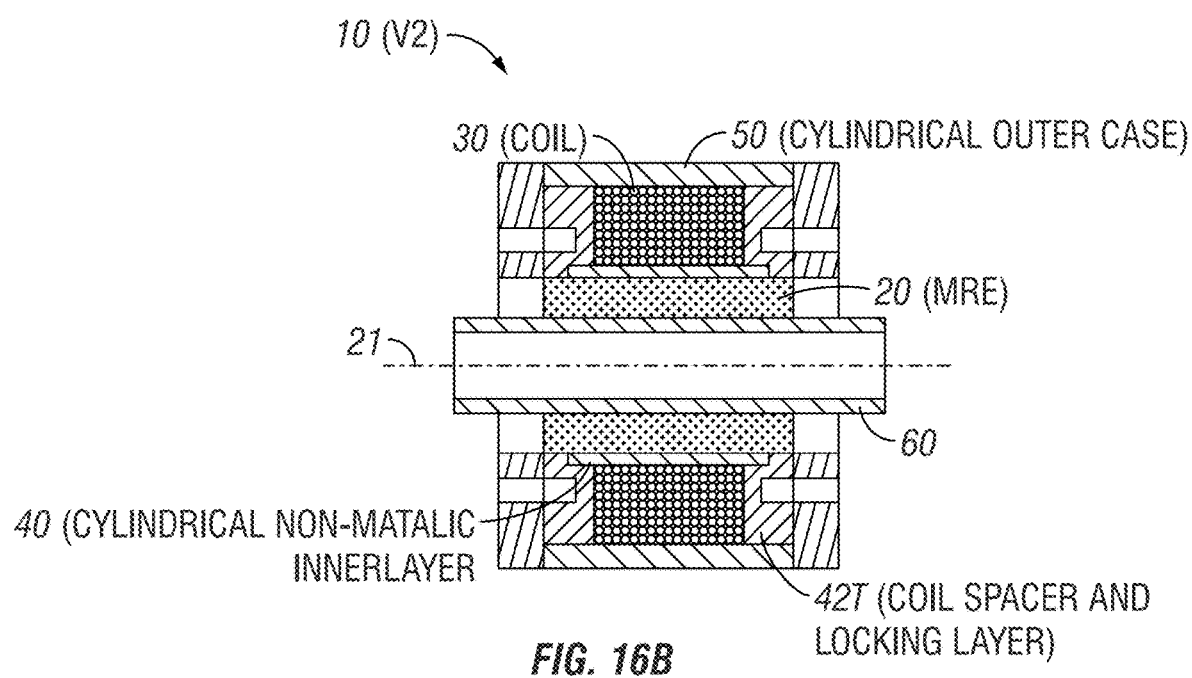
Figure 16C:
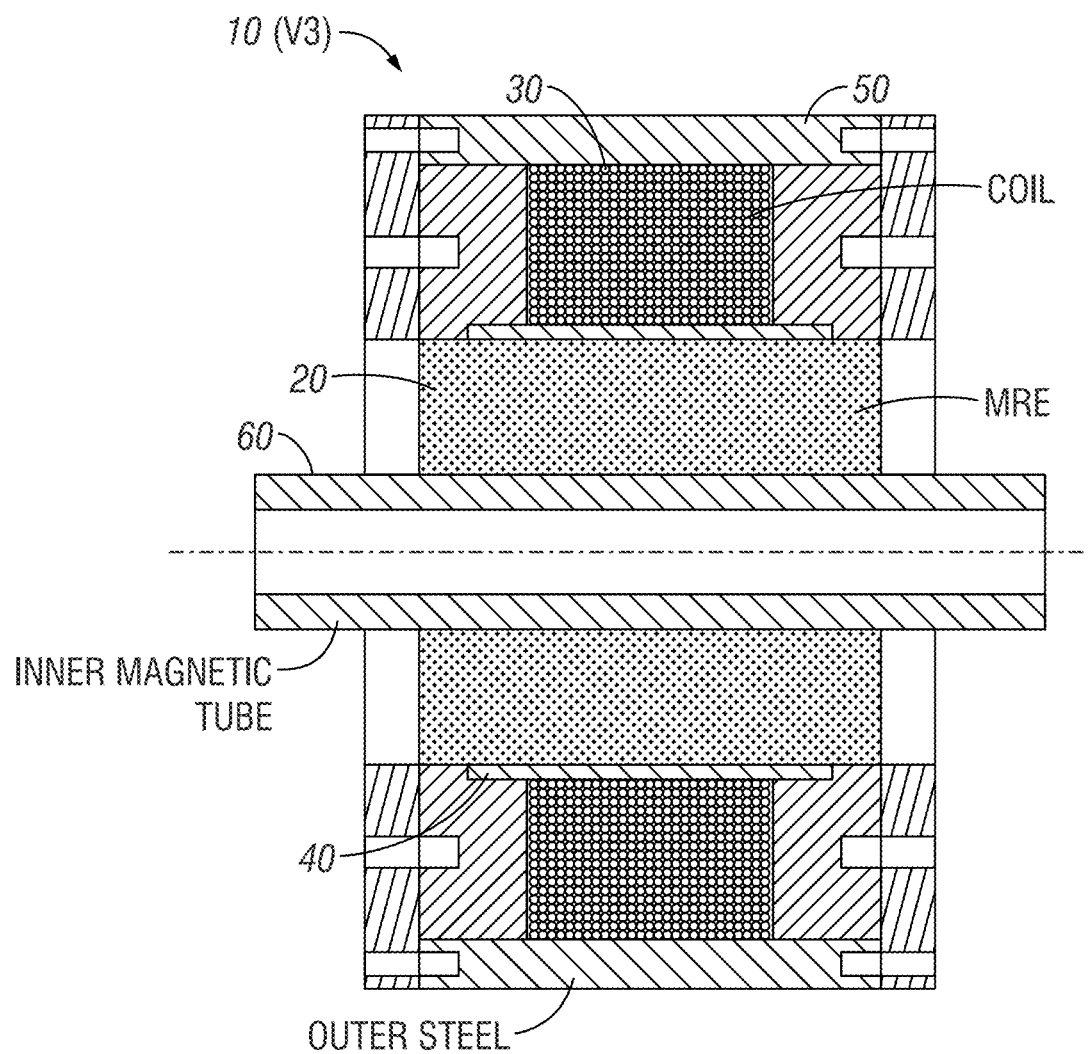

FIGS. 16A-C show, individually, the geometries of V1, V2, and V3, respectively, in cross-section.

Figure 17A:
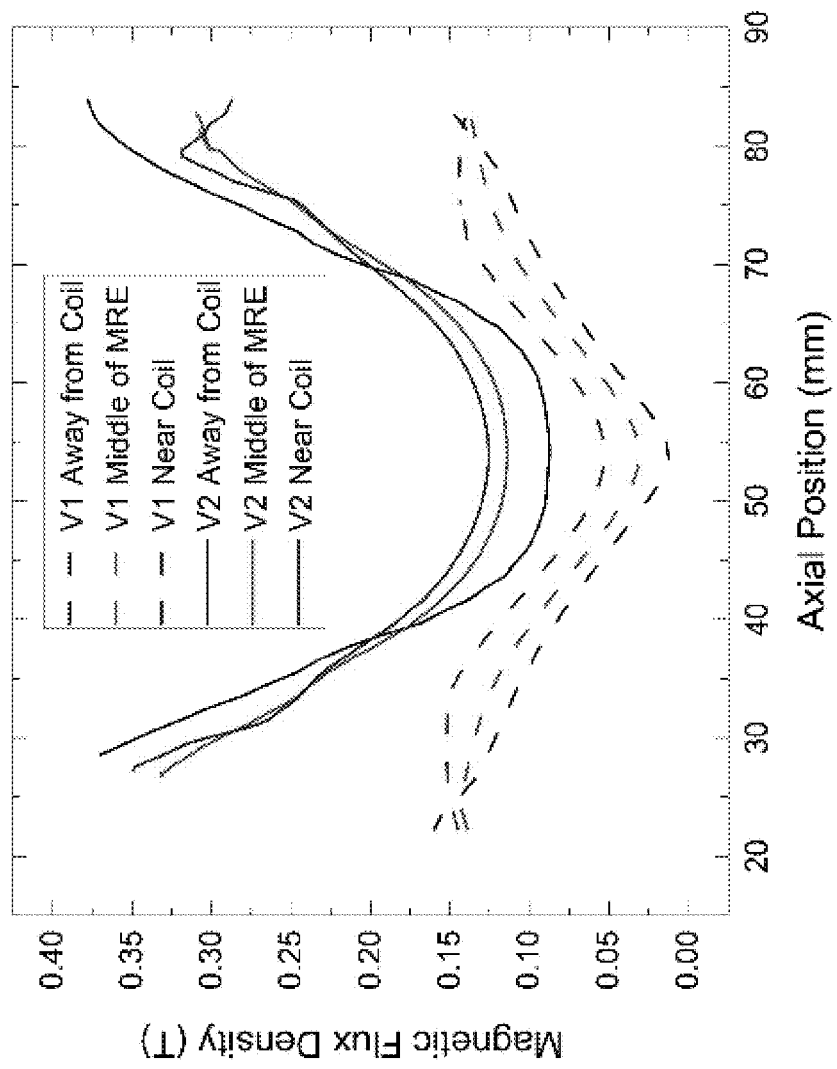
Figure 17B:
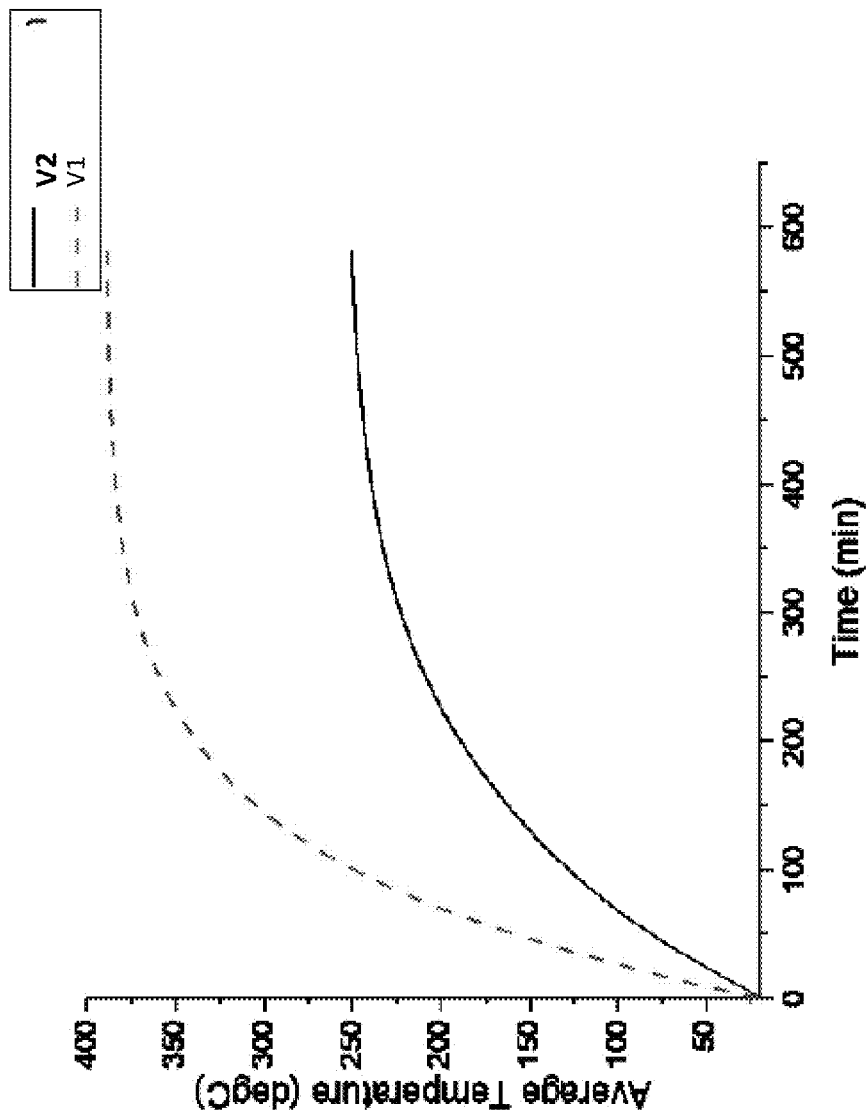
Figure 17C:
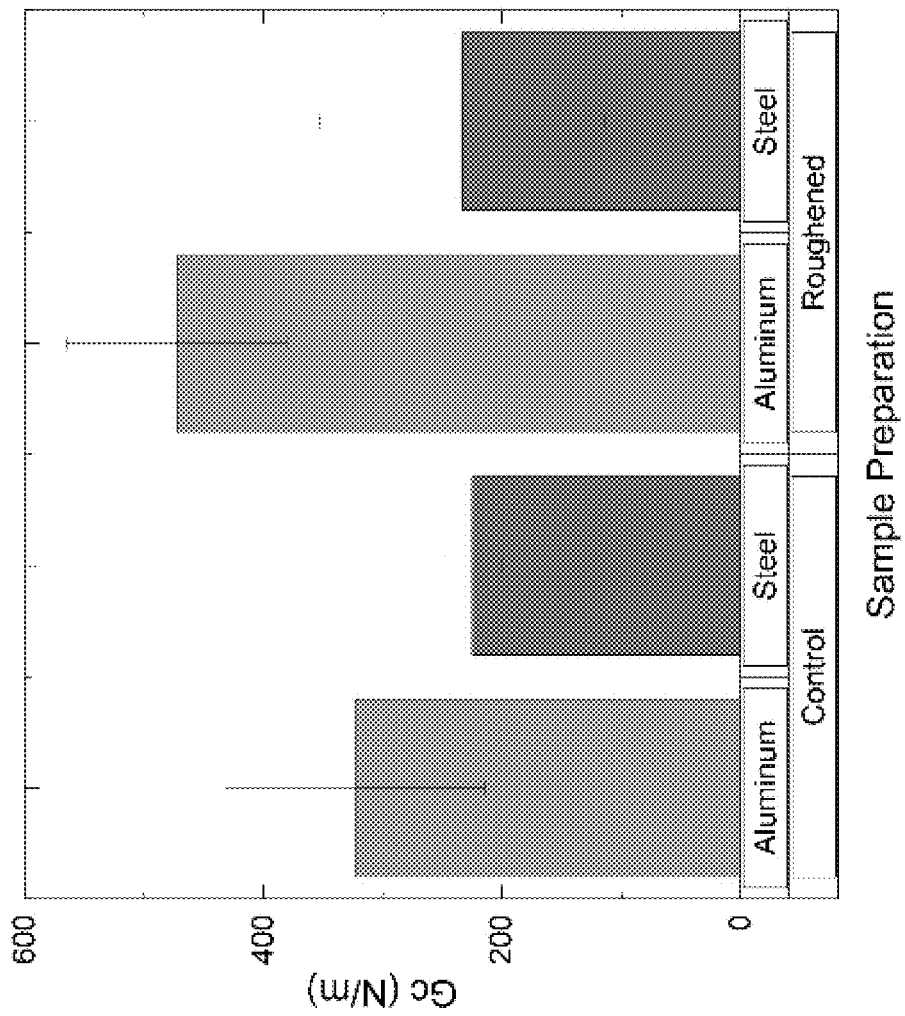

FIGS. 17A-C are graphs and illustrations showing, for direct comparison, performance, and efficacy of V1 versus V2.

FIGS. 18A-D are graphs and illustrations showing, for direct comparison, performance, and efficacy of V1 versus V3.

Figure 19A:
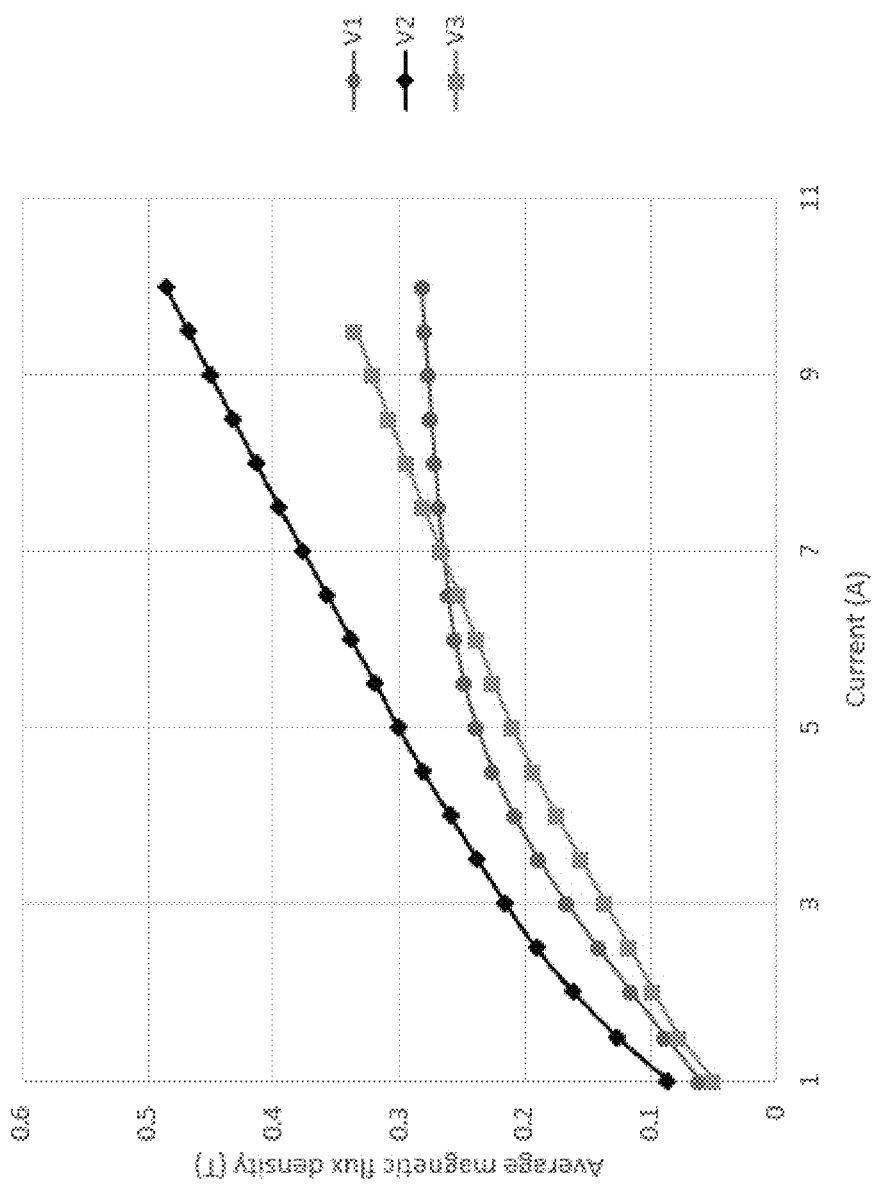
Figure 19B:
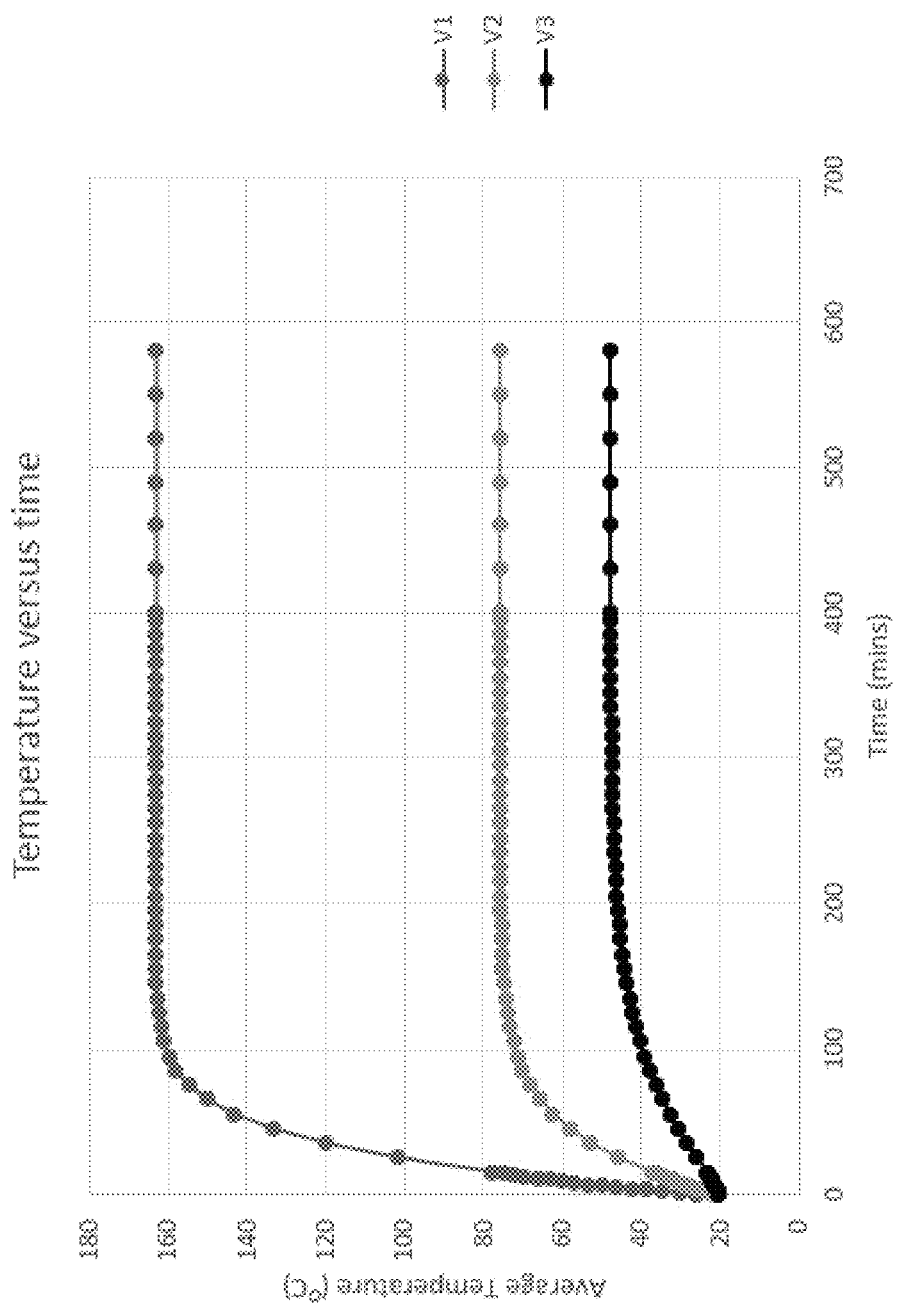

FIGS. 19A-B are graphs and illustrations showing, for direct comparison, performance, and efficacy of V1 versus V2 versus V3.

Figure 20A:
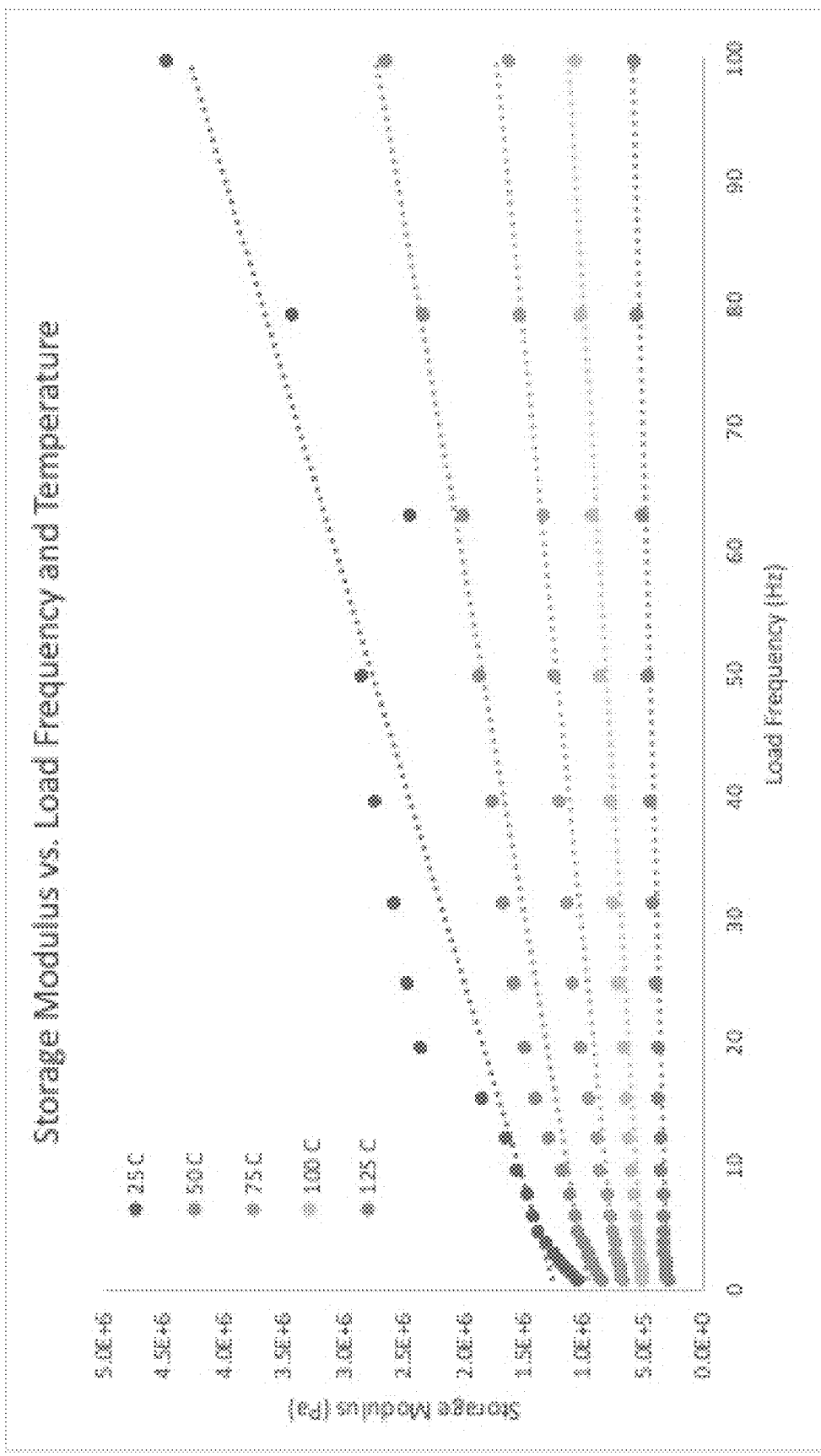
Figure 20B:
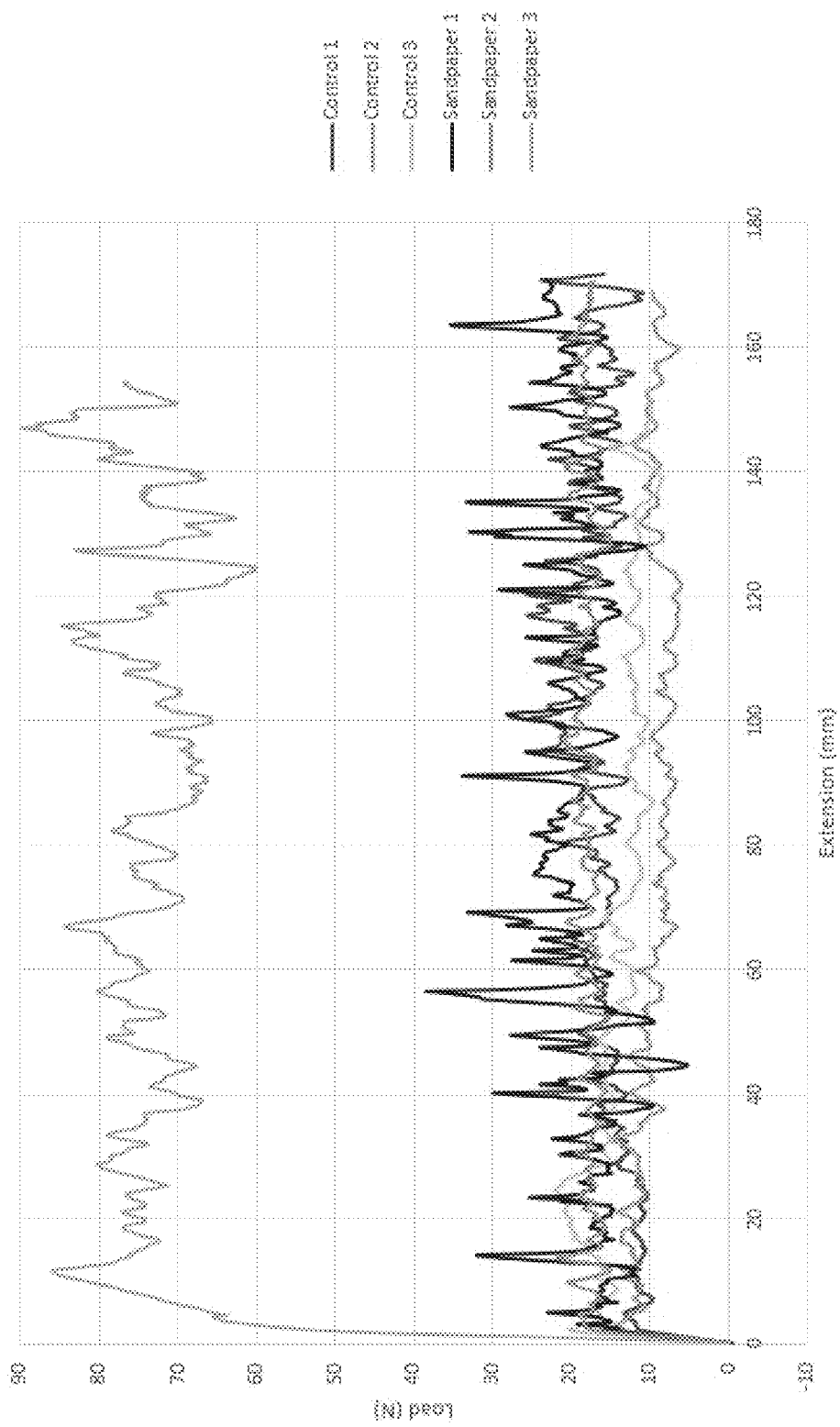
Figure 20C:
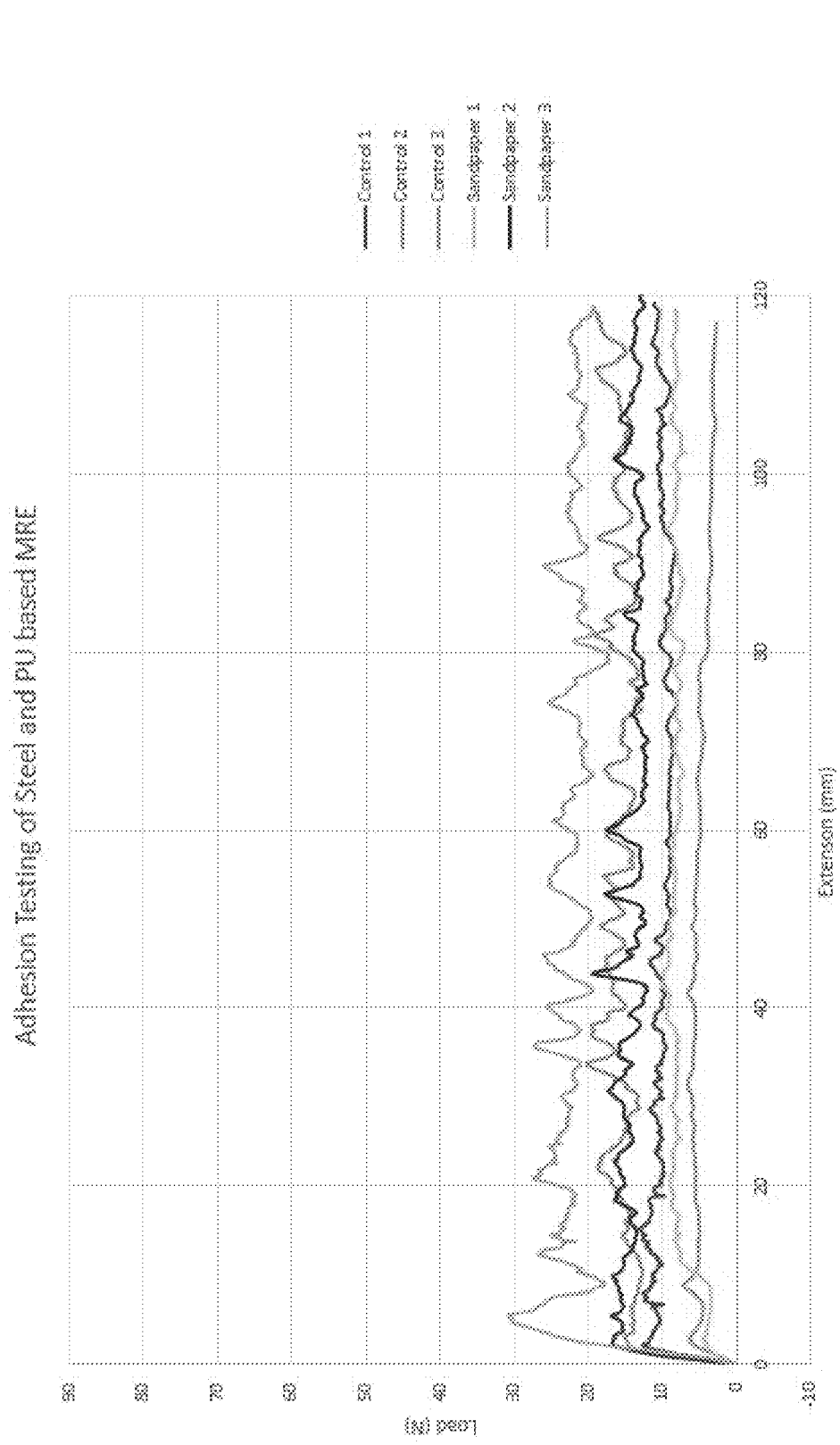

FIGS. 20A-C are graphs and illustrations of techniques to improve adhesion of MRE to surfaces.

FIGS. 21A-F, 22A-D, 23A-C, 24A-C, 25A-C, and 26A-C depict examples of other embodiments according to the present invention, to illustrate different design factors involved, as well as combinations of the same regarding MRE along the magnetic axis of a radial coil, including but not limited to the general geometries of V1 (FIGS. 21A-F and FIGS. 22A-D), and variations that include one or more aspects of the general geometrics of V2 and V3 (FIGS. 23A-C, 24A-C, 25A-C, and 26A-C).

Figure 12:
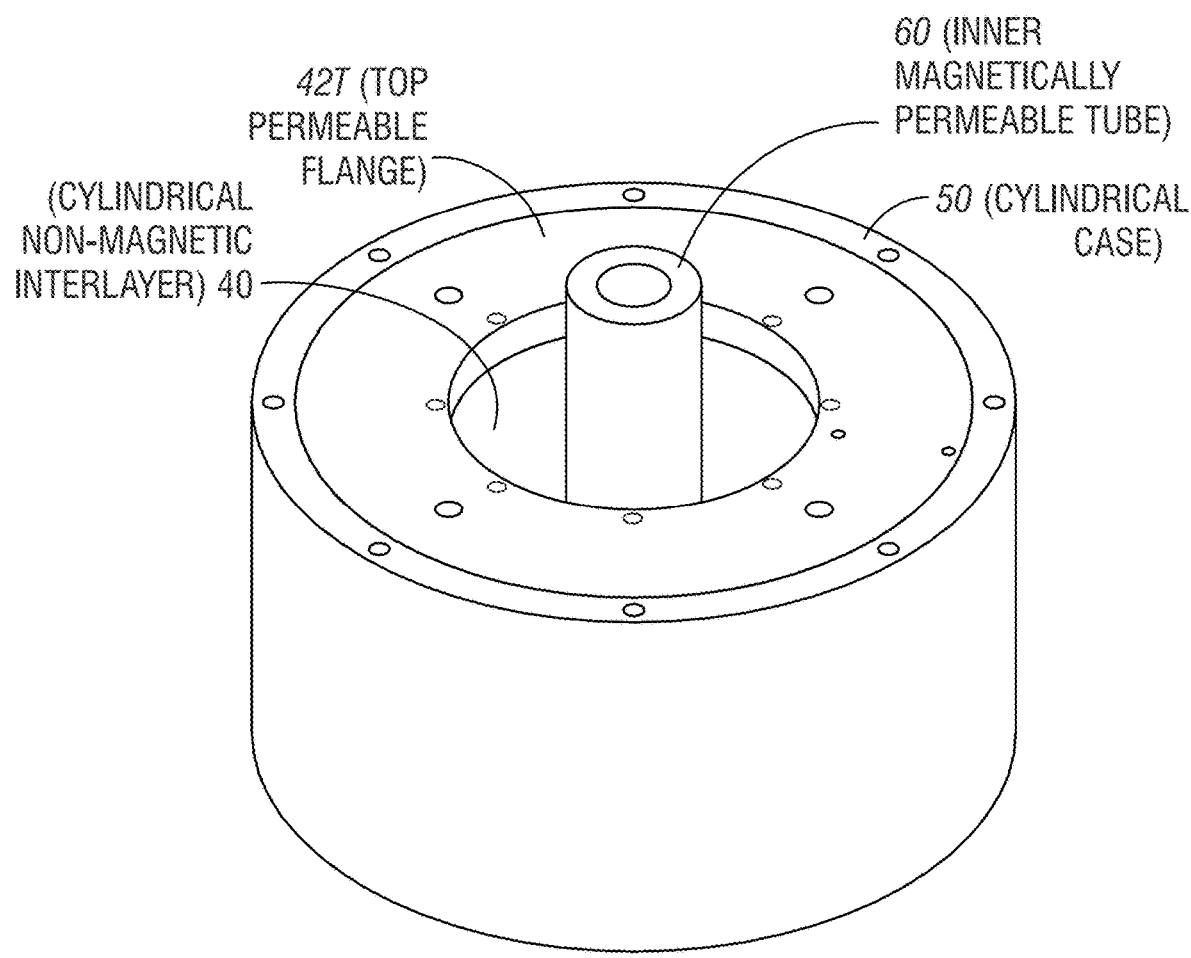
Figure 27:
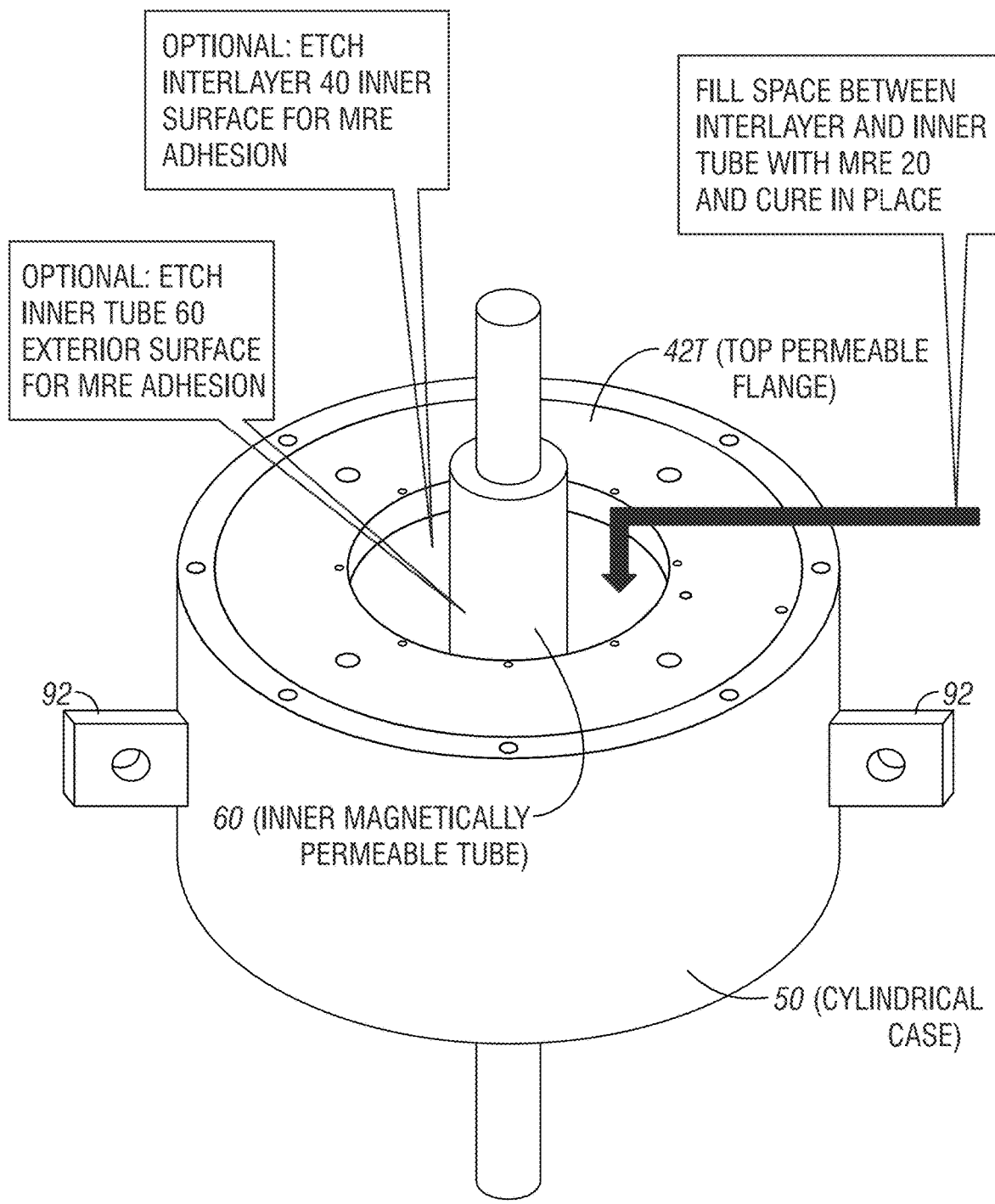

FIG. 27 is similar to FIG. 12 but diagrammatically shows design factors and selections that can be considered and/or used with the embodiment of FIG. 12.

Figure 5A:
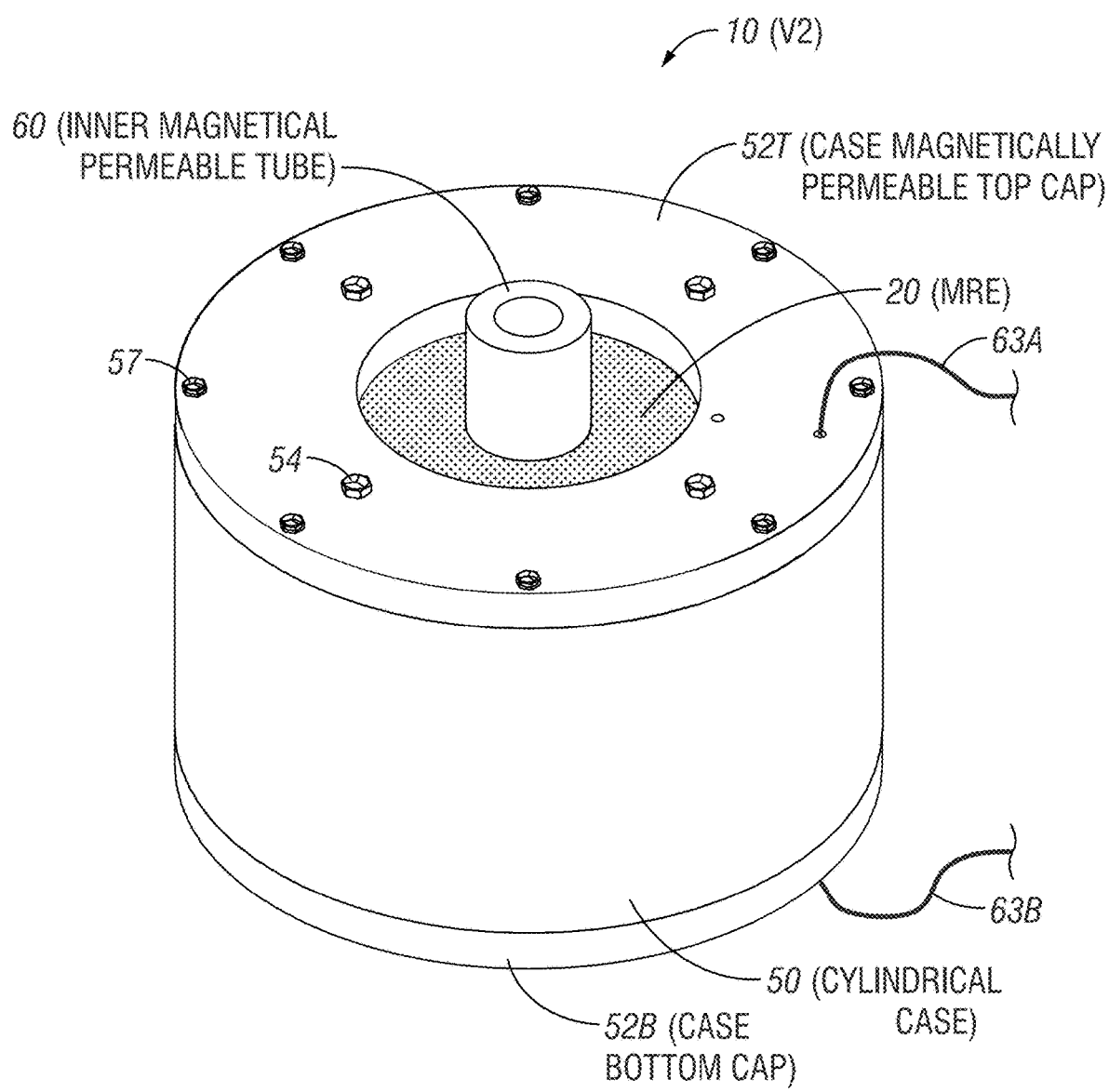
Figure 5B:
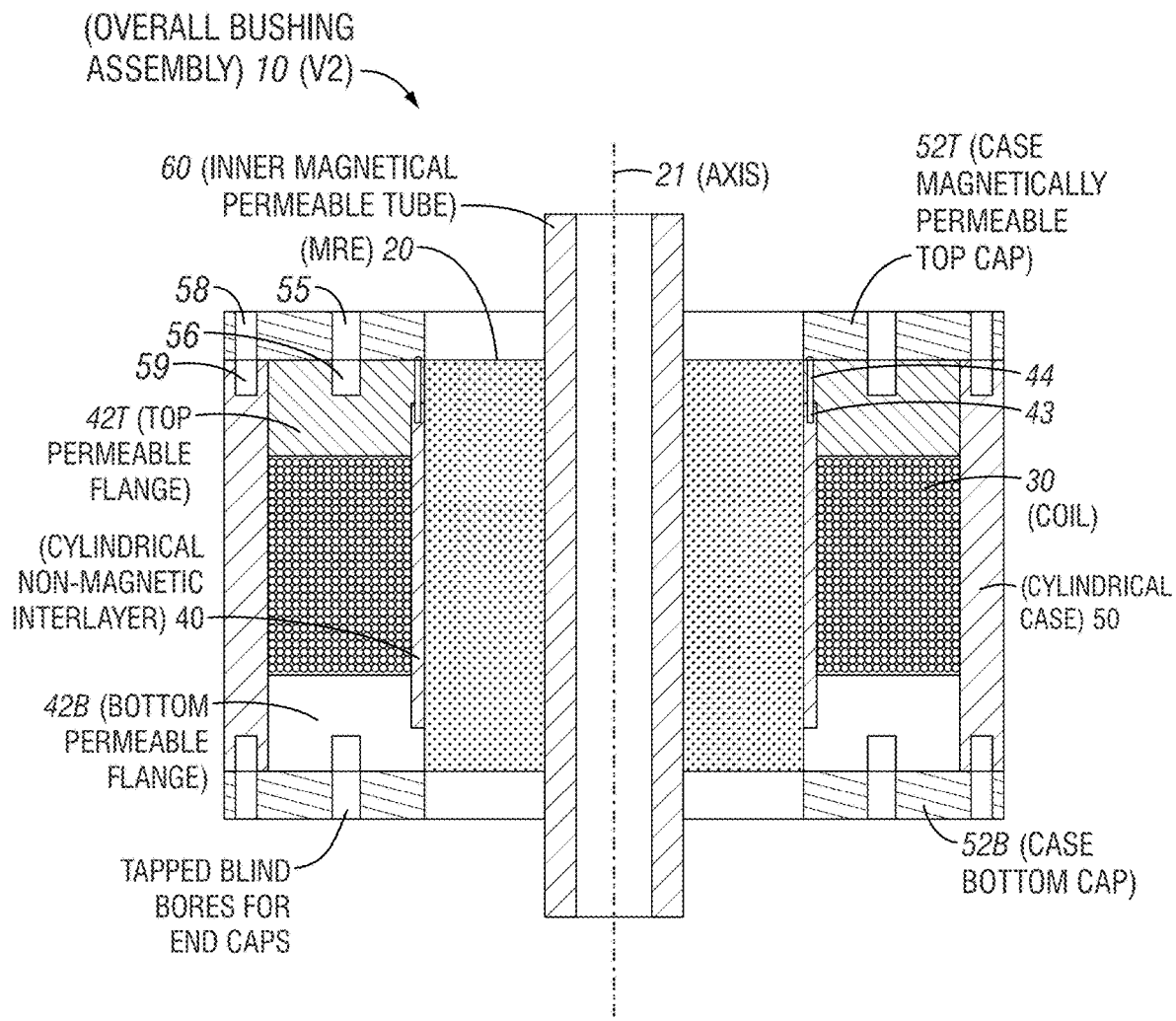
Figure 5C:
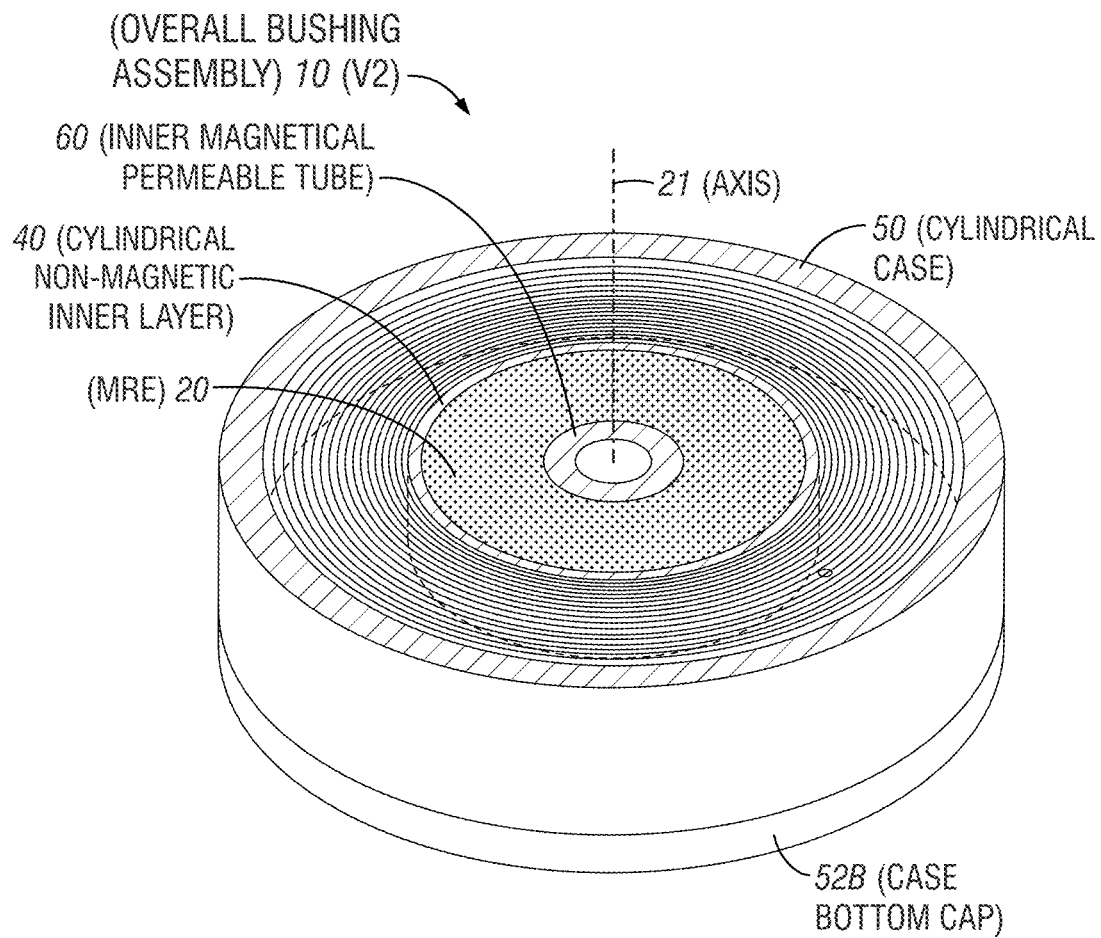
Figure 5D:
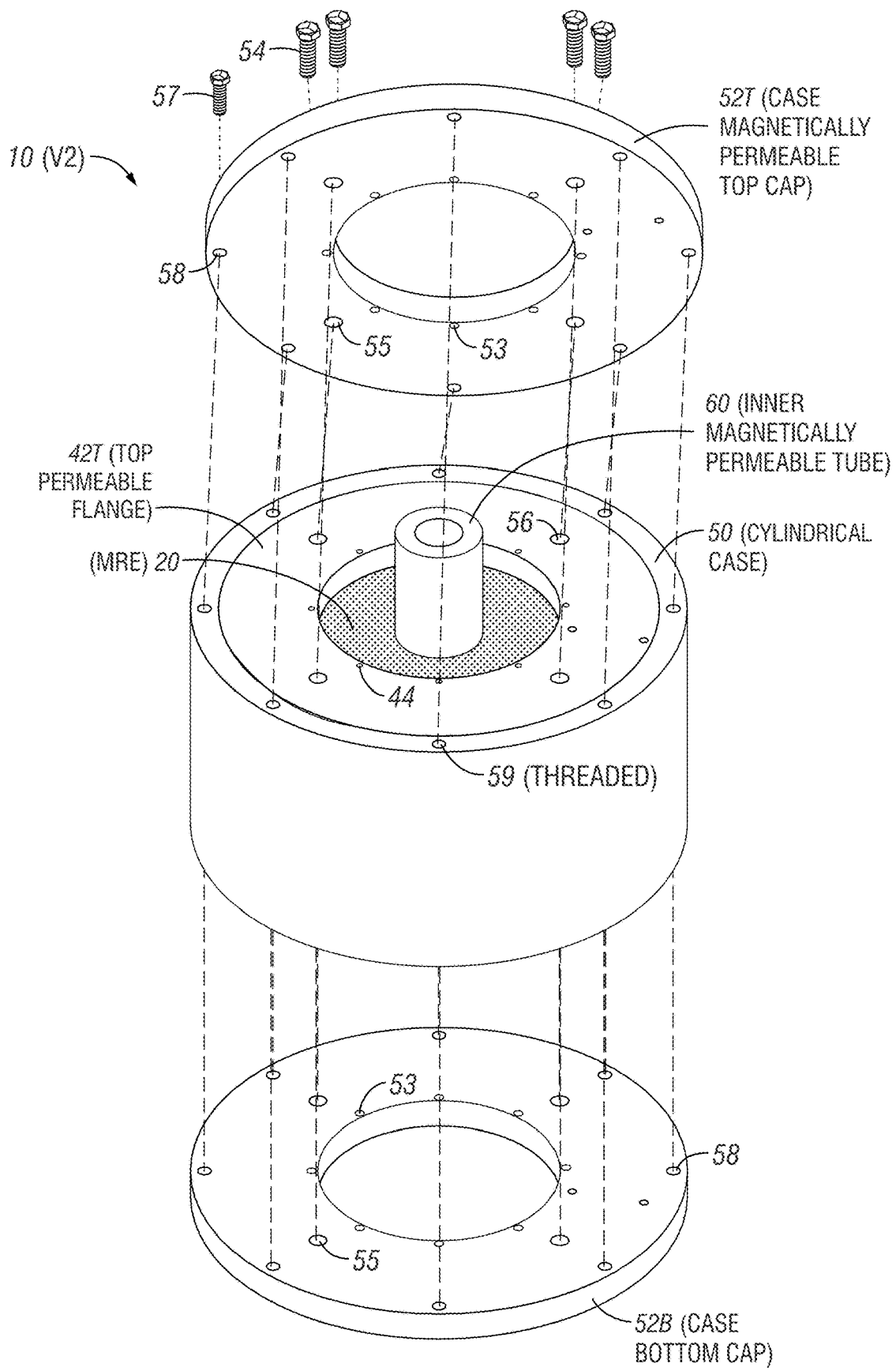
Figure 5E:
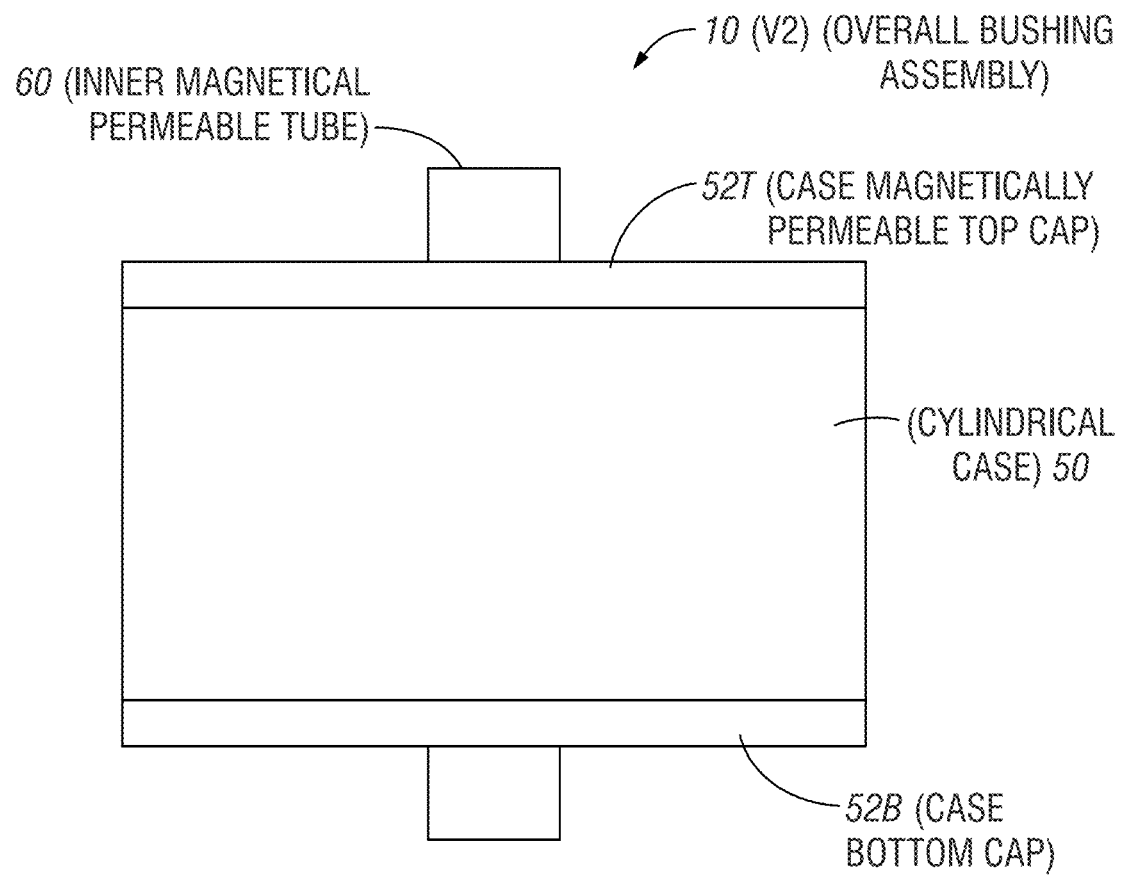
Figure 5F:
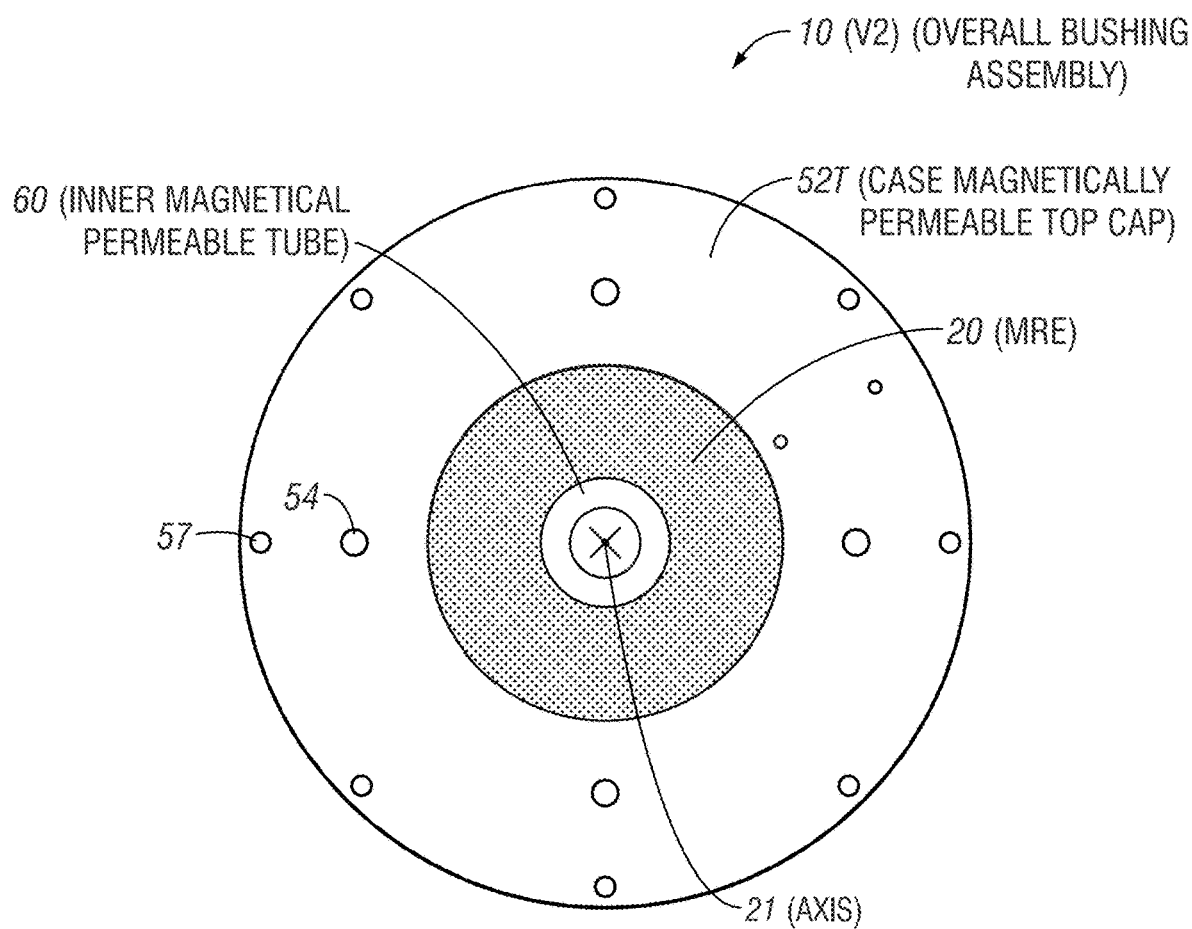
Figure 6:
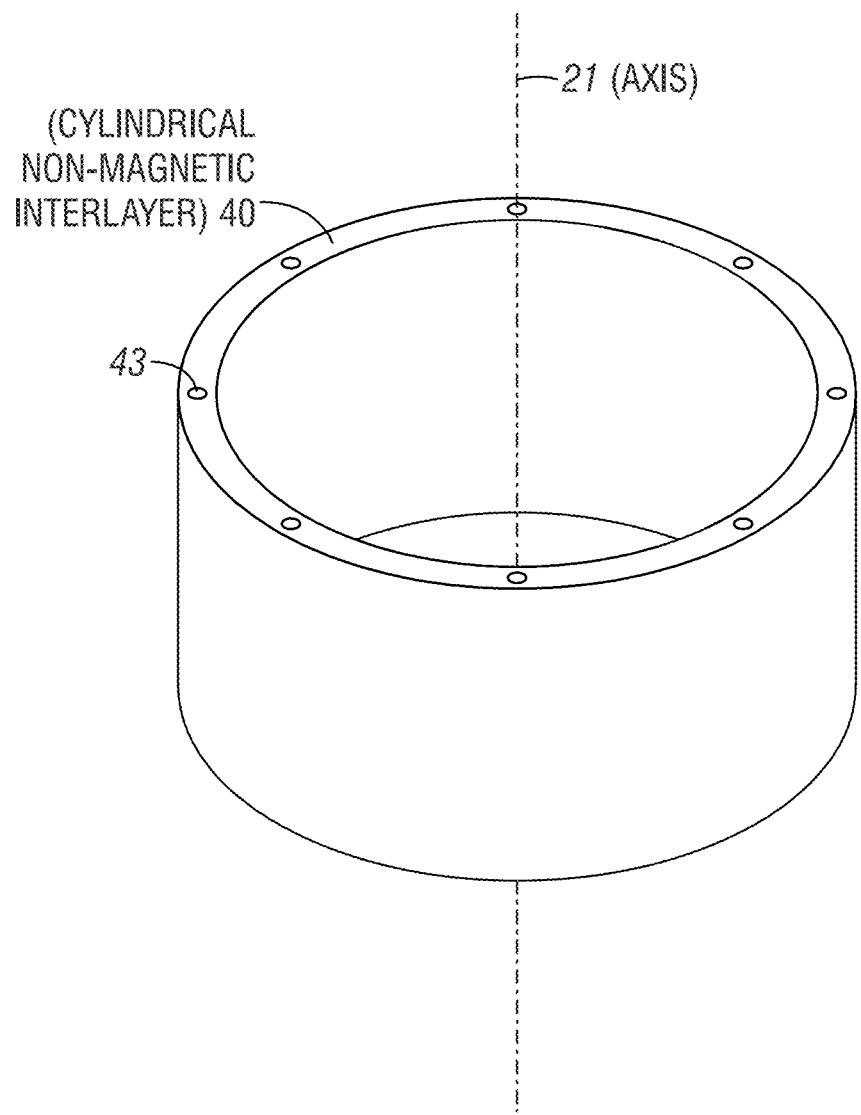
Figure 7A:
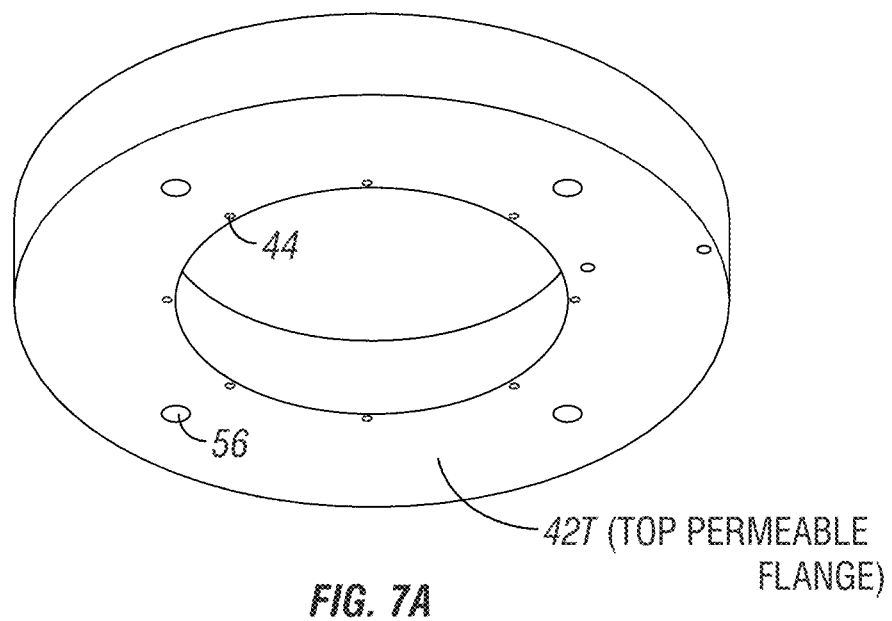
Figure 7B:
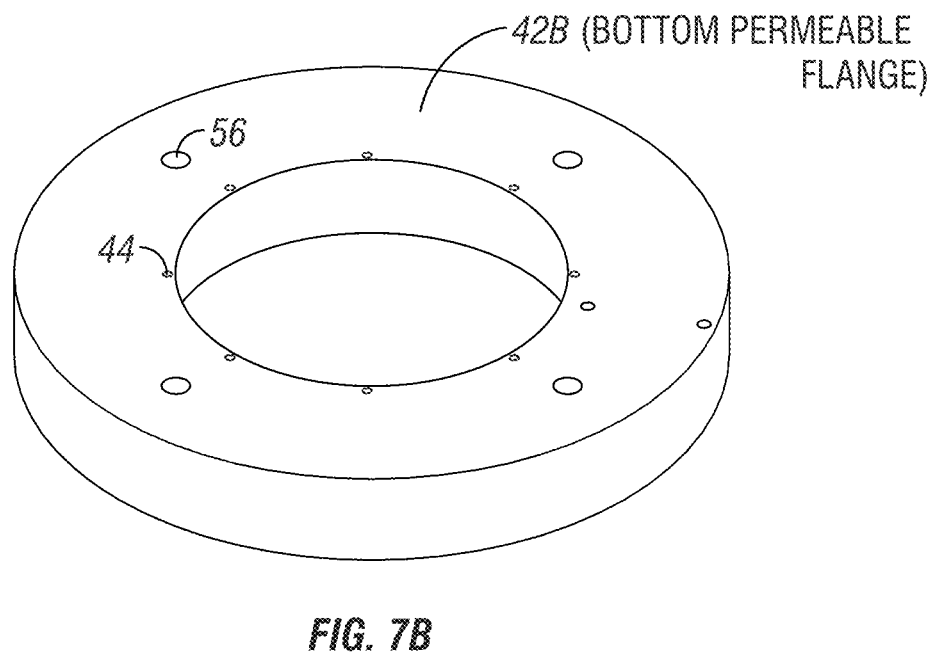
Figure 8A:
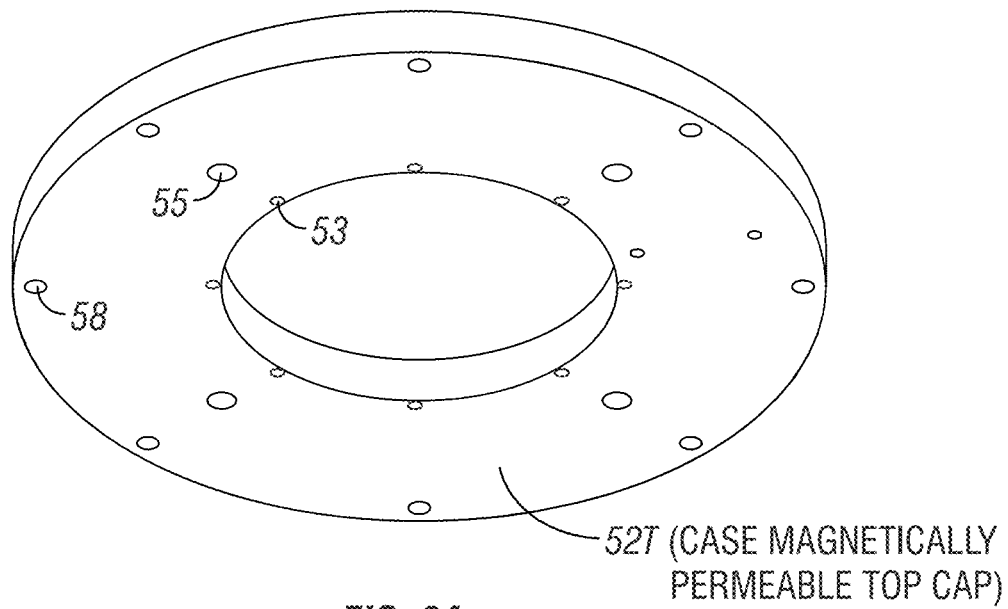
Figure 8B:
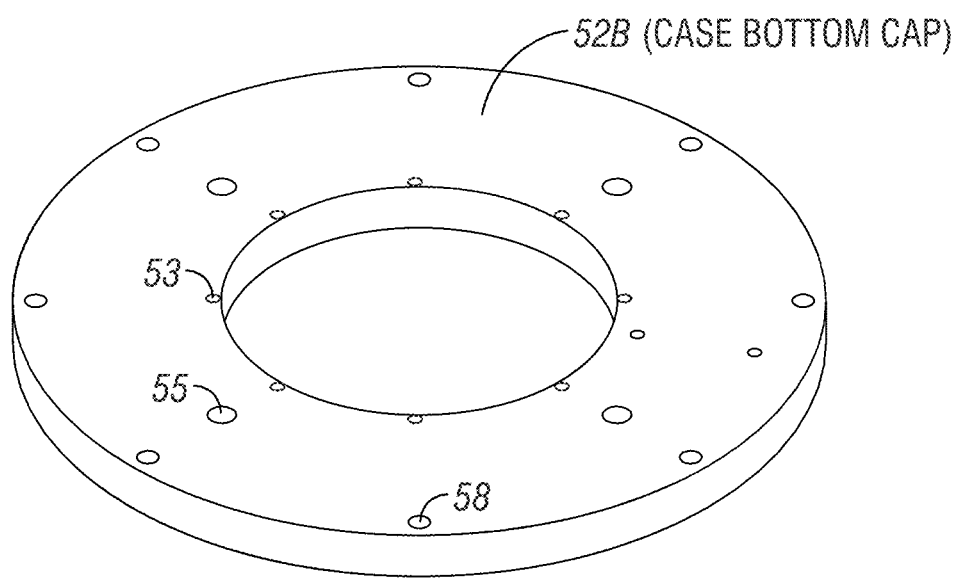
Figure 9:
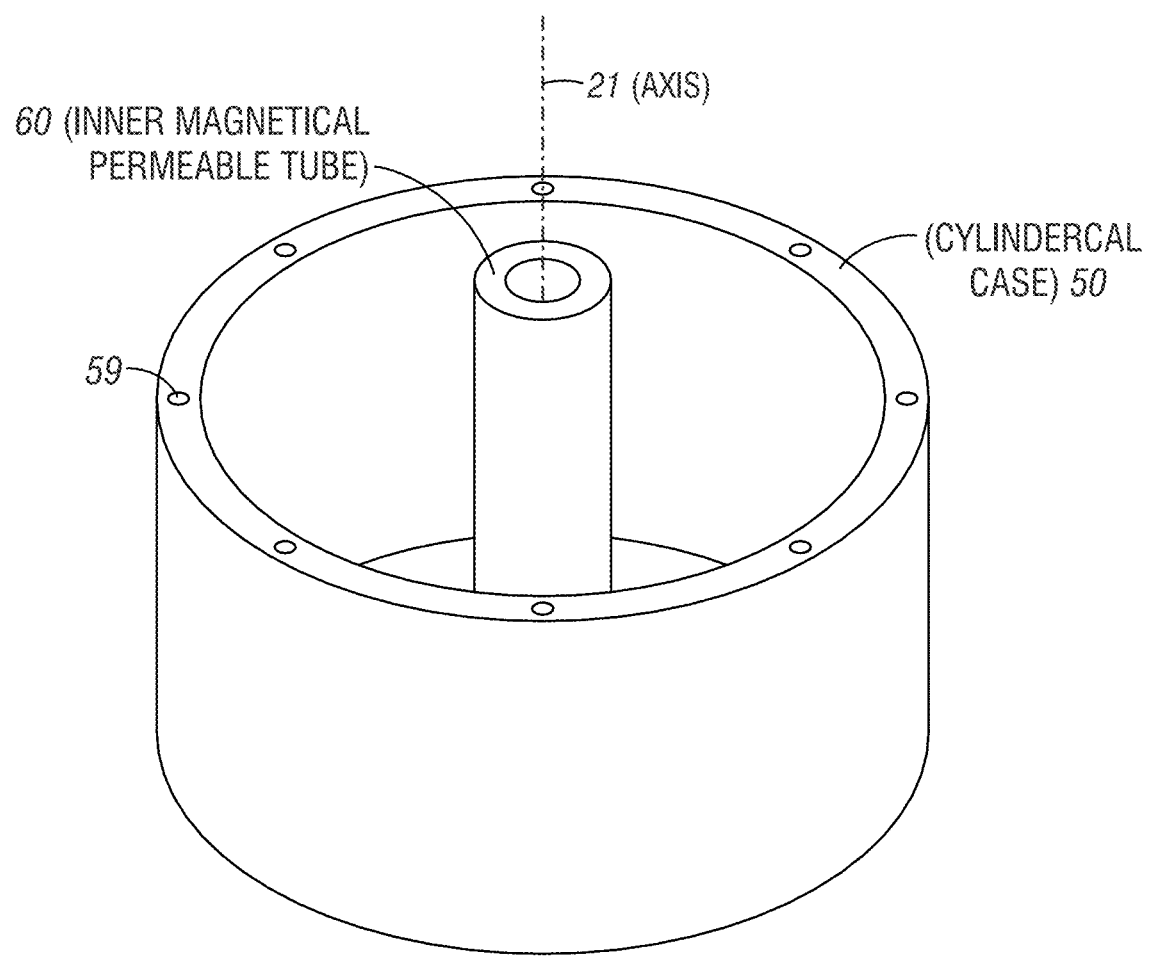
Figure 28:
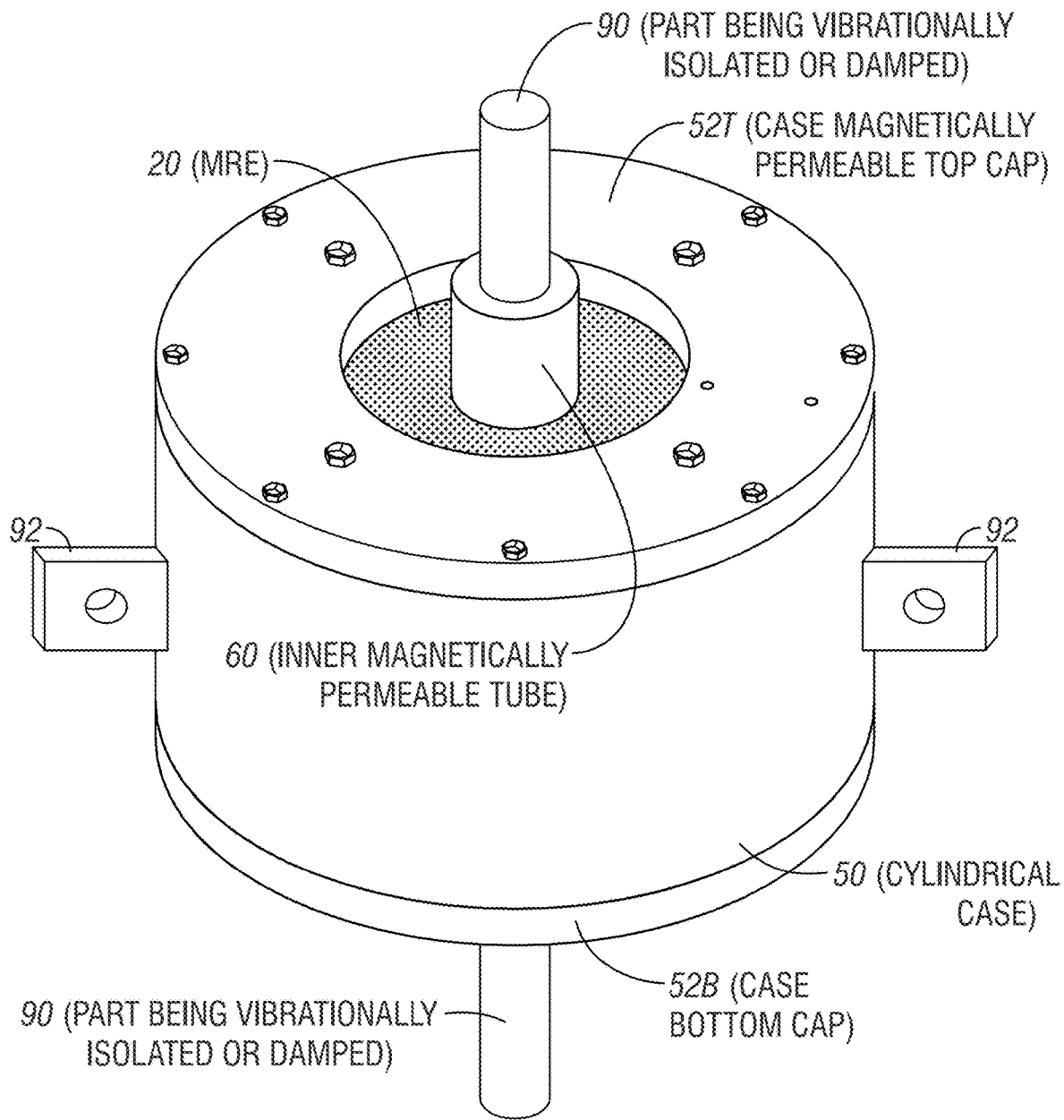

FIG. 28 is similar to FIG. 5A but includes a diagrammatic depiction of one example of a mechanical load for the assembled bushing.

DETAILED DESCRIPTION OF EXEMPLARY EMBODIMENTS OF THE INVENTION

Overview

For further understanding of the invention and its aspects, possible exemplary embodiments will now be discussed in detail. It is to be understood that these embodiments are neither exclusive nor inclusive of all possible embodiments of the invention. Those skilled in this technical art will appreciate and understand that the invention can take many forms and embodiments.

For example, variations obvious to those skilled in the art will be included within the invention. Additionally, those of skill in the art will appreciate that although several embodiments are discussed in the context of a semi-active suspension bushing (SSB), including a particular geometry of components, aspects of the invention can be applied to other end uses, and in different geometries, utilizing at least one aspect or several aspects in combination according to the invention.

The descriptions below are intended to give the reader details about how to make and use aspects of the invention, design choices and criteria regarding the same, and some discussion of variations or options and alternatives.

Generalized Aspect

One aspect of the disclosed invention includes the combination of an MRE form factor extending substantially along the magnetic axis of an electromagnetic-field-producing coil, and at or near the coil, to be at or near the magnetic field radially generated by the coil along its magnetic axis when appropriately energized. There is no appreciable magnetic shielding between the coil and the MRE. Parameters such as thickness of the MRE, number of turns of the coil and coil wire gauge, and amount of current used to energize the coil are selected for an end-use. Current supplied to the coil produces a magnetic field radially into the MRE along the coil's magnetic axis both inside the core of the coil and for some distance outside the core. This geometric positioning of the MRE relative to the magnetic field of the coil promotes benefits, including but not necessarily limited to, a uniform magnetic flux density within the MRE. Such uniformity promotes effective control and adjustment of stiffness of the MRE through appropriate control circuitry, as well as other benefits, including but not limited to efficient magnetic flux density per unit of electrical power input which can deter potentially detrimental effects on the MRE from Joule or Ohmic heating from resistive losses when current flows through the coil.

This geometric relationship is illustrated in the non-limiting examples of FIG. 1. The left-hand embodiment 10(V1) in FIG. 1 has the MRE 20 along the coil 30. The MRE 20 is substantially radially outward of and along axis 21 of coil 30. The center embodiment 10(V2) in FIG. 1 has the MRE 20 along coil 30 generally radially of and along the magnetic axis 21 of coil 30, but the MRE is radially internal of coil 20. The MRE is all within the core of the coil. The right-side embodiment 10(V3) is similar in geometry to 10(V2), but as seen in FIG. 1, embodiment 10(V2) has different component dimensions.

Figure 2:
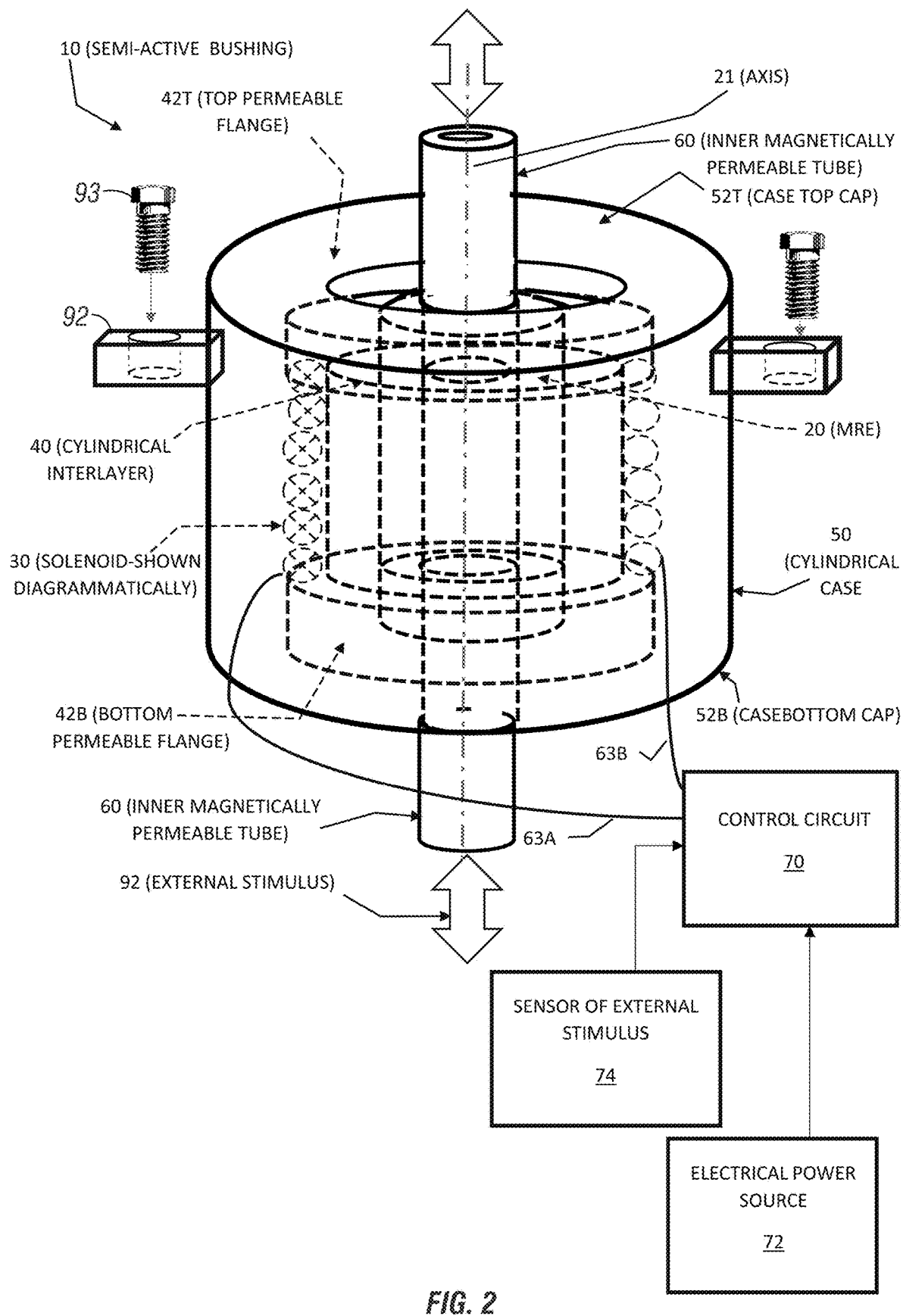
Figure 3A:
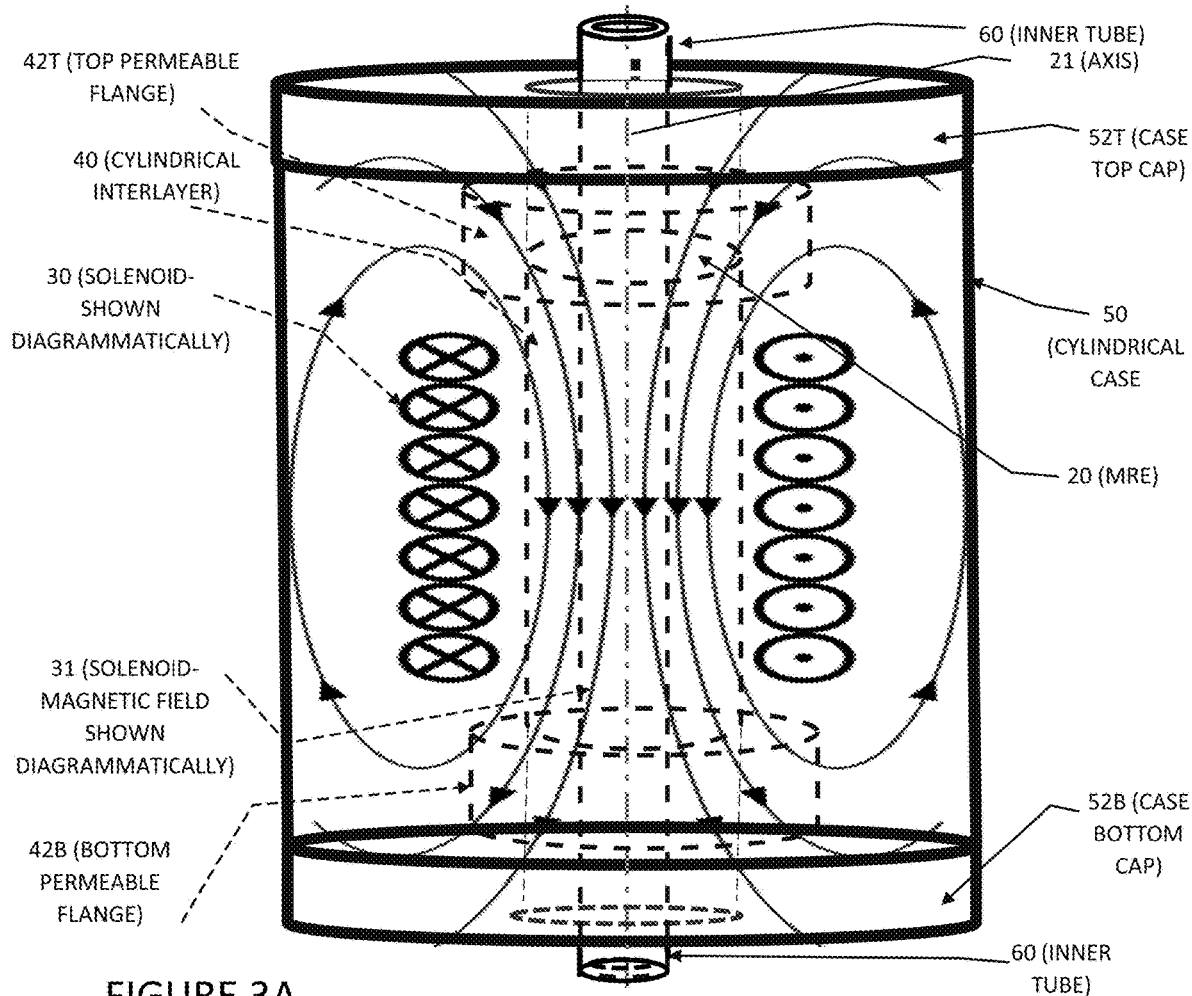
FIGS. 3A and 3B are diagrammatic depictions of the magnetic field created by embodiments of the geometry of V2 and V3 of FIGS. 1 and 2.
Figure 3B:
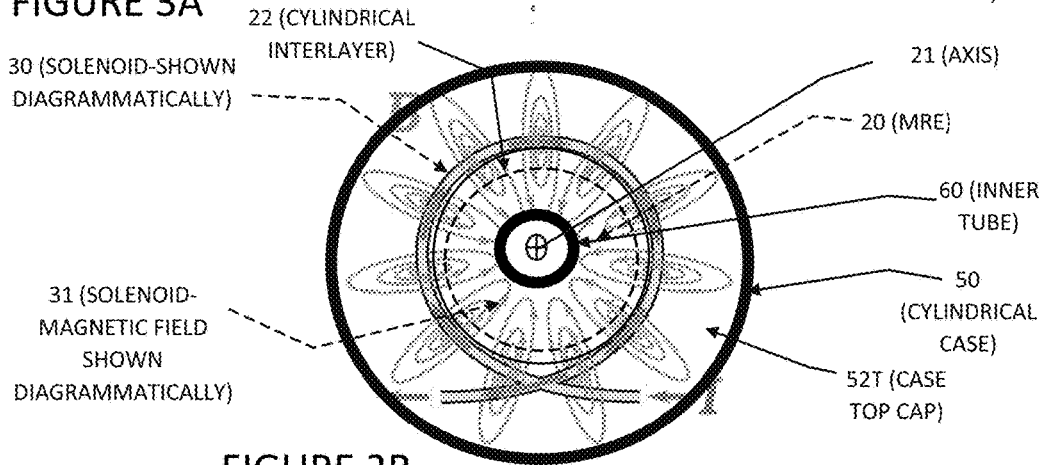
Figure 4:
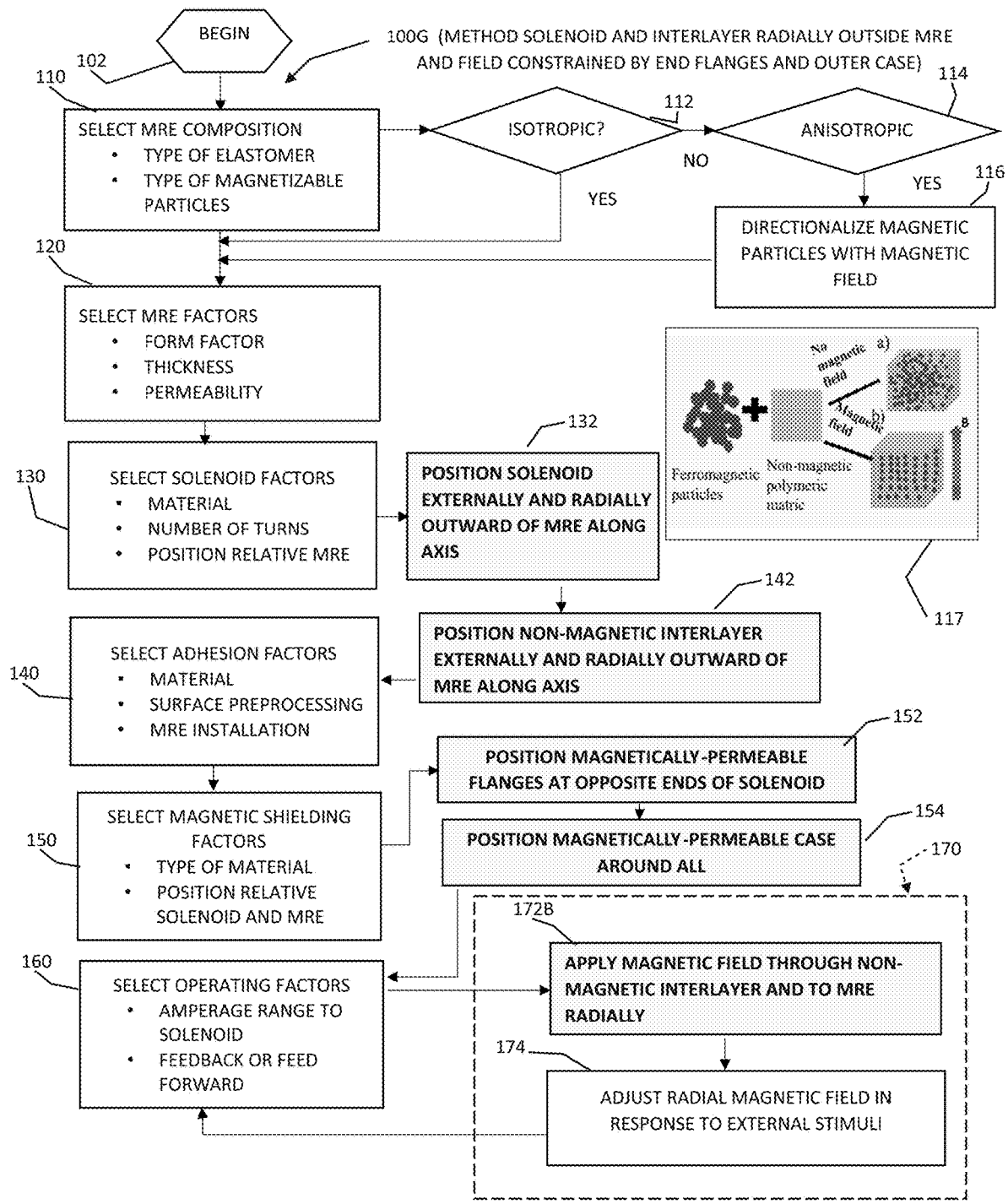
FIG. 4 is a diagrammatically depiction of design parameters and selections for at least the embodiments of V1, V2 of FIG. 1 and FIGS. 2 and 3A-B.

The basic combination or geometry illustrated in the center and right-hand versions 10(V2) and 10(V3) of FIG. 1 is further illustrated FIGS. 2-4. FIGS. 5-20 illustrate a non-limiting specific implementation of that 10(V2)/10(V3) geometry, including particular materials and assembly steps. FIGS. 21A through 26C illustrate non-limiting variations and options on the generalized aspect according to the invention, including embodiments using one or more aspects of the geometry of 10(V1) at FIGS. 21A and 22A, and one or more aspects of geometry of 10(V2) and 10(V3). All utilize the aspect of having the MRE along the magnetic axis of a coil, and at or near the coil, and without substantial magnetic shielding between the MRE and the coil.

As will be appreciated by those skilled in the art with reference to the description and the referenced drawings, this generalized aspect of the invention can be made and used in a variety of ways. Whether the form factor of the MRE (e.g. size, shape, thickness etc.), the composition of the MRE (e.g. type of elastomer, type, form factor, and concentration of material particles), and other components for a particular end use (e.g. internal or external parts, connections, etc.), the combination of a MRE (at least a portion or all) along the magnetic axis of a coil can produce one or more of the objects, features, or advantages of the invention.

Referring again to FIGS. 1-4 and 21-26, a designer can evaluate and balance a number of factors in designing a device 10 according to one or more aspects of the present invention. These figures illustrate examples of the combination of an MRE material 20 in which the MRE is along a substantial length of a coil 30, and at or near the coil 30, and either at least partially embedded in the core of coil 30 along its magnetic axis 21 (geometry of 10(V1) on left side of FIG. 1) or the MRE 20 entirely within the core of coil 30 (geometry of 10(V2) and 10(V3) in right side of FIG. 1). For a reference point, axis 21 is sometimes designated to represent both the magnetic axis of coil 30 and the axis of MRE material 20 inside coil 30. The coil 30 and MRE 20 are at least generally co-axial to axis 21. By appropriate connection of the coil 30 to a source of electrical power (e.g., electrical connections 63A and B), the flow of current generates a magnetic field in the MRE material 20. For simplicity, the coil 30 is indicated in 2D cross-section in FIGS. 3A and 3B. Likewise, magnetic field 31 is illustrated in 2D in the views of FIGS. 3A and 3B. A better sense of the 3D field relative to axis 21 can be seen in FIGS. 21D-F. A helical coil 30 and its magnetic field in three dimensions are well-known to those skilled in the art. Background information can be seen at U.S. Pat. No. 7,086,507 B2 and U.S. Pat. No. 9,581,214 B2, both incorporated by reference herein.

Other non-limiting examples are shown in the drawings. Some have the coil interiorly of the MRE (left side FIG. 1). Some have the MRE at least partially embedded in the MRE, so that at least a portion of the MRE is in the core of the coil but, particularly, the coil is at or near the MRE. Some have inner and/or outer members relative the coil, such as in the case of a bushing where an inner axial tube or cylinder and adhered to the MRE is in the core of the coil to connect to a load and/or an outer case encloses the coil and MRE. Thus, the MRE is near and along a substantial length of the coil.

Importantly, this is not just the positioning of a coil in or near an MRE material. It is positioning at least a portion of the MRE material near the coil and along a substantial length of the magnetic axis of the coil, all without any appreciable magnetic shielding between the coil and that portion of the MRE and selecting a number of turns, wire size, and operating current of the coil to operate effectively considering the magnetic flux density needed and any temperature limits for a given application.

In embodiments 10(V2) and 10(V3) of FIG. 1B, MRE 20 is emplaced between an inner tube 60 and a tubular interlayer 40. One technique to do so is to direct uncured flowable MRE composition to that space and cure it in place. An example would be to cast uncured MRE, according to a pre-selected composition, in place, and then cure the MRE in place. Techniques to do so are well-known to those skilled in the art. Coil 30 is wound around the exterior of non-magnetic interlayer 40. As such, all of MRE 20 is in the core of coil 30, coil 30 is radially around MRE 20, and non-magnetic interlayer 40 does not introduce substantial magnetic shielding of MRE 20 from any magnetic field generated from coil 30. Interlayer is effectively transparent to the magnetic field produced by coil 30. This is diagrammatically illustrated in FIGS. 3A-B. Despite interlayer 40, the magnetic field 31 from operation of coil 30 reaches MRE 20 without substantial losses and effectively uniformly throughout MRE 20. Non-magnetic material (e.g., aluminum) does not appreciable block the magnetic field to the MRE generated by the coil.

As will be further appreciated by those skilled in the art, uncured MRE composition is typically isotropic in regard to the orientations of the ferromagnetic particles in the composition. In some embodiments, the isotropic particle orientations in the uncured composition can be cured in place, and stiffness of the cured isotropic MRE adjusted by control of current to the coil. In other embodiments, uncured MRE with isotropic particle orientations can be pre-programmed towards at least a substantially anisotropic particle orientation by casting the uncured MRE composition in place, generating a current through the coil effective to at least substantially align the particles in the uncured composition, and then curing the composition in place. This technique is described in U.S. Pat. Nos. 7,086,507 and 9,581,214, incorporated by reference herein, including benefits to either isotropic or anisotropic alignment in the cured MRE.

As will be further discussed herein, some embodiments could include the coil at least partially embedded in the MRE (e.g. V1-type geometry). As such, consistent with the foregoing, at least a portion of the MRE is thus in the core of the coil, and there is no substantial shielding of the MRE from the magnetic field of the coil. The magnetic field of the coil thus reaches at least that portion of the MRE effectively uniformly and throughout by its placement and operation at and along a substantial length of the coil.

Thus, the generalized embodiment includes a geometry between MRE material and coil of this nature, which allows benefits discussed herein.

There are other configurations, alternatives, and options a designer could create based on this generalized combination. Non-limiting examples are discussed herein.

Thus, a part of the generalized aspect of the invention is design and fabrication of an apparatus according to one or more aspects of the invention. The designer would typically consider a variety of factors and parameters to design an end use apparatus. As indicated in method 100A of FIG. 4 (steps after "Begin" at 102), a variety of design factors can influence the geometry of the MRE material versus the coil for embodiments configured in the general geometry of V2 and V3. Some of those factors include:

a. Selection 110—the composition of the MRE material 20. This can include type of elastomer, type, and form factor of magnetically-responsive particles in the elastomer, and whether or not the MRE is pre-processed to influence its isotropic (step 112) or anisotropic (directional) (steps 114 and 116) stiffness characteristics apriori to its end use. Application of a controlled directional magnetic field (step 116) before the MRE is finalized can introduce directionality in the MRE. See also illustration at 117 in FIG. 2. On the other hand, there are end uses where isotropic properties (step 112) are desired. Those skilled in the art would understand how to do so. In one non-limiting example, a permanent magnet would be directionally coupled to the MRE 20 before it is finally cured to pre-align the MRE particles.
  b. Selection 120—Other MRE factors. As indicated, form factor, thickness (relative to a magnetic field) and permeability can be designed, including how they cooperate for MRE performance.
  c. Selection 130—Coil factors. Design choices of coil material, number of turns (including number of layers of turns), and position relative the MRE 20 are possible, including cooperation between other selections for MRE performance.
  d. Selection 140—MRE adhesion factors. Some embodiments need adhesion of the MRE to adjacent surfaces of components of the device. This is particularly typically the case with an SSB. Techniques to promote good adhesion for long useful life for the range of mechanical loads likely to be experienced for a given end-use are discussed infra.
  e. Selection 150—Magnetic shielding. A variety of configurations make use of material properties that can effectively provide either magnetic-transparency or magnetic permeability to magnetic field 31 of coil 30.
  f. Selection 160—Operating factors. One example is interplay between number of coils of coil 30 and amount of electrical power needed to effectively control MRE stiffness for thermal management. This can be important to deterring degradation or failure of MRE performance.
  g. Additionally, as indicated diagrammatically at 170, control circuitry to control electrical current to coil 30 can take a variety of forms according to designer need or desire. The circuitry can supply electric current to operate coil 30 to apply a magnetic field to MRE 20 (step 172), as well as adjust current in response to external stimuli (step 174).

Each of the foregoing are considerations in the context of the MRE positioned radially along at least a substantial part of the magnetic axis of the coil, at or near the coil, and without appreciable magnetic shielding between the coil and the MRE in configurations/geometries as in either V1 or V2 or V3 with a coil and operating current selected for a given end use, MRE thickness, and other parameters.

FIG. 2 illustrates one non-limiting final assembled combination for end use as a bushing, vibration isolator, or vibrational damper of the geometry of V2 and V3, including diagrammatically illustrating mechanical coupling to a mechanical load or external stimuli, and a control circuit 70 with electrical power source 72 responsive to a sensor 74 for varying current to coil 30. U.S. Pat. No. 7,086,507 B2 and U.S. Pat. No. 9,581,214 B2, both incorporated by reference herein, discuss examples of such control for active or semi-active motion damping or vibration isolation. See, also, Sergio M. Savaresi et. al., 2010, Semi-active Suspension Control Design for Vehicles, Chapter 1, cited above and incorporated by reference herein. As will be appreciated by those skilled in the art, a variety of other final assemblies for this end use or for other end uses are possible. For example, the embodiment V1 of FIG. 1 could be similarly configured for end-use operation as far as mounting between a load (truck cab) and a rigid base (e.g. truck frame) and how electrical power is controlled to the coil for a semi-active SSB or other use.

As indicated in FIG. 4, the designer would select the components for an intended end use, including during all states of operation. For example, the interplay between the type of MRE composition, size of the MRE, any pre-setting of MRE particle alignment, size of coil wire, amount of electrical energy supplied to the coil, and other factors will be considered. The specific embodiments infra provide quantified examples of at least some of these factors. But they can vary according to need or desire.

For example, this description and drawings provide quantified examples of at least some of these factors for specific embodiments, some including specific reference to semi-active bushings. See, e.g., FIGS. 15-20, discussed herein.

Thermal considerations are relevant to many MRE implementations and can be particularly pertinent to SSBs. Discussion of thermal effects on MRE can be found in the literature. One example specific to bushings is at Yu et al, 2016 Smart Mater. Struct. 25 115039 Thermal effects on the laminated magnetorheological elastomer isolator, incorporated by reference herein. FIGS. 17B-C, 18D, and 19B give specific information regarding embodiments with geometries of V1, V2, and V3.

Specific Example 1 (Basic Geometry of V2 and V3)

A specific example according to aspects of the invention and relating to a bushing (e.g. an SSB) is now set forth. It utilizes the configuration of an MRE material within the core of a coil, with an interlayer between coil and MRE, as well as an inner member generally along the axis of the MRE. It also uses magnetic shielding advantageously. It includes the generalized aspect of the invention of an MRE material substantially along the magnetic axis of the coil, and at or near the coil, without appreciable magnetic shielding between the MRE and the coil, but in the configuration of V2 or V3, the MRE is all within the core of the coil.

With specific reference to FIGS. 5-20 (and any sub-parts), a specific example of a bushing 10(V2) is illustrated, including details of the individual components and how they are assembled. The same reference numerals in FIGS. 1-2 are intended to indicate at least analogous components in FIGS. 5-20.

Parts/Components

The basic components of this non-limiting embodiment of bushing 10(V2) are set forth in Table 1 below. Dimensions and materials are indicated. As appreciated by those skilled in the art, variations of any of these are possible depending on designer need or desire.

In this specific example, the overall size of bushing 10(V2) is the size of its outer case, here roughly 100 mm outer diameter and 100 mm height (roughly 4 inches dia. by 4 inches height). This bushing 10(V2) utilizes the combination of at least a portion of the MRE 20 inside the core of coil 30. Here all of MRE 20 is in the core of coil 30.

This bushing 1(V2) includes other components. Coil 30 is wound around a bobbin 49 of a tubular non-magnetic interlayer 40 with opposite magnetic end flanges 42T and B. MRE 20 is molded in place between and adheres to interlayer 40 and inner tube 60 which, during molding, is held axially relative to inter-layer 40. Outer and inner magnetic cylinders 50 and 60 form an outer protective case and an inner attachment to a load.

This combination adds further features to this bushing 10(V2) over and above the geometry of MRE 20 to coil 30. As further discussed herein, the non-magnetic interlayer 40 passes the magnetic field of coil 30 to MRE 20. The magnetic end flanges 42T,B at opposite ends of interlayer 40, and the magnetic inner tube 60, outer cylinder 50, and end caps 52T,B contain that magnetic field to MRE 20. As such, further benefits can be realized regarding performance of bushing 10(V2).

FIGS. 5A-D illustrate an assembled bushing 10(V2) of this type, as well as how these components are situated relative to one another.

TABLE 1

|  | MRE 20 (FIG. 14A-B) | Coil 30 wound on bobbin (FIG. 11) | Bobbin Interlayer 40 (FIG. 6) | Bobbin end flanges 42T and B (FIGS. 7A-B) | Case outer cylinder 50 (FIG. 9) | Case end caps 52T and B of outer cylinder (FIGS. 8A-B) | Inside cylinder 60 (FIG. 9) |
|---|---|---|---|---|---|---|---|
| Material | Mixture of polyurethane (PU) (30 or 60 shore) and iron (Fe) particles 5/10 μm avg. dia., at 30:70 wt. % PU:Fe | Copper (Cu) 0.51 mm dia. Cu, 24 AWG | Non-magnetic: e.g. polymer, Plastic, Teflon, 6061 Al, austenitic stainless steel (e.g. 316 SS or 200 and 300 series) | soft iron, high magnetic steel | Magnetic: e.g., any ferromagnetic material that blocks/shields a magnetic field, e.g. stainless martensitic, common carbon or mild steel, low alloy steel, tool steel. AISI 1020 high magnetic carbon steel. | Magnetic: e.g., any ferromagnetic material that blocks/shields a magnetic field, e.g. stainless martensitic, common carbon or mild steel, low alloy steel, tool steel. AISI 1020 high magnetic carbon steel. | Magnetic: e.g., any ferromagnetic material that blocks/shields a magnetic field, e.g. stainless martensitic, common carbon or mild steel, low alloy steel, tool steel. AISI 1020 high magnetic carbon steel. |
| Outside diameter (OD) | 9.35 mm | 15 mm (10 turns per layer, 29 layers) | 49.6 mm | 81.6 mm | 101.6 mm | 101.6 mm | 24.9 mm |
| Inside diameter (ID) |  |  | 43.6 mm | 43.6 mm | 81.6 mm | 43.6 mm | 17.15 mm |
| Thickness |  |  | 3 mm wall | 19 mm | 10 mm wall | 58 mm | 3.5 mm wall |
| Height |  |  | 50 mm | 6.25 mm | 62.5 mm | 11 mm | 106.9 mm |

How to Assemble

With particular reference to FIGS. 10 to 14A-D, one technique of assembling the components into the final bushing 10(V2) is illustrated.

Step 1

Bobbin 49 is created by attaching end flanges or coil spacers 42T and B to opposite ends of tubular interlayer 40 with screws 44 through the small apertures 43 shown in FIG. 10 that coincide with the wall thickness of interlayer 40. In this non-limiting example, they are 1 mm dia. screw holes 43 and appropriate screws 44 (e.g. self-tapping if holes 43 are not threaded or tapped) pass through them and down to a 6.25 mm screw depth into interlayer 40 to hold coil spacers 42T,B securely to interlayer 40. FIG. 10B illustrates that the inner-facing sides of spacers 42T and B could have a ledge 96 between annular interior portions 95 and 97 that presents a smaller diameter than the ends of interlayer 40. Ledges 96 would be mechanical stops in both axial and radial directions to seat interlayer 40 into spacers 42T and B when assembled as in FIG. 10B.

Step 2

Figure 11:
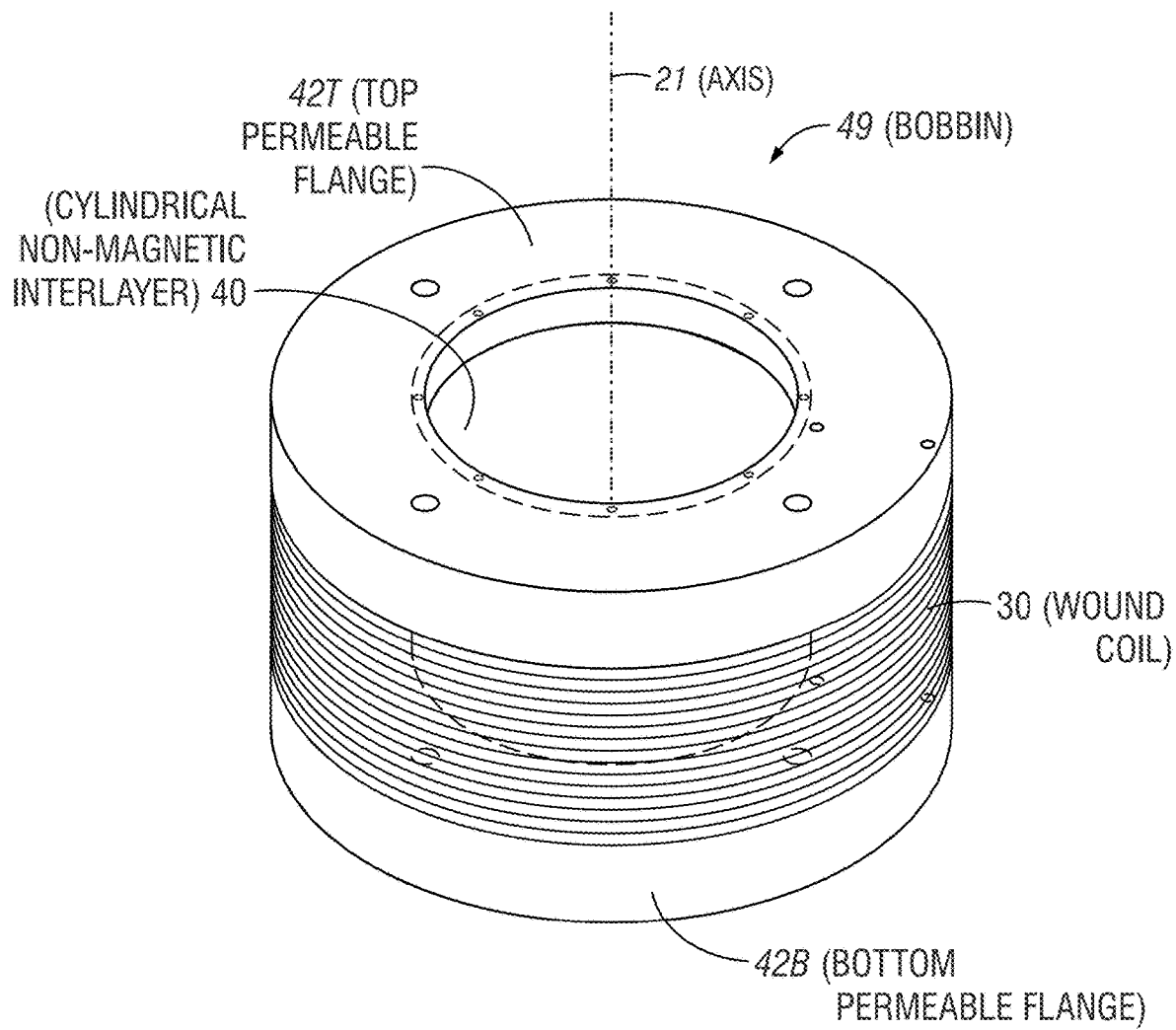

Coil 30 is then wrapped around non-magnetic aluminum (e.g. 6061 Al) inter-layer 40 (see also FIG. 6) supported by low carbon steel magnetic coil spacers 42T,B at either end (FIG. 11). This can be by known techniques (e.g. automated coil wrapping machine). The aluminum layer 40 allows the magnetic field to pass into the magnetorheological elastomer (MRE) 20 (shown molded/cured in place in FIGS. 14A-B), while the coil spacers 42 keep the copper coil an optimal distance from the ends of the bushing 10, which has been shown to increase the magnetic flux density through the MRE 20. Coil 30 is wound on bobbin 49 with multiple turns in multiple layers according to the type and size of coil wire, available space on bobbin 49, and intended magnetic field to be produced by coil 30. As will be appreciated by those skilled in the art, this can vary from bushing to bushing design. Opposite terminal ends 63A/B of coil 30 would be configured to connect to a source of electrical power (e.g. see electrical power source diagrammatically in FIG. 2).

Step 3

The bobbin 49 (inter-layer 40 with coil spacers 42) is then installed axially in a complementary fashion between two magnetic cylinders (outer case cylinder 50 and inner tube 60 along axis 21) as shown in FIG. 12. The outside diameters of coil spacers 42T,B fit in a complementary fashion to the inner diameter of outer cylinder 50 to hold bobbin 49 in place relative to the axis of bushing 10 (i.e. bobbin 49 cannot move in a direction lateral to axis 21).

Inner tube 60 is held along the axis by some technique (e.g. manually, by some jig or fixture, or otherwise) in the relationship shown in FIG. 12. It is spaced from interlayer 40 such that the inner diameter of interlayer 40 is spaced from but generally co-axial to the center long axis of inner tube 60.

Step 4

Figure 13:
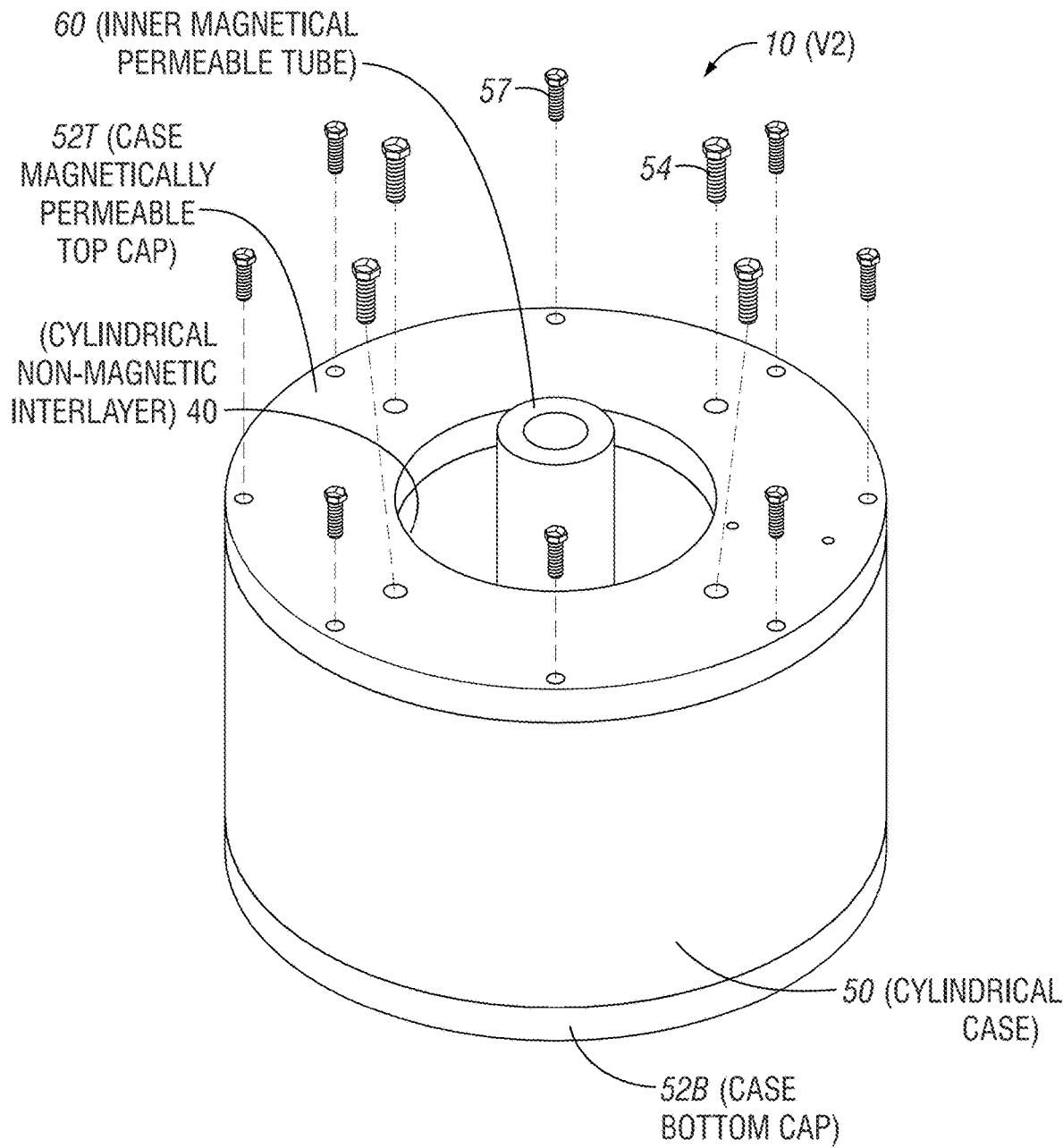

Magnetic locking layers 52T and B, FIG. 13 are then installed to opposite ends of outer cylinder 50 and to bobbin 49 to lock bobbin 49 in place, but also help limit stray magnetic field, and allow for a pathway of least reluctance to complete the magnetic circuit.

As indicated at FIG. 13, this is accomplished by one set of machine screws 54 through the set of through-holes 55 in each locking layer 52T and B closest to the device axis. In one example they are 6.35 mm diameter screw holes with 2.5 mm indentations or counter-sinks 53 on their inner-facing sides to accommodate the exposed screw heads of the screws 44 used to attach the coil spacers 42T, B to interlayer 40. These machine screws 54 would extend and be screwed into the larger threaded apertures 56 nearer the outer diameter of each coil spacer 42T,B (see again FIG. 11).

Then a second set of machine screws 57 would be passed through the through-holes 58 towards the outer perimeter of each locking layer 52T, B into complementary threaded apertures in outer cylinder 50 to fully lock the locking layers 52T,B to cylinder 50, and thus also fully locking bobbin 49 inside cylinder 50 and its secured locking plates 52T,B. Appropriate machine screws 57 pass through these 6.35 mm holes 58 and are threaded into threaded apertures 59 to a 3.25 mm screw depth in wall of outer cylinder 50 in this example.

Step 5

Figure 14A:
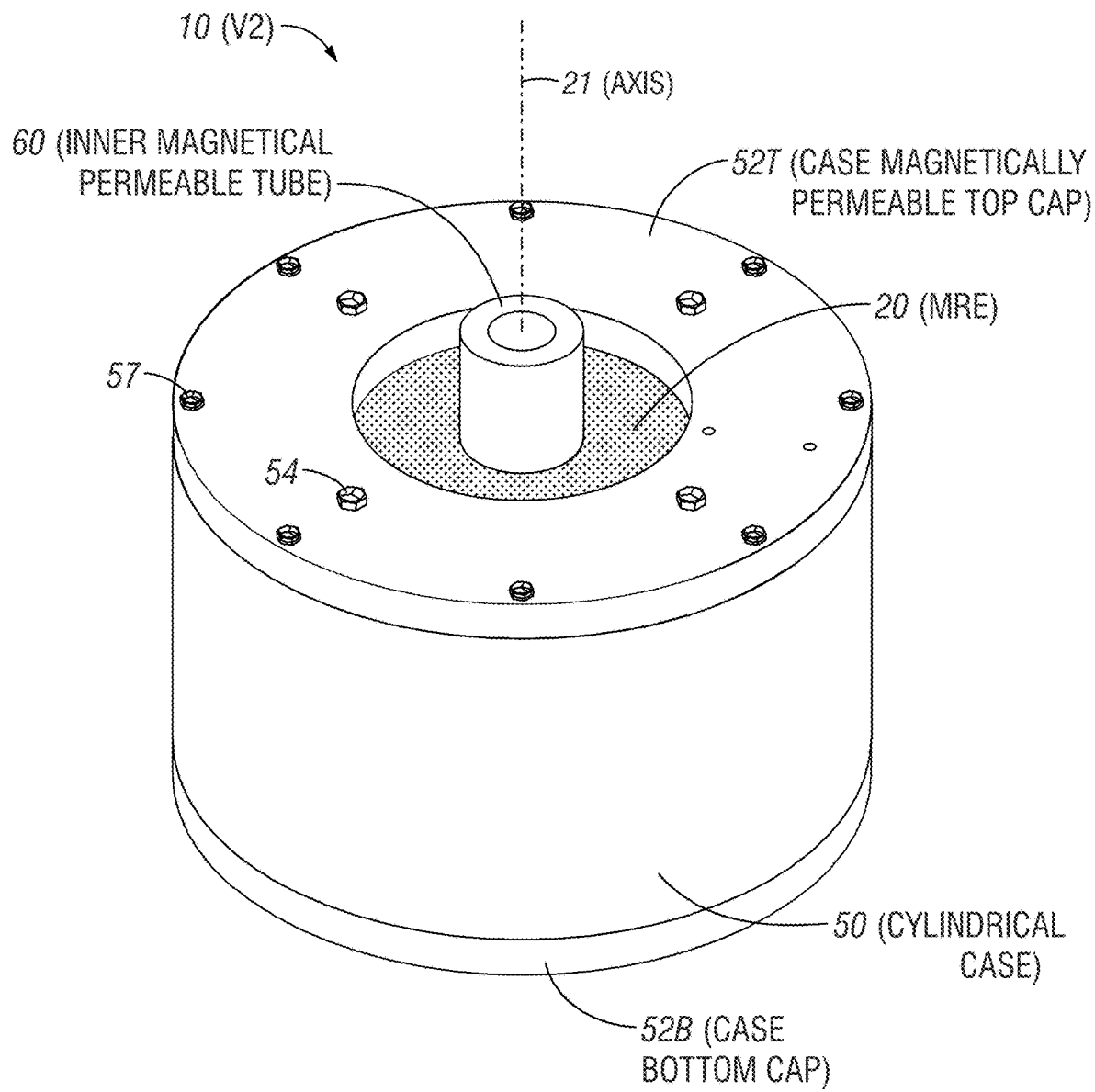
Figure 14B:
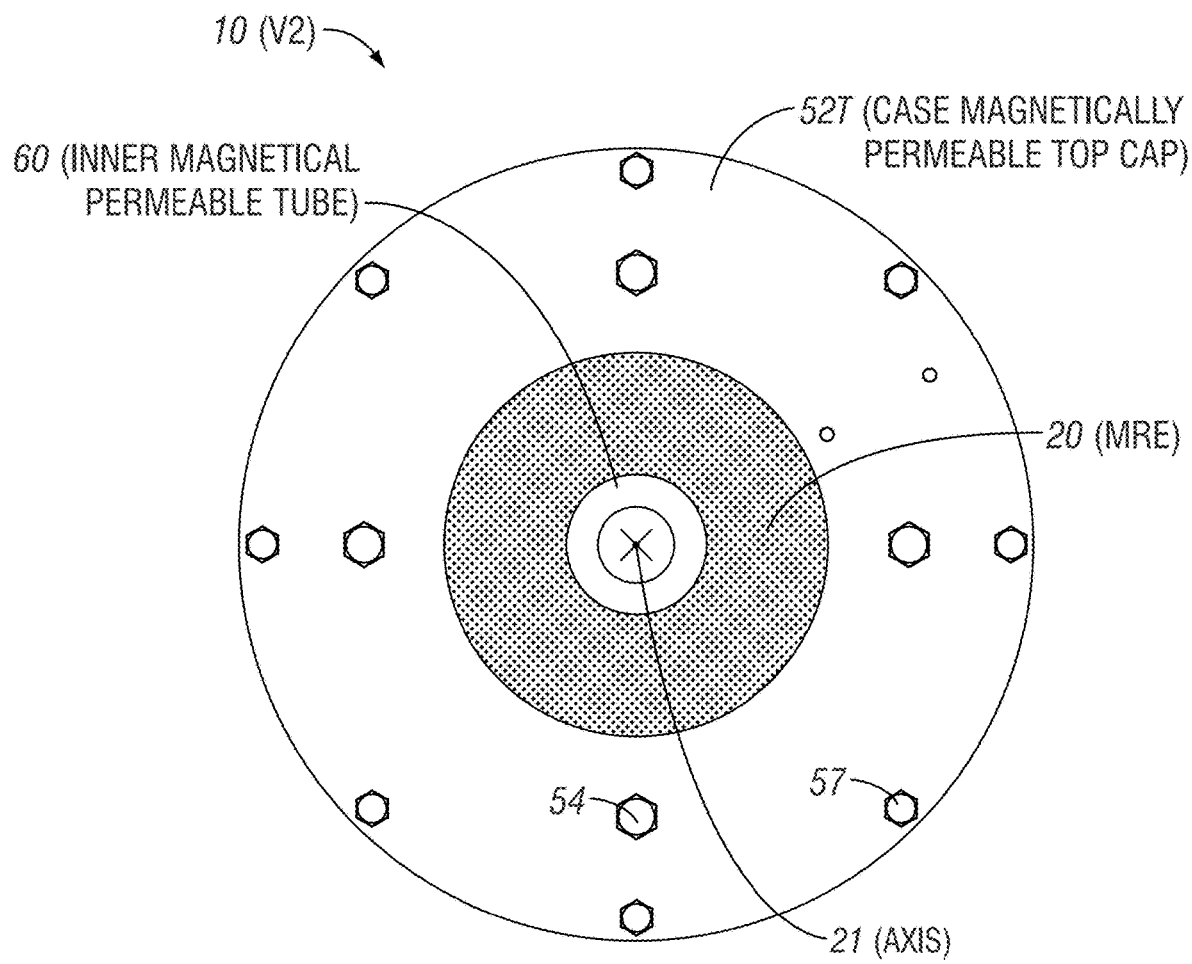
Figure 14C:
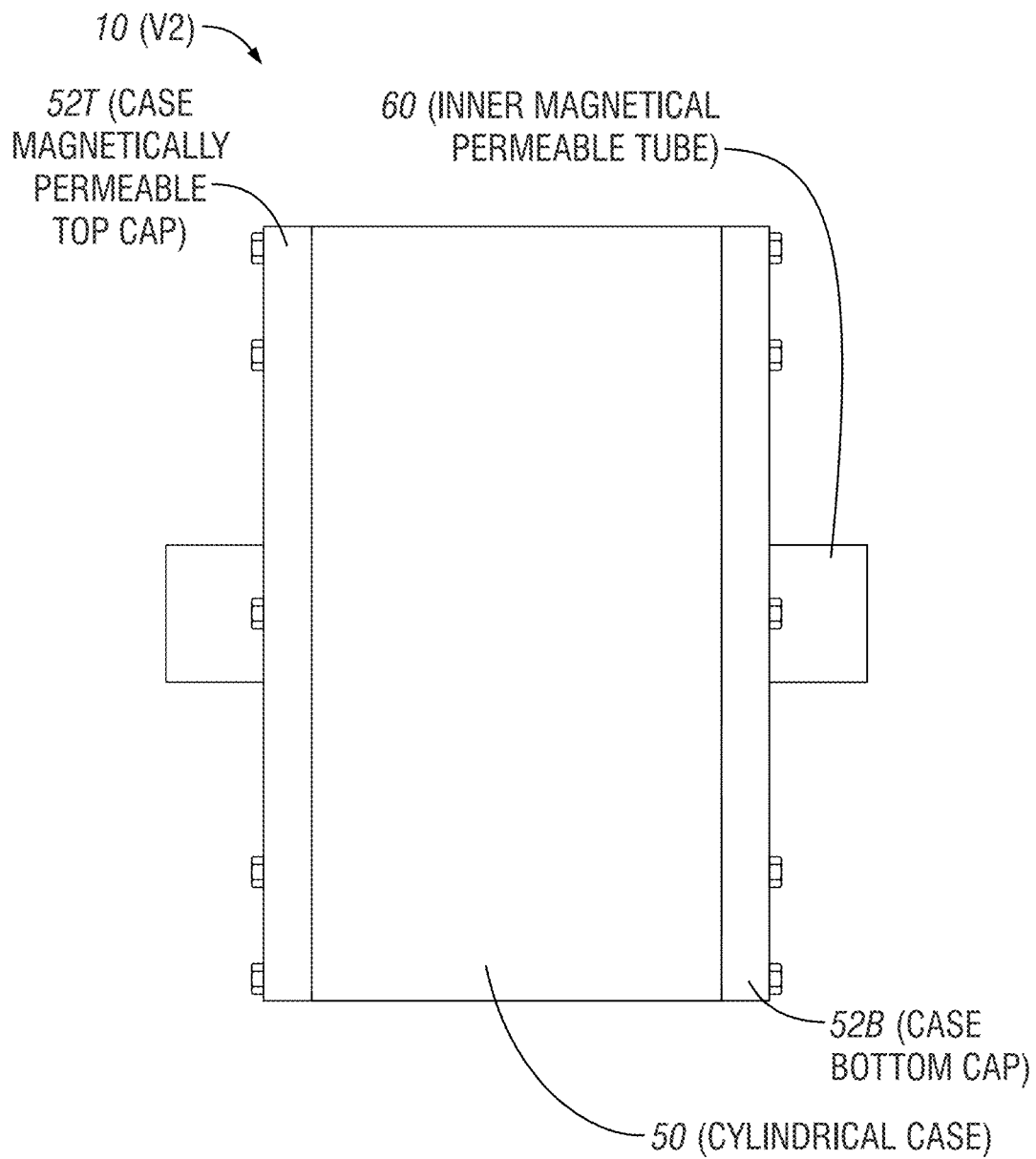
Figure 14D:
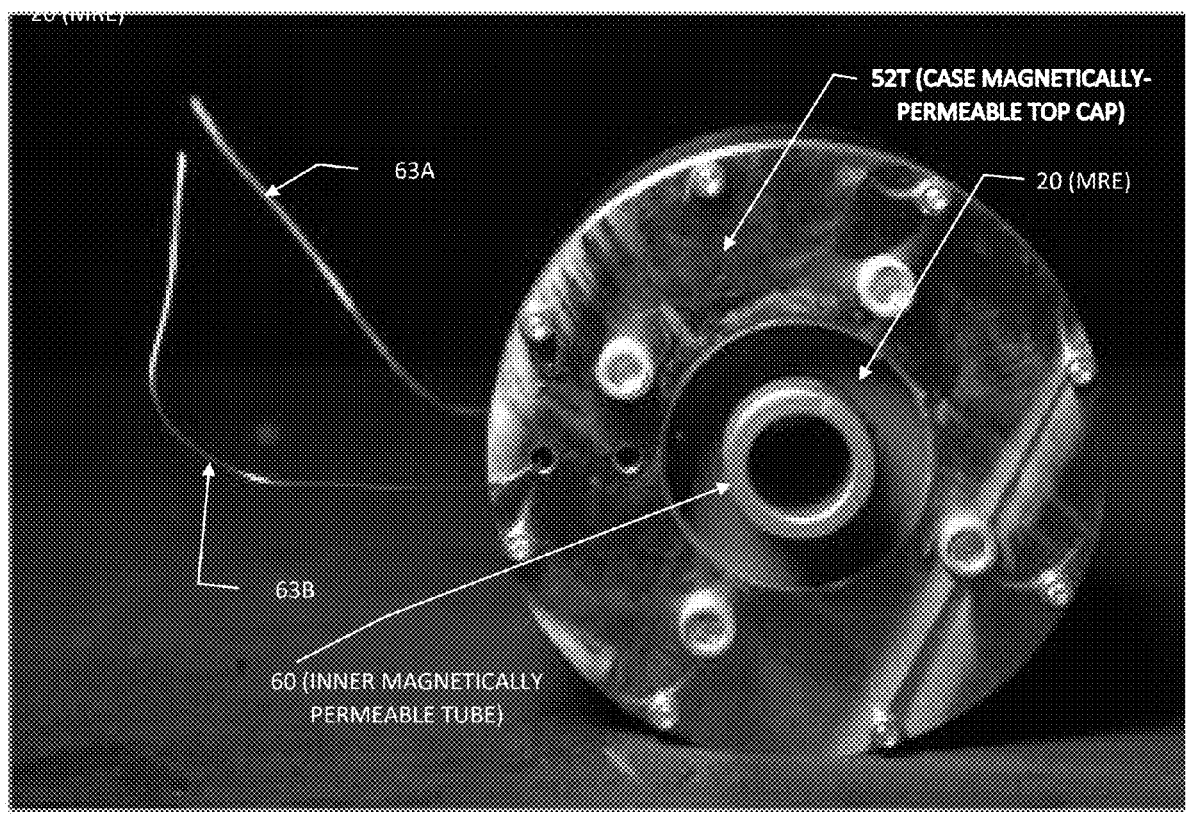

The space between the interlayer 40 of the locked-in-place bobbin 49 and the exterior of inner tube 60 is filled with uncured MRE that has been selected for use (see FIGS. 14A and B). This can be by any number of techniques, including molding techniques. In this example, a mold (not shown) would allow casting of the uncured MRE into that space, and then hold it there (in the shape shown in FIG. 14A), again while inner tube 60 is held in axial position during curing of the MRE.

Using appropriate techniques, the uncured MRE is cured in place in that space. The curing is done with process parameters to promote a final state of the MRE for bushing purposes, as well as to promote adhesion of the MRE to the inner side of interlayer 40 and the outer side of inner tube 60. Also, the designer pre-selects the composition of the MRE mixture (e.g. type of elastomer, type and size of magnetic particles, and proportions of each in the uncured mixture).

Once cured, MRE 20 provides an elastomeric interface between inner tube 60 and the rest of bushing 10. Any load connected to inner tube 60 would have its forces transferred to cured MRE 20.

As discussed herein, during curing, coil 30 could be supplied with current to influence a specific anisotropic orientation in the iron particles in the MRE mixture from their inherent isotropic orientation in the uncured mixture. This can have advantages. By trial and error, other empirical methods, or based on other information, the amount of current, length of time of application of current, and other parameters can be selected by the designer.

In the embodiment 10(V2), the coil bobbin 49 core (located within the aluminum interlayer 40) consists of the MRE 20 and an inner sleeve 60 that is connected to a mechanical load. The incorporation of a completely magnetic core within the coil bobbin 49 has been shown to increase the MRE flux density when compared to methods that incorporate an MRE on the outside of the coil.

The bushing materials of 10(V2) were also selected to limit heat buildup due to heat generation of the coil. By isolating the MRE 20 from the coil 30 and surrounding the coil 30 with thermally conductive aluminum 40 and steel 50 and 60, the bushing 10 is able to operate at safe temperatures for longer periods of time, and the steady state temperature is drastically reduced when compared with a coil that was directly in contact with the MRE.

The final product 10(V2) (FIGS. 14B-C) is a vibrational isolator that fits the geometric and mechanical damping requirements of a bushing that can be applied to a variety of end uses, including but not limited to, incorporated into cab suspensions for class 8 trucks without any major changes to the cab suspension geometry.

A similar set of components (with the types of differences indicated in the drawings), and similar fabrication and assembly steps can be done for bushing 10(V3).

Operation

As indicated throughout this description, a bushing 10(V2) as described in this Specific Example 1, can be installed between a load and a mounting location and, without more, perform vibration isolation, or other adjustable stiffness applications, based on the cured MRE in place between inner tube 60 and the remainder of bushing 10. The properties of MRE provide a stiffness without any operation of coil 30. As is well-known in the art, control of current through coil 30 can change stiffness of MRE 20. U.S. Pat. No. 10,569,813, incorporated by reference herein, provides a discussion of the same.

Importantly, a designer can select from the various parameters such as indicated in FIG. 4, 23C, 24C, 25C, or 26C according to need or desire. This includes variations and considerations regarding MRE composition, MRE installation, coil composition, position, and operation, and magnetic and surface properties of components at or around the MRE and coil.

Figure 15A:
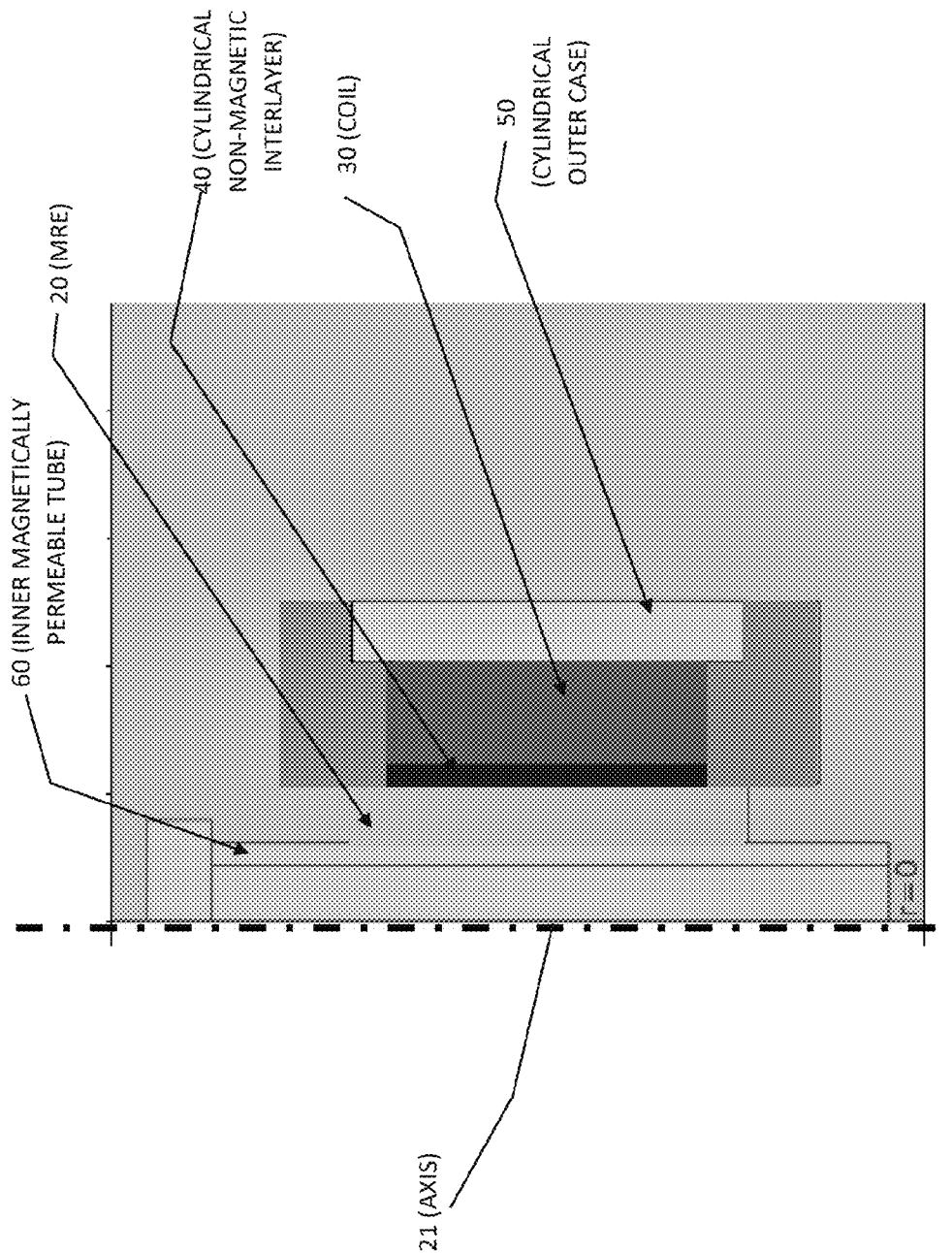

Still further, data and testing results that provide proof of concept and other understanding about the selections and how variations of the same can influence efficacy and performance. For embodiments using the configuration/geometry of bushing versions V2 and V3 (MRE within the core of the coil) examples are as follows:

FIG. 15A illustrates in cross-section the basic geometry of Specific Example 1, namely, the coil is moved radially externally of the MRE, with the MRE entirely in the core of the coil and separated from the coil by interlayer 40. Here the MRE is adhered to the inside of interlayer 40 and to a portion of inner tube 60. Coil spacers 42T,B are at opposite ends of coil 30. It also utilizes a magnetic inner tube 60. Any combination of these features is possible in the final apparatus according to need or desire. For example, just the coil core positioning of the MRE can be used. Or just the magnetic shield radially and/or axially. The interlayer can be used or not. And combinations of two or more of the foregoing are of course possible.

Figure 15B:
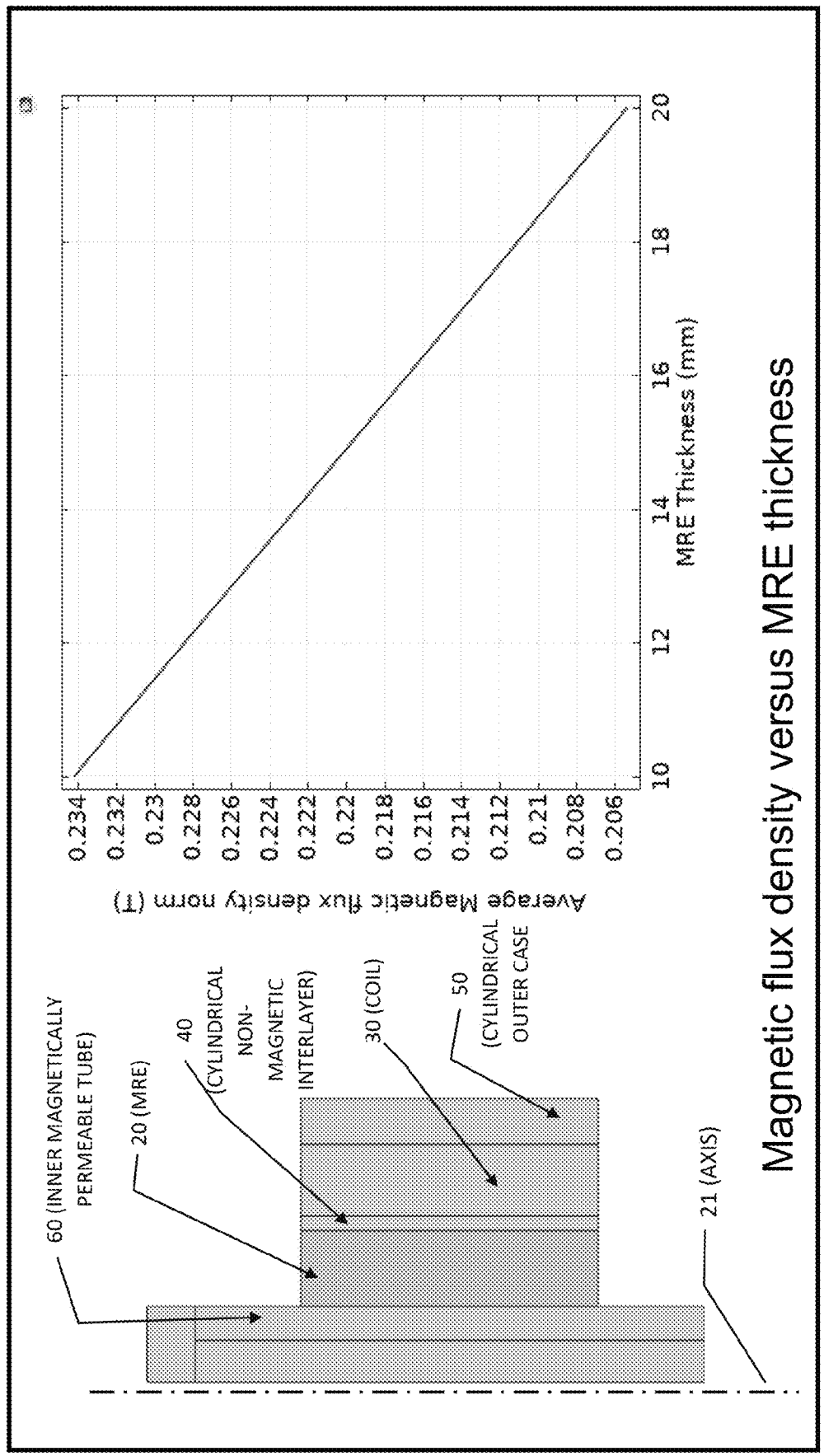

FIG. 15B illustrates how thickness of MRE material can affect magnetic flux density in the arrangement of a bushing 10(V2) or 10(V3) according to Specific Example 1. The designer can utilize this data in the design of a bushing.

Figure 15C:
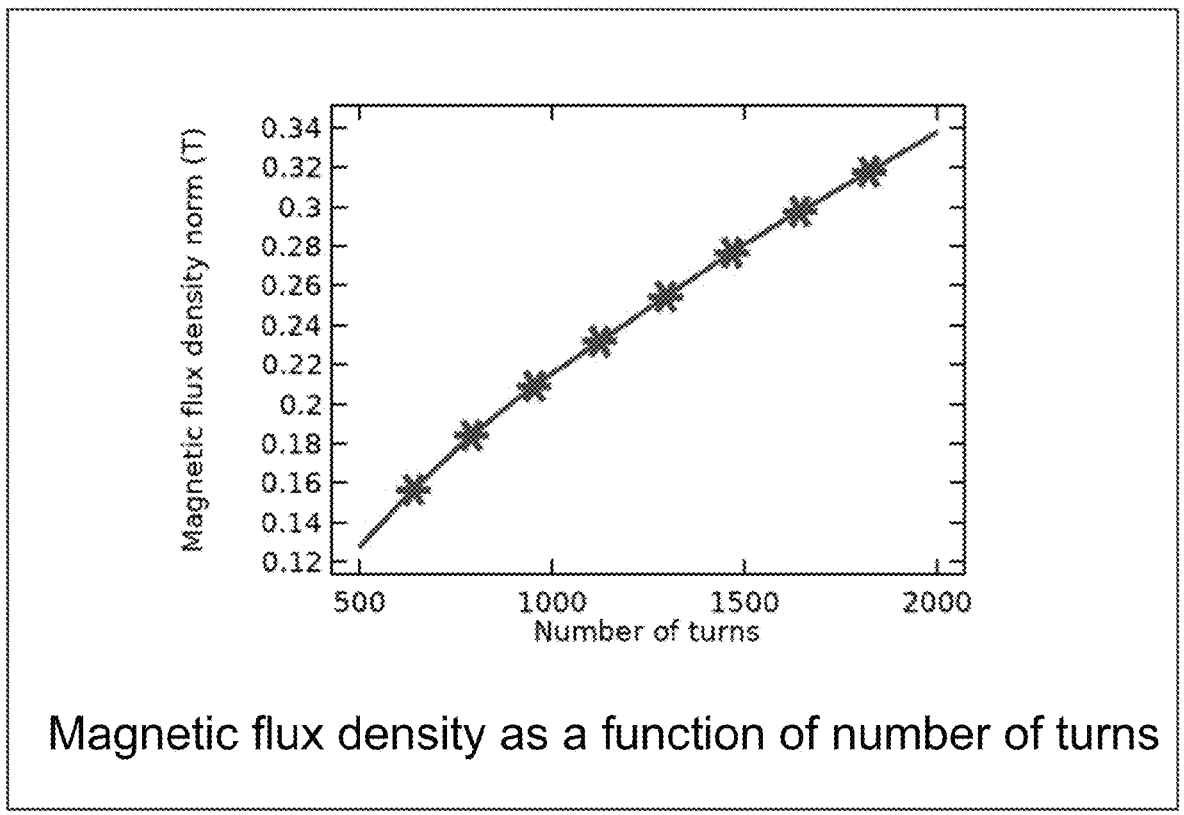
Figure 15D:
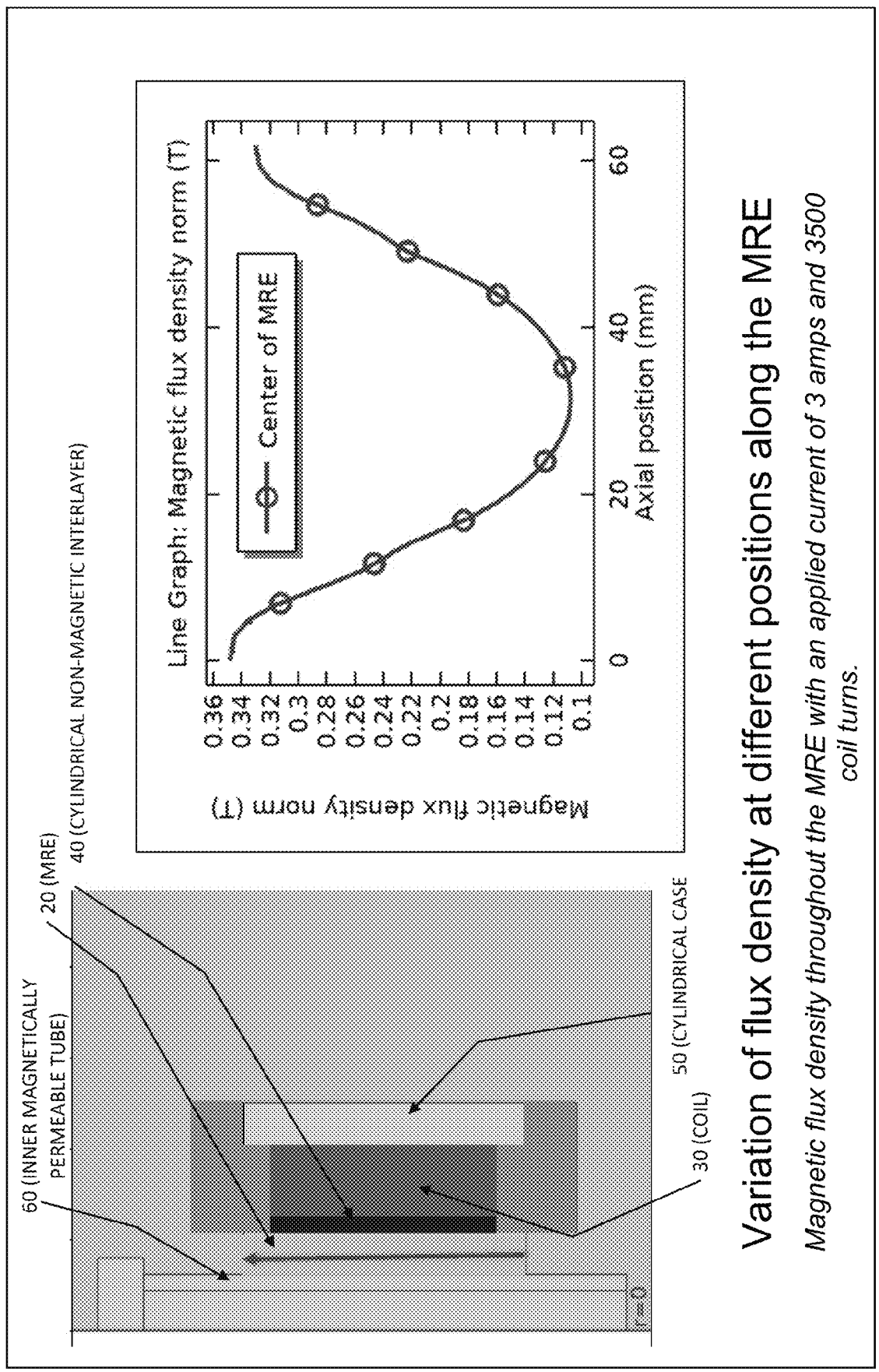

FIGS. 15C-D illustrate data for the configuration of Specific Example 1 relating magnetic flux density as a function of number of turns of coil 30. It is to be understood the phrase "number of turns" includes one or more layers of turns. The designer can utilize this data in the design of a bushing. Note that the image on the left is color-coded to the indexed scale in the middle, where NS(16)=2000 Surface: Magnetic flux density norm (t). The top of scale (red) indicates the highest magnetic flux density (~>1 T); the bottom of scale (dark blue) the lowest (~<0.2 T); with the middle (orange to yellow to green to light blue-top to bottom) intermediate values (~1 T to 0.2 T).

Figure 15E:
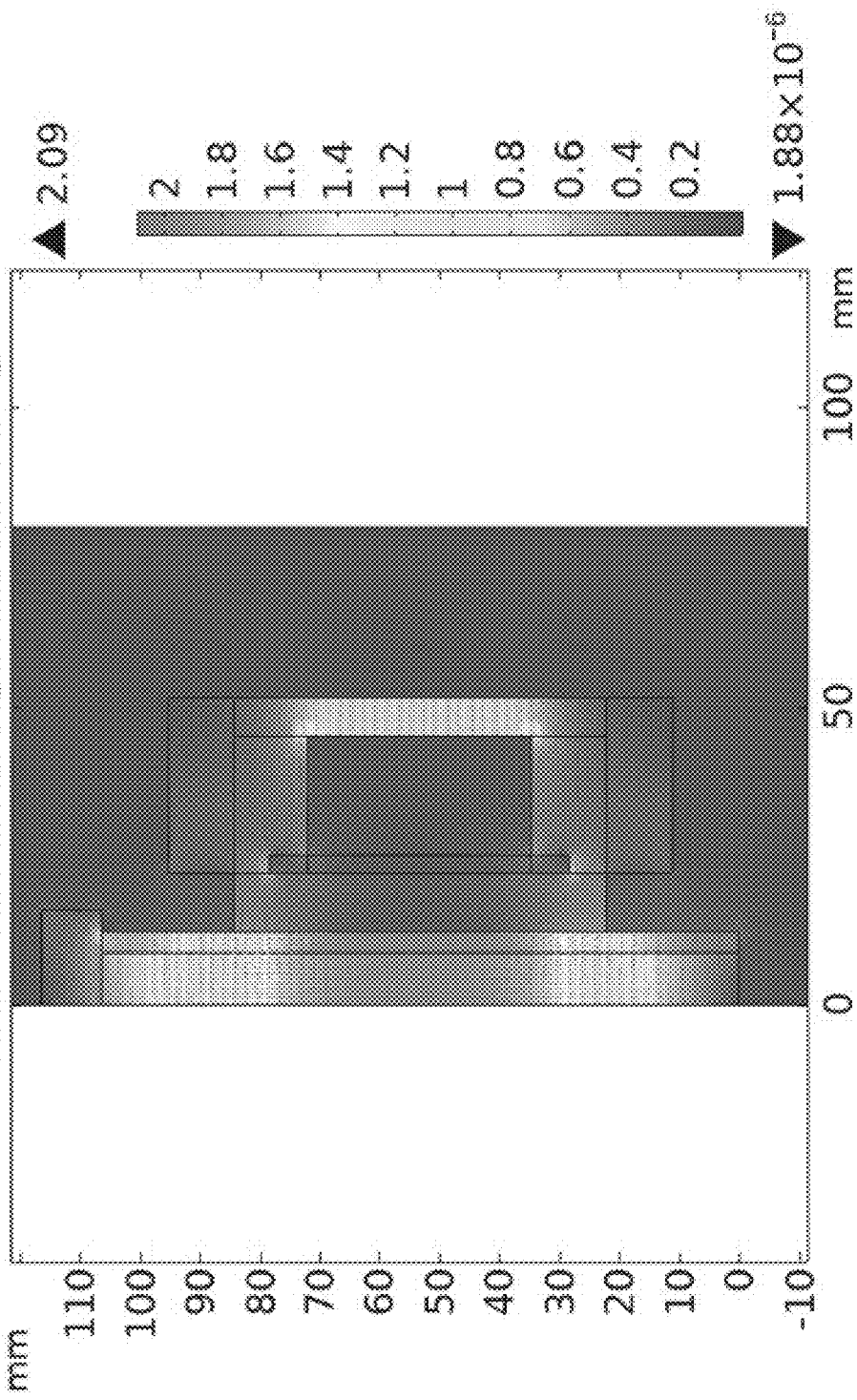
Figure 15F:
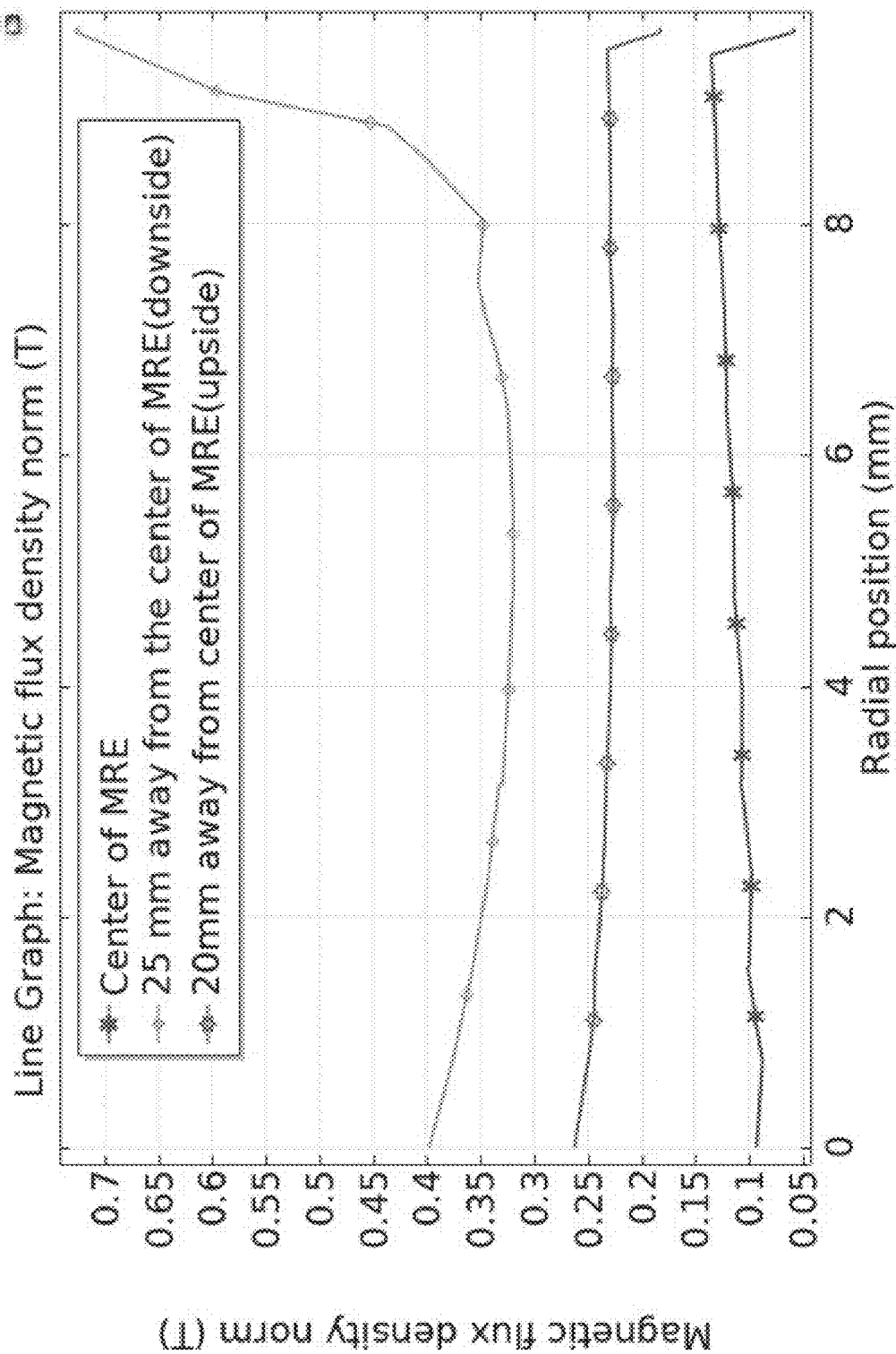

FIGS. 15E-F illustrate additional data regarding variation of magnetic flux density along MRE and a coil in the configuration of Specific Example 1. These illustrate the beneficial nature of magnetic flux density throughout the MRE based on this configuration, of which assembled illustrations are provided at FIG. 16B-C (showing a diagrammatic illustration of the bushing 10 (V2) or 10(V3) in cross section) and FIG. 14D (showing an actual example of a bushing 10(V2) or 10(V3) according to this configuration).

Table 2, below, indicates an example of how certain materials for a bushing 10(V2) or 10(V3) of the configuration of this Specific Example 1 cooperate regarding magnetic shielding properties.

TABLE 2

| Part | Thickness (mm) | Material | Relative permeability |
|---|---|---|---|
| Air | | Air | 1 |
| Through-put bolts e.g. for locking layers 52T/B | 8.74 | Medium carbon steel | 100 |
| MRE (20) | 9.35 | Fe in polyurethane | 2.4 |
| Nonmagnetic interlayer (40) | 3 | Plastic, Teflon, Al, Austenitic steel | 1 |
| Inner steel (60) | 3.5 | AISA 1020 | 2000 |
| Outer steel (50) | 10 | AISI 1020 | 2000 |
| Coil spacer, locking layers 42T/B and 52T/B | 19, 29 | Soft iron bar | 4000 |

As previously mentioned, techniques can be used to deter detrimental effects of temperature and load frequency on the storage modulus of MRE. The storage modulus in viscoelastic materials measures the stored energy, representing the elastic portion, and the energy dissipated as heat, representing the viscous portion. FIG. 20A illustrates how higher temperatures and load frequency can diminish storage modulus. A designer can take this into account in designing an apparatus for a given end use.

As previously mentioned, techniques can be used to promote adhesion of MRE to a non-magnetic interlayer 40 and a magnetic inner tube 60. Physical or chemical etching are two examples. FIG. 20B illustrates examples of physical abrasion of aluminum or stainless steel indicating better adhesion.

As also previously mentioned, embodiments according to aspects of the invention can take different forms. Bushing Version 1 (V1) of FIG. 16A illustrates a coil 30 at least partially embedded in MRE 20, such that the MRE 20 is at least partially in the core of or at least at or near coil 20. Bushing Version 2 (V2) in FIG. 16B, in contrast, is radially outside MRE 20. Bushing V2 also utilizes non-magnetic interlayer and magnetic outer components. Version 3 (V3) in FIG. 16C is similar in that MRE 20 is within the core of coil 30, but dimensions differ for the components of Version (V2).

Experimental data illustrating performance of V1, V2, and V3 follows.

V1 Versus V2 (FIGS. 17a-C)

FIGS. 16A and 16B, respectively, illustrate the differing geometries of a V1 bushing and a V2 bushing. FIG. 17A is a comparison showing the increase in magnetic flux density between the V1 and V2 bushing designs. FIG. 17B is a comparison showing the decrease in temperature gain of the MRE due to the V2 design. FIG. 17C shows the effect of surface treatments on the adhesion strength of polyurethane 30 Shore A rubber.

V1 Versus V3 (FIGS. 18A-D)

Figure 18B:
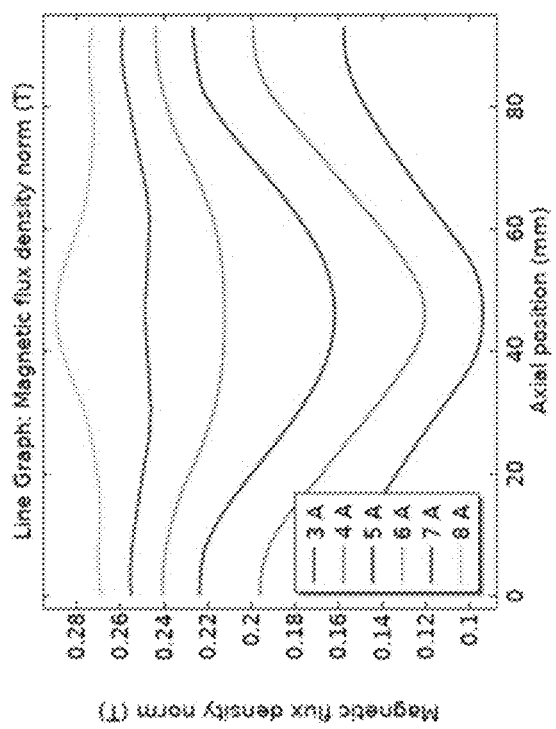
Figure 18A:
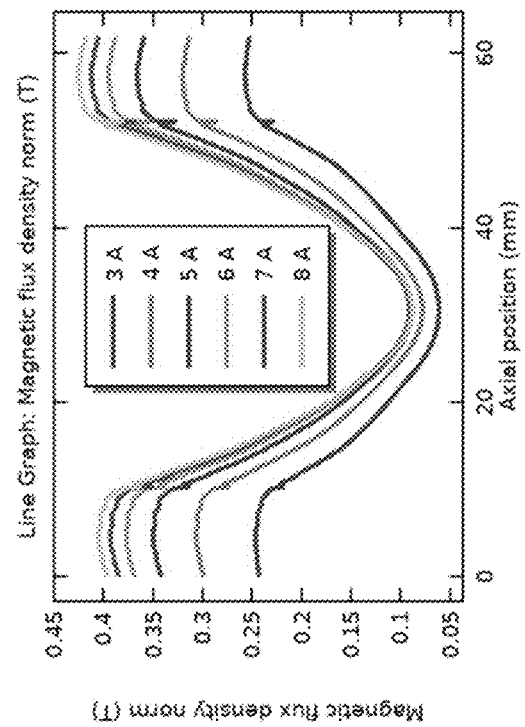

FIGS. 18A and 18B show a comparison of axial distribution of magnetic flux density along the middle region of MRE in the differing geometries of V1 versus V3.

One of the significant improvements of the V3 design is that it allows the flexibility to optimize the magnetic flux density (B) of the middle region of the MRE with varying current unlike the V1 version which with increase in current there is only a slight change in the B at the middle region as seen in FIGS. 18A and B. This difference is fairly consistent across different operating currents between 3 A and 8 A. It improves as current increases. Because of the temperature reduction features of V2 and V3, potentially adverse effects from temperature increases because of increase in current (e.g. from 3 A towards 8 A) can be mitigated. For example, heat sink pathways from coil 30 are typically available with coil 30 positioned outside MRE 20. Thus, V3 meets the aspect of balancing higher operating currents for increased magnetic flux density at the MRE 20 with the aspect of controlling temperature at the MRE. Increased MRE temperatures (e.g. above 150 degrees C.) can lead to decreased elastomer performance and sometimes even degradation and break down. Some elastomers at break down can release toxic substances which, of course, in most cases is to be avoided.

Figure 18C:
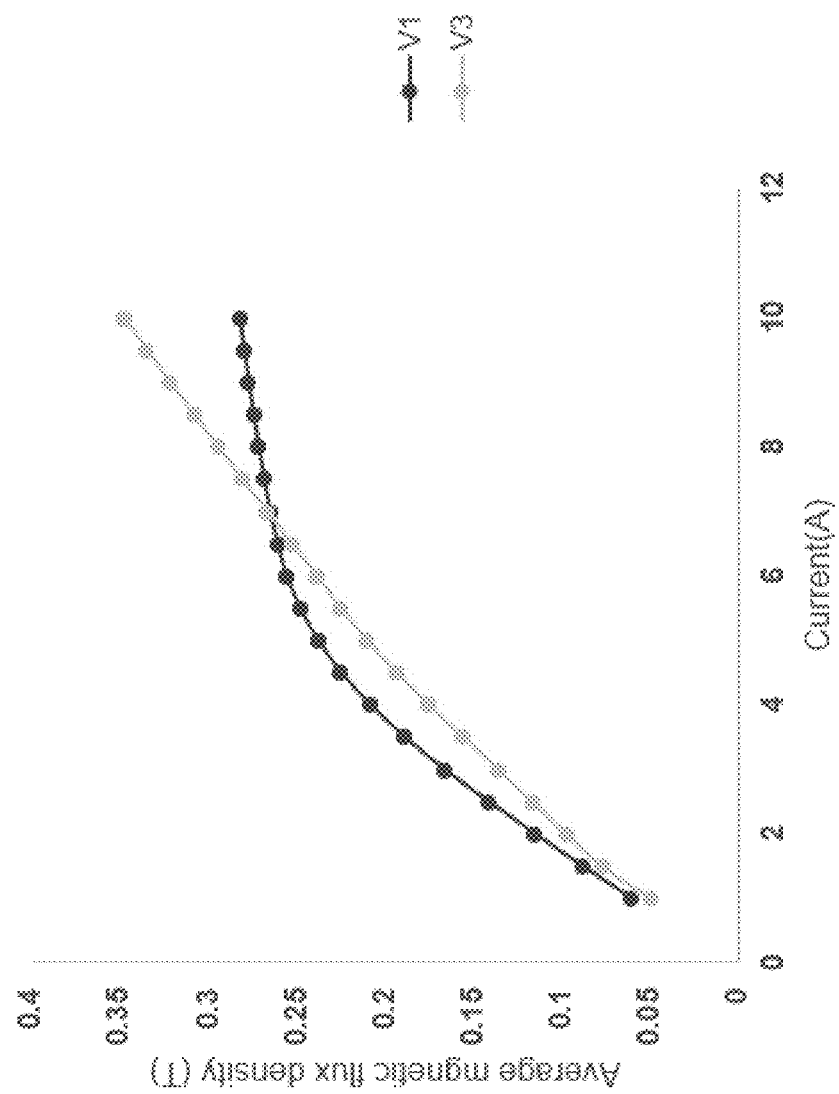

FIG. 18C is a comparison of average magnetic flux density versus current. Design(V3) has lower average magnetic flux density especially at lower currents compared to V1. This can be attributed to the difference in geometric dimensions. In V3 the MRE thickness is 27.5 mm. In V1 MRE thickness is 15.875 mm. Since magnetic flux density decreases with distance hence the observed decline. Also, for V3 we operated at 48V which is equivalent to 6A hence we start to get higher B at larger currents and thus we benefit from this design at higher currents.

Figure 18D:
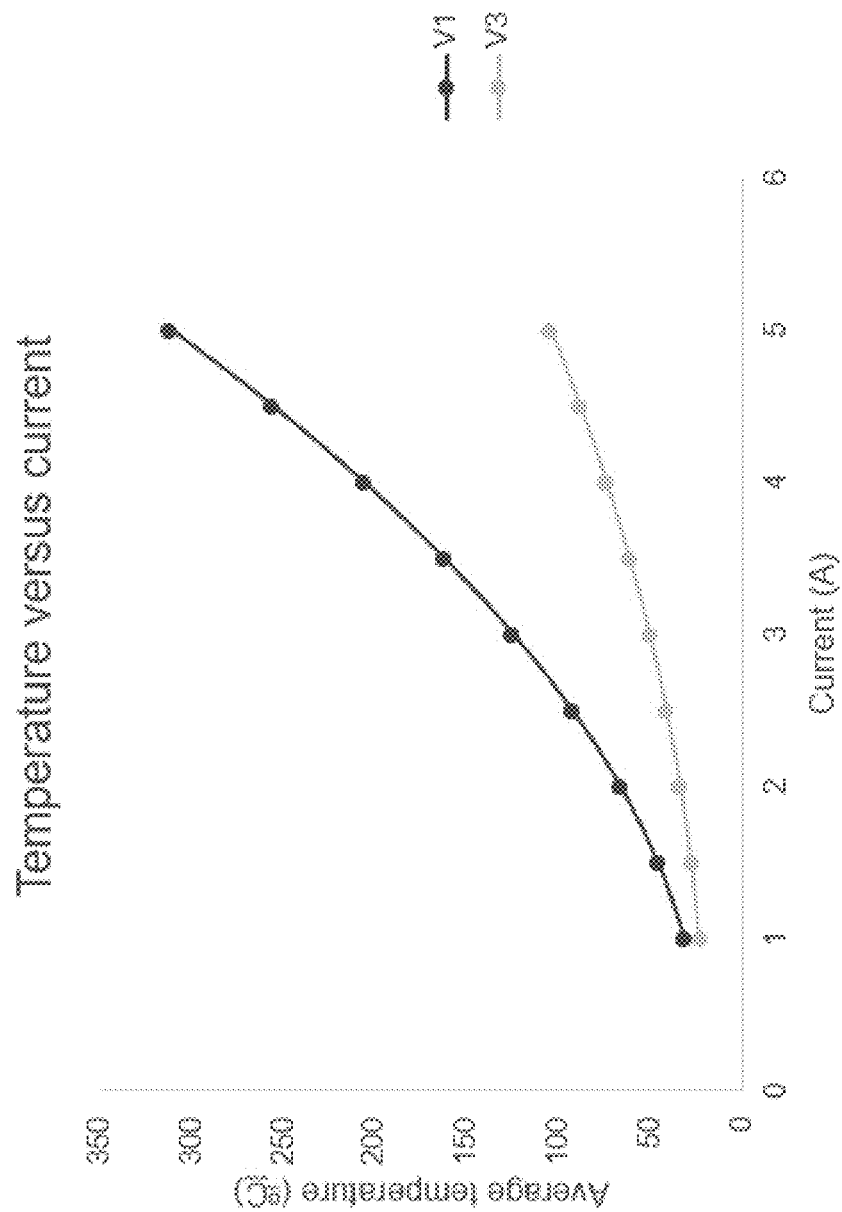

FIG. 18D is a comparison of average temperature versus current. In terms of temperature, design(V3) has a greatly reduced temperature compared to V1. This can be attributed to the optimization made on the geometry and wire gauge size.

V1 Versus V2 Versus V3 (FIGS. 19A-B)

Similar to the comparisons above between V1 and V3, FIGS. 19A-B give comparisons between versions V1, V2, and V3.

FIG. 19A is a comparison of average magnetic flux density versus current. Design(V3) has lower average magnetic flux density especially at lower currents compared to V1. This can be attributed to the difference in geometric dimensions. In V3 the MRE thickness is 27.5 mm, whereas for V1 it is 15.875 mm and V2 it is 9.725 mm. Since magnetic flux density decreases with distance hence the observed decline. Also, V3 we operated at 48V which is equivalent to 6 A hence we start to get higher B at larger currents and thus we benefit from this design. Note the data for V2 differs from V1 and V3. A designer can use this data in designing the geometry and components of apparatus 10 for a given end use.

FIG. 19B is a comparison of average temperature versus time. Note that, in terms of temperature, design(V3) has a greatly reduced temperature compared to V1. This can be attributed to the optimization made on the geometry and wire gauge size. Heat transfer coefficient used is 20 W/(m²*K).

Bushing V2 has been demonstrated to present the opportunity of benefits over bushing V1. Examples are shown in the data of the Figures. Likewise, benefits are possible with V3 (see data examples). However, there are end uses where the geometries of any of V1, V2, or V3 could be determined to be beneficial.

Testing of the V1 MRE (FIG. 19A) bushing design identified three issues that could be addressed to produce certain benefits for a bushing:
1. Increase in MRE magnetic flux density
2. Reduction in MRE heat rate
3. Adhesion of the MRE and structural integrity of the coil One variation was made to isolate the solenoid/coil 30 from the MRE 20 to improve the adhesion of the MRE and protect the coil from mechanical load. Additionally, removing the coil from direct contact with the MRE and providing readily available pathways for heat transfer away from the MRE allows for a decrease in the heat input rate of the composite. The V2 design did present challenges despite the advantages for adhesion and heat transfer. Magnetic fields decay quickly over distance, so separating the magnetic source from the MRE meant developing a way to increase the magnetic flux density. The coil was separated from the MRE by using a 3 mm thick aluminum layer 40. Aluminum was chosen because it is a non-magnetic material that can allow the magnetic field to pass through to the MRE. The low thickness (e.g., on the order of a few millimeters, one non-limiting example being 3 mm) was chosen as a balance between magnetic properties and mechanical properties—having enough structural stability to withstand the loads necessary during use while being thin enough to preserve the magnetic field. Additionally, encapsulating the coil on all other sides with magnetic steel drastically lessened stray magnetic fields which led to a significant increase in magnetic flux density throughout the MRE. The final build of the V2 bushing consisted of three different parts than V1: an aluminum interlayer 40, a coil spacer 42T and B at each coil end to encapsulate the coil, and a locking layer 52T and B at each end of the outer cylindrical case 50 to hold the coil spacers and interlayer to the outer steel 50 (FIG. 19B).

According to Ampere's circuital law, a magnetic field is directly proportional to number of turns and current and inversely proportional to the coil length. In order to generate higher field strengths, it becomes more effective to increase the number of turns (N) per unit length than to increase the coil current(i). This is because Joule's heating is proportional to $i^2$ and field strength is proportional to i. Thus, it can be beneficial in the design of an MRE based bushing to balance these parameters of number of coil turns to coil current.

In one example of bushing V2, a 1000 multiturn coil was provided and 3 A current was applied to it. In order to determine which of the two bushing designs V1 and V2 generated a higher amount of magnetic flux density, an equal number of turns, current and coil length is provided. Analysis of magnetic flux density axial distribution was carried out and a comparison was made between V1 and V2 bushing as shown in FIG. 19C. The results show a higher magnetic flux density is generated for V2 than V1 bushing. This can be attributed to two factors: 1) In V2 design the MRE forms part of the core of the coil (FIG. 19B) hence higher magnetic flux density is generated within the core unlike for V1 the coil is around the inner sleeve (FIG. 19A) and hence the magnetic flux density generated in the MRE is lesser than when it is part of the core. 2) Additional magnetic materials (FIG. 19B) are provided which provides magnetic shielding thus concentrating magnetic flux density within the bushing this leads to increase in magnetic flux density in the MRE.

To compare the efficiency of heat transfer properties of V1 and V2 bushings a transient analysis of the temperature was carried out within the MRE. A plot was made of temperature versus time as shown in FIG. 19D. From the analysis, it is observed the average temperature in the MRE at any given time is higher in V1 than V2 bushing. The variation in temperature in the MRE can be accredited to the differences in heat transfer by conduction from the two designs. In case of V1 bushing (FIG. 19A), the coil is in direct contact with the MRE which is a poor conductor of heat. This limits the amount of heat conducted away at any given time while for V2 bushing (FIG. 19B) the coil is in direct contact with metal surfaces (aluminum and steel) which are good conductors of heat. This greatly improves heat transfer by conduction in V2 bushing and hence lesser heat is generated within the MRE.

Adhesive failures in the V1 bushing design likely stemmed from two factors: 1) the coil structure was changing due to the amount of mechanical load it was receiving which caused poor adhesion at the interface between the coil and the MRE, and 2) adhesion was not strong enough between the steel surface and the polyurethane. Isolating the coil from load solves the first problem, the second issue needed to be met with a combination of mechanical and chemical modification. Surface roughening has been shown to increase adhesion due to the formation of mechanical bonds. Both aluminum and steel form oxide layers in the presence of air that do not adhere well to the bulk metal. Cleaning and roughening the surface to subvert the oxide layer, as well as using chemical treatment to prevent oxide layer formation and increase adhesion to the bulk were likely to significantly increase adhesion, and thus load bearing capabilities. Peel tests were run using steel and aluminum sheets bonded to polyurethane. The polyurethane was bonded on one side to the substrate and on the other side to Polyethylene terephthalate (PET) to allow for the assumption of linear elasticity. Adhesion energy ($G_c$) was calculated to quantify the adhesion between the substrate and polyurethane. Surface roughening was shown to give a noticeable increase in adhesion to aluminum but had a negligible effect on steel (FIG. 19E). This is likely due to steel being a harder material which led to less roughening on the surface from the sandpaper. Testing is currently being carried out samples that were mechanically roughened and treated with a urethane primer (Devcon FL-10). The urethane primer is designed to limit the formation of an oxide layer and increase adhesion between metals and urethanes.

It is envisioned further benefits may be achieved with other selections and balancing of factors. The variations between V1 and V2 type bushings allow for greater magnetic fields, more efficient heat transfer, and high adhesion strength. This can be significant for some end uses of the bushing. For some end uses of desired applications of using the bushing, for example for a class 8 truck, the bushing likely would benefit from elastomers in the MRE that utilize rubbers with a higher stiffness than those reported in the data herein. More rigid rubbers require higher magnetic flux densities to realize the same MRE effect. It follows that the next selections for improving the bushing at least for certain end uses could include: 1) anisotropically cure the MRE (as discussed herein), and 2) experiment with different stand-alone and combinations of magnetic particles for the MRE composition. Anisotropic curing is known to increase the MRE effect. In one example, this could be done by curing the composite under a high magnetic field (0.4 T-1 T). Previous research has shown that particles of different sizes (e.g., nano- and micro-particles) can be used together to improve the MRE effect under an equivalent magnetic field. Finally, composites could be created from different magnetic particles. Soft magnetic particles of higher relative permeability will lead to a greater flux density throughout the MRE. Hard magnetic particles will also be mixed into the composites of stiffer elastomers to increase the total flux density. Any or all of these variables can be considered by the designer, including in methods for creating selectively tuned MRE isolators and absorbers with the desired stiffness and MR effect for a variety of applications.

To generate large MRE effect, relatively high magnetic field strengths are needed. Based on the current electromagnetic circuit design, an average of 0.2 T magnetic flux density is generated. This indicates possible benefits of additional coil designs and methods of prestraining the MRE such as use of permanent magnet which, based on previous literature, has been shown to increase to some extent the magnetic flux density.

Specific Example 2 (Basic Geometry of V1)

As will be appreciated by those skilled in this technical art, aspects of the invention can be realized in a variety of different ways. Non-limiting examples will now be described, all of which utilize at least a portion of MRE at and along a coil.

FIGS. 21A-F, and 22A-D, provide similar views to those of FIGS. 2-4 regarding MRE at and along a coil, but here the coil 30 is at least partially embedded in MRE as in the geometry of 10(V1) of FIG. 1 and FIG. 16A. In FIGS. 21A-F, the MRE 20 has no inner tube or other internal components. Using principles described earlier, this combination could be used to provide adjustable stiffness control to a cured MRE. The form factor of the cured MRE could vary, including cylindrical of different shapes and proportions of diameter to height, but also other geometrical cross-sections, including regular or irregular.

Figure 21A:
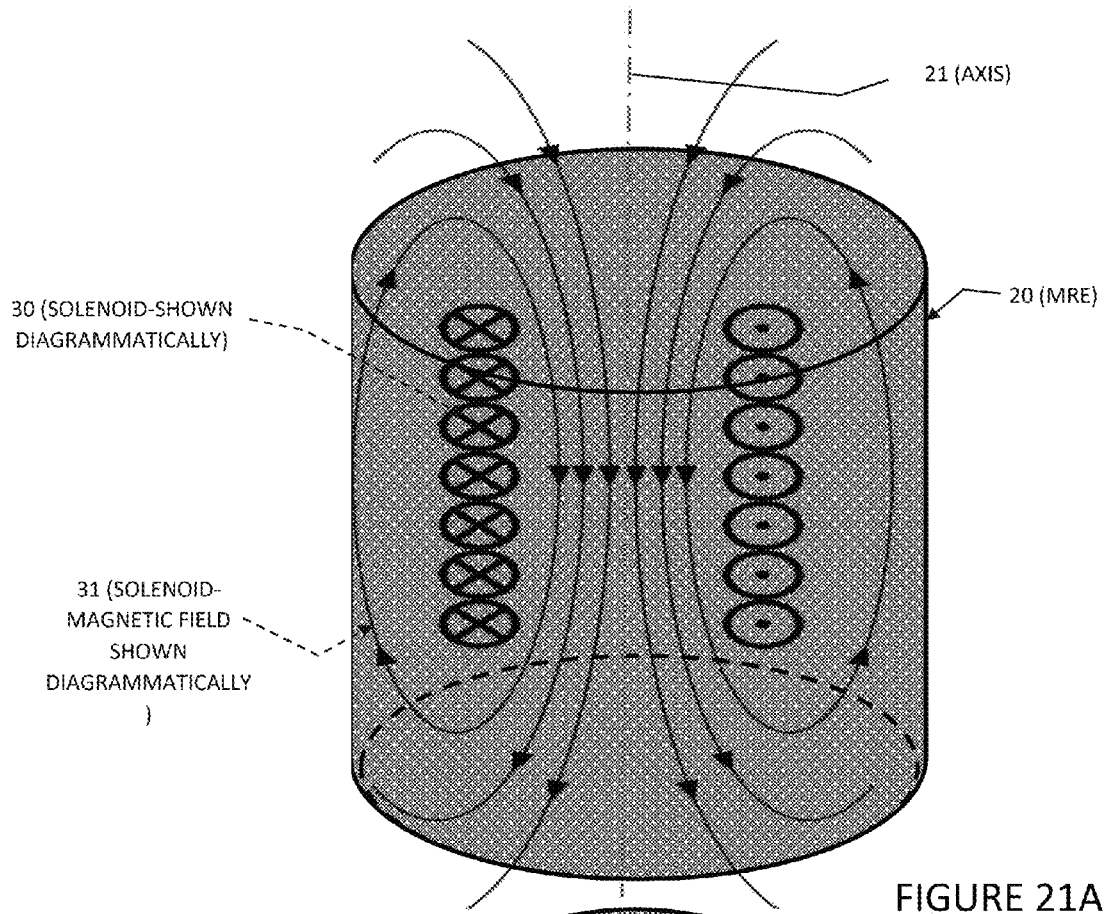
Figure 21B:
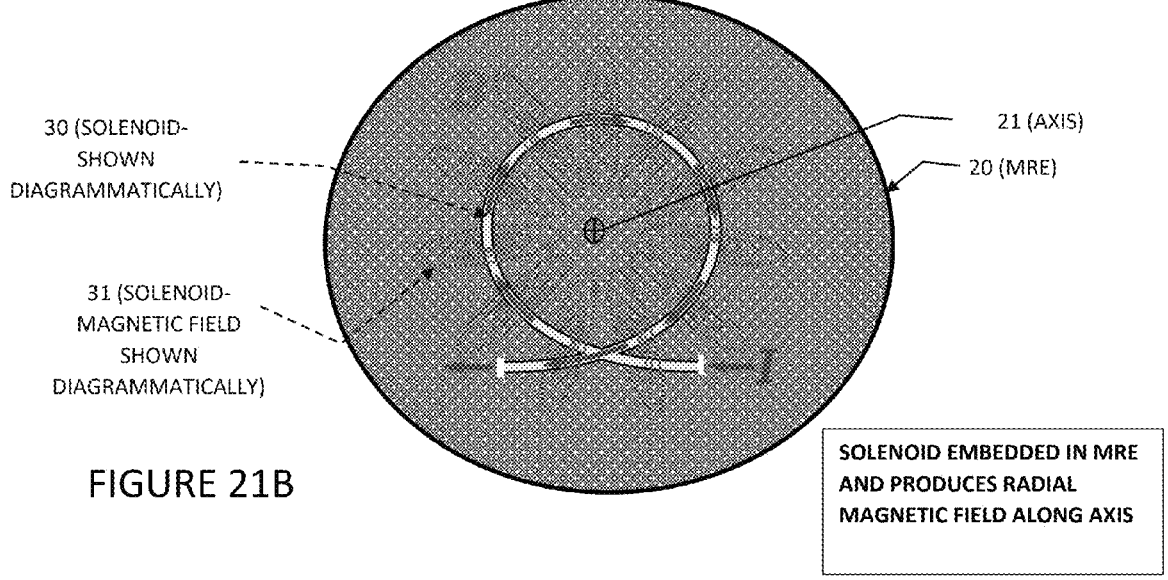
Figure 21C:
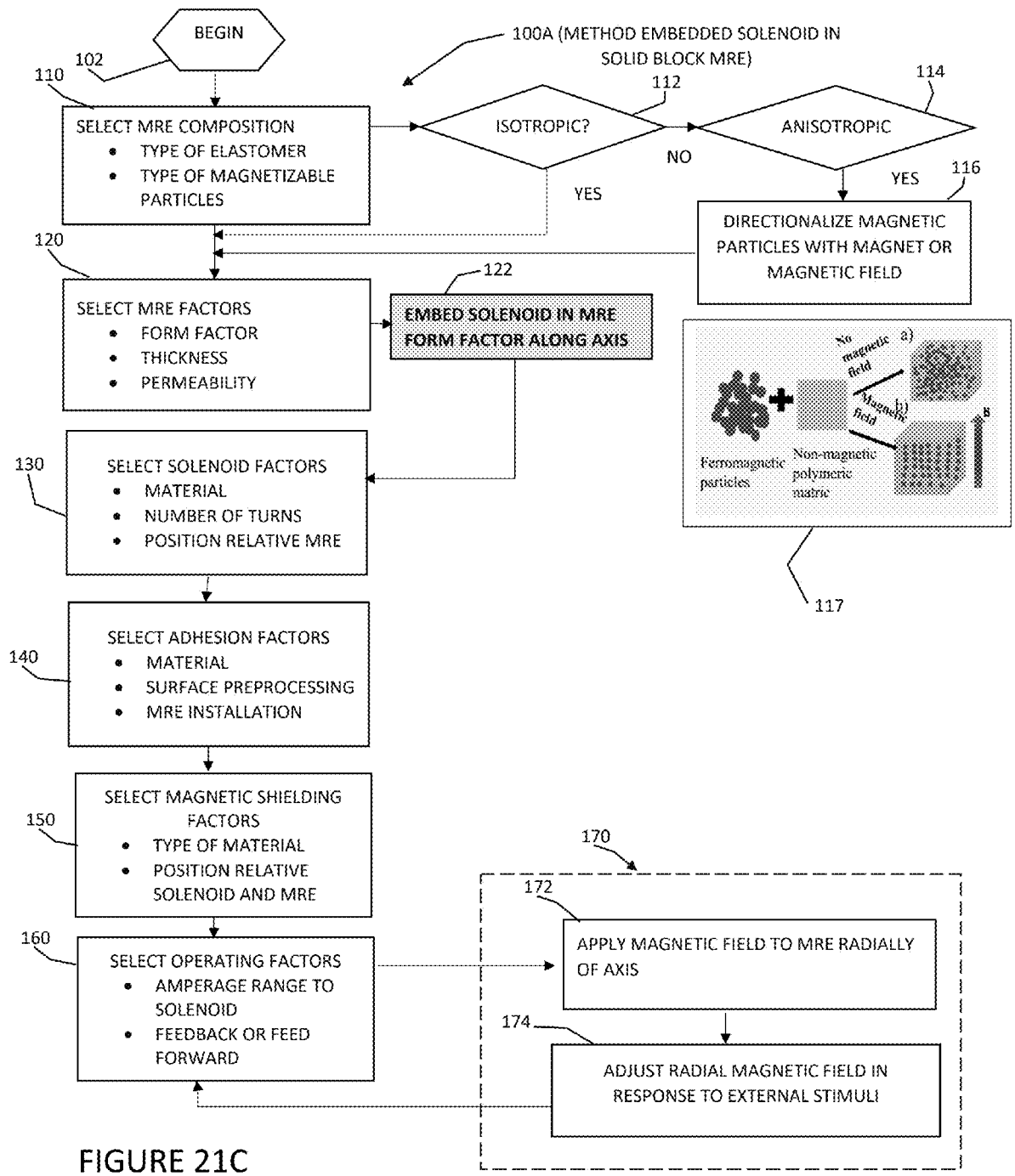
Figure 22A:
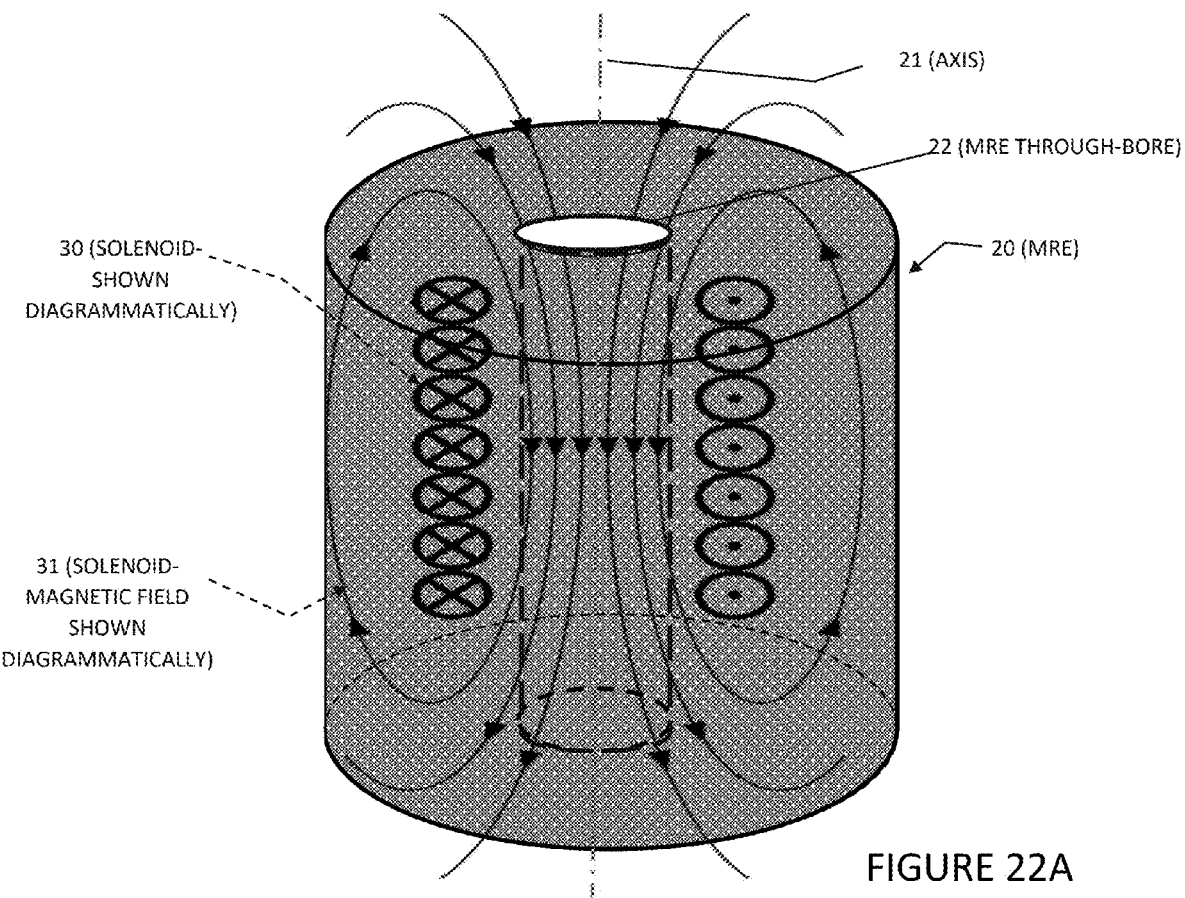
Figure 22B:
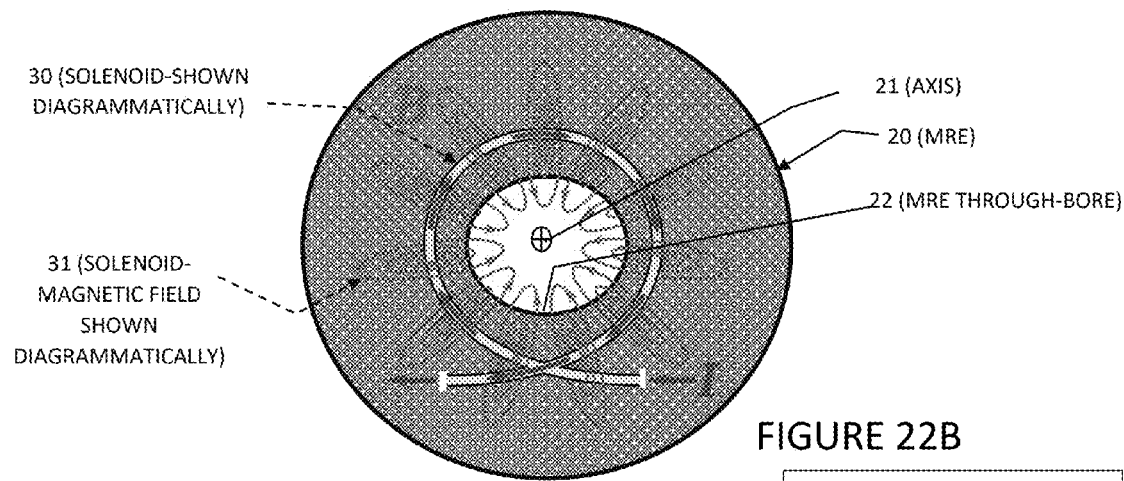
Figure 22C:
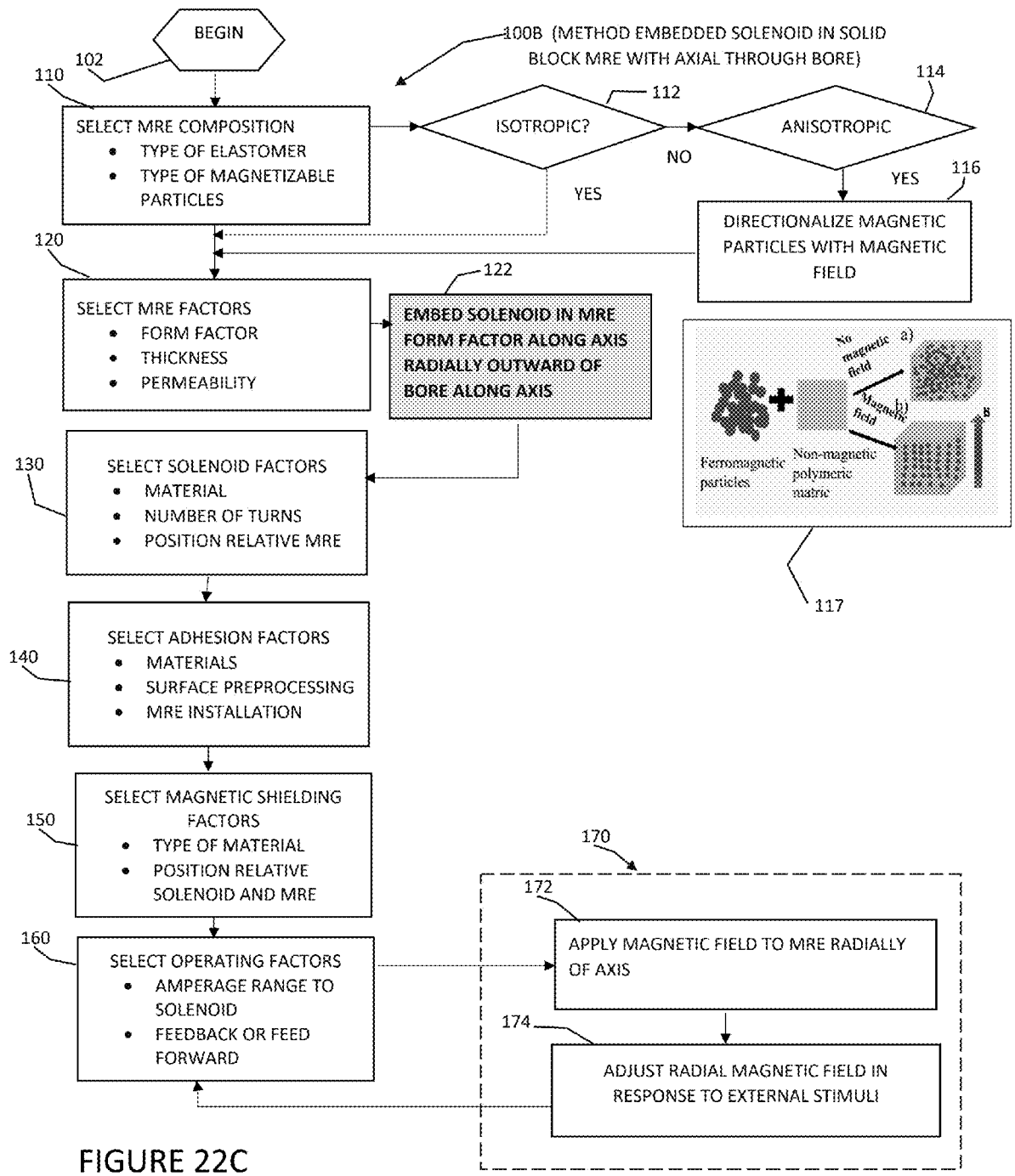
Figure 22D:
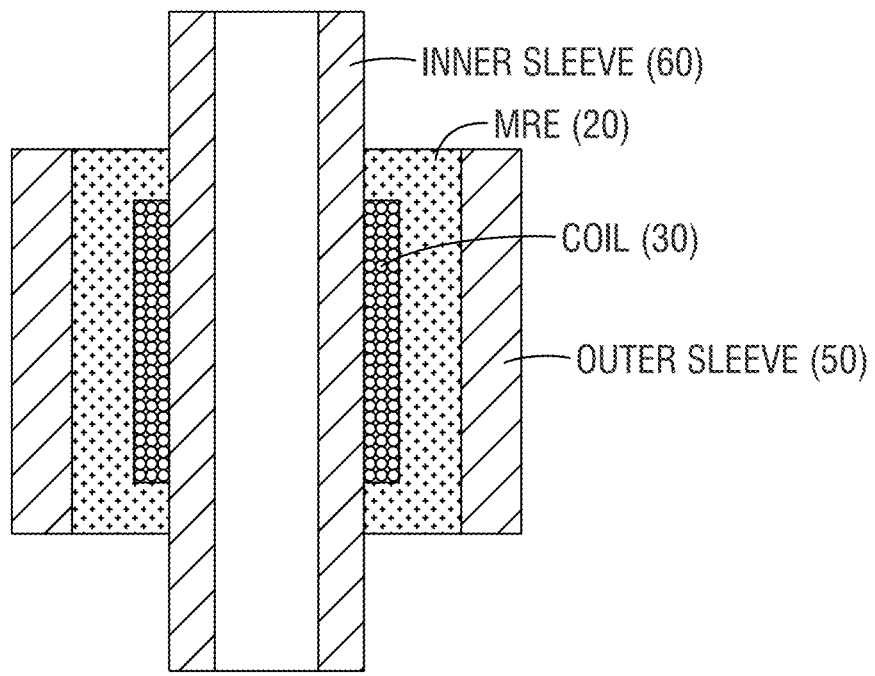
Figure 23A:
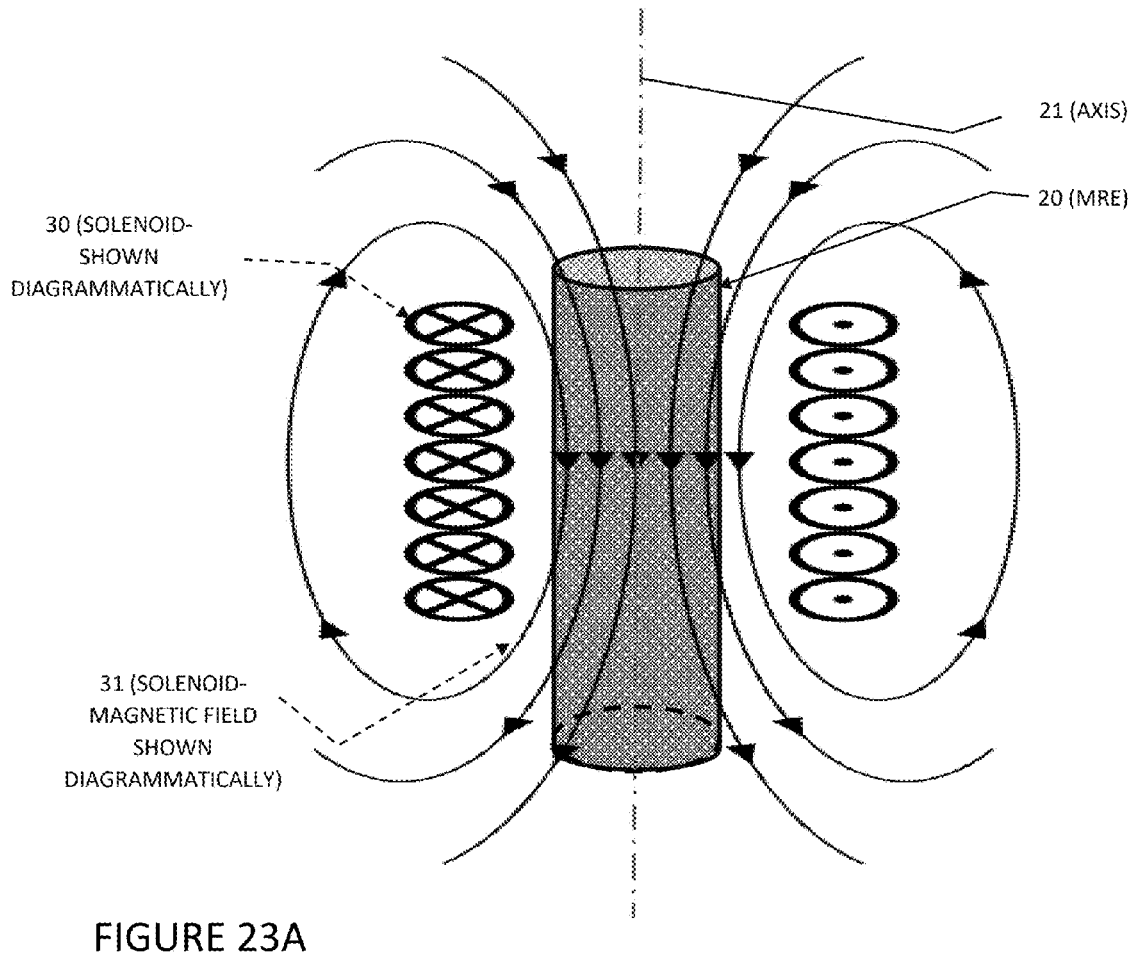
Figure 23B:
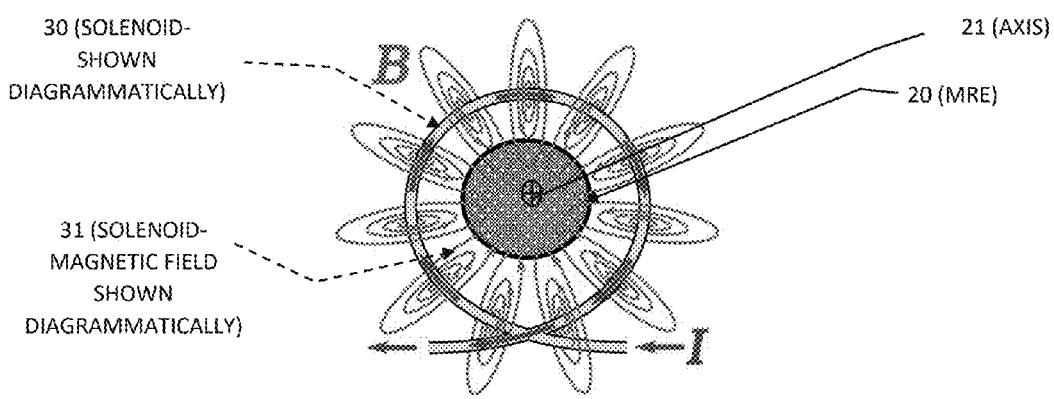
Figure 23C:
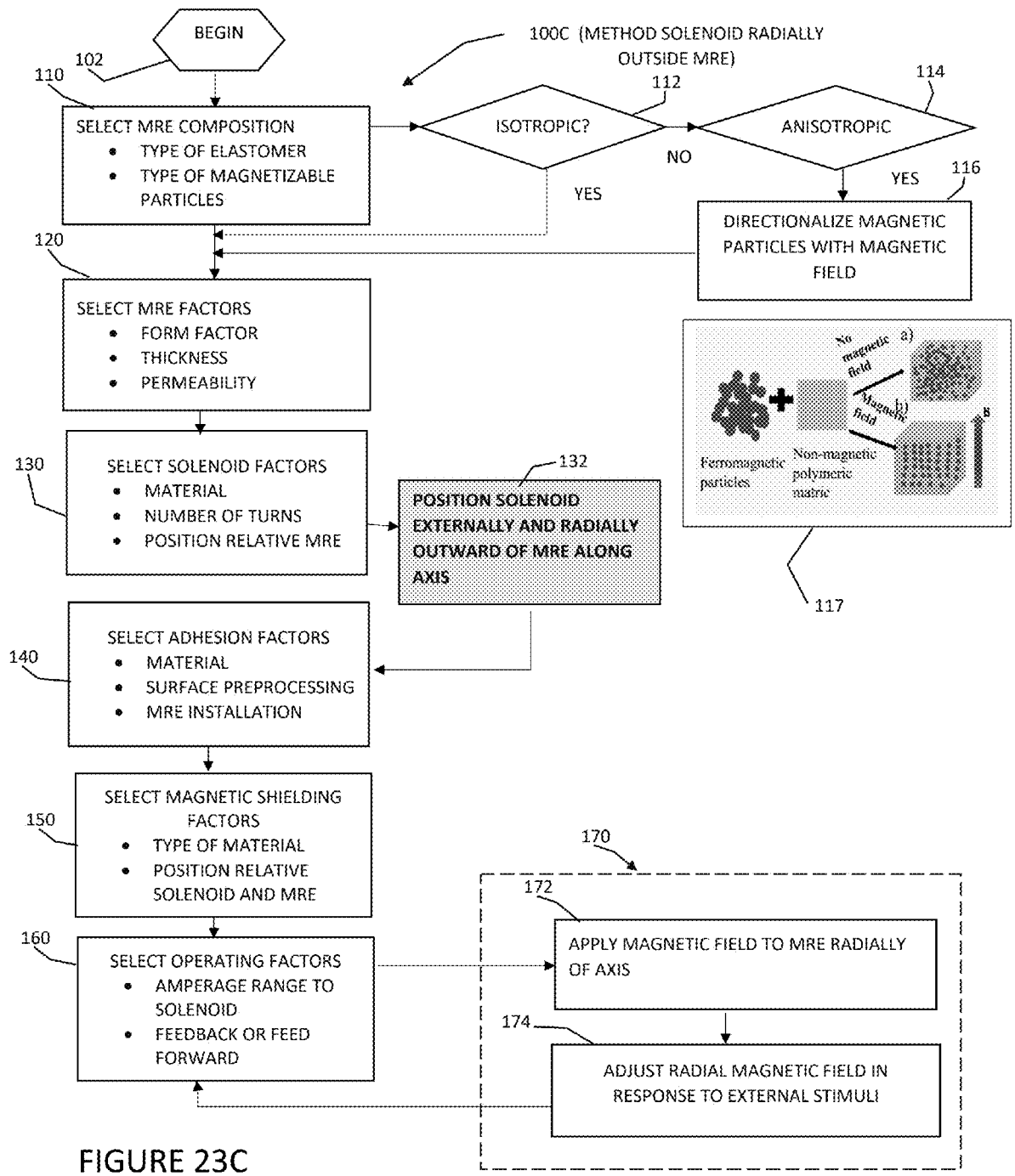

As illustrated at FIG. 22D, the form factor of FIG. 21A or FIG. 22A could be in combination with other features (e.g. axial inner tube 60 and axial outer case cylinder 50). While to-date experience indicates there may be challenges to useful life of such combinations in situations of high frequency and magnitude of forces experienced by the MRE (such as a bushing for a truck cab), the invention and its benefits apply to these examples also.

Figures 21D, 21E:
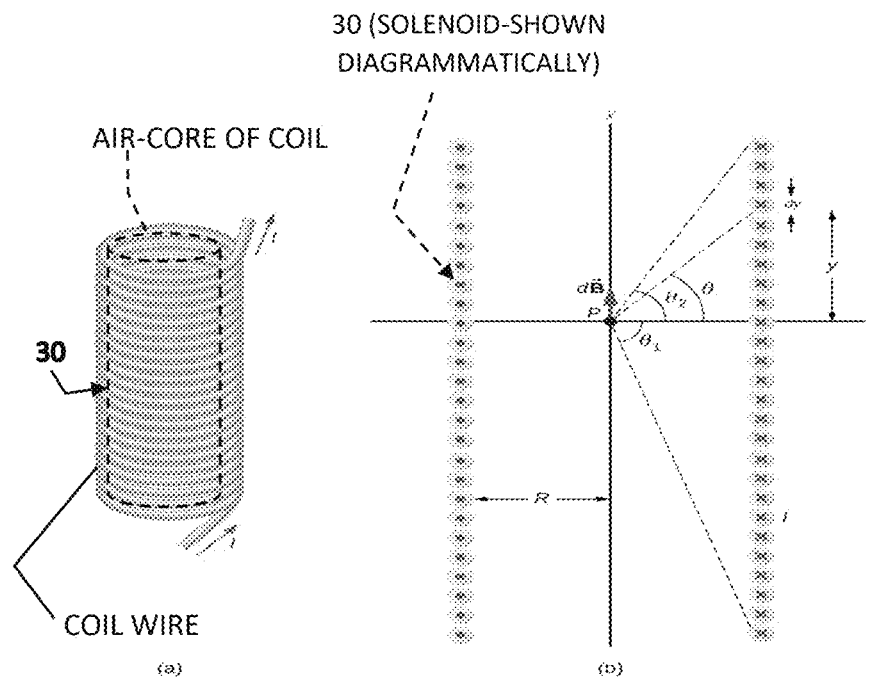
Figure 21F:
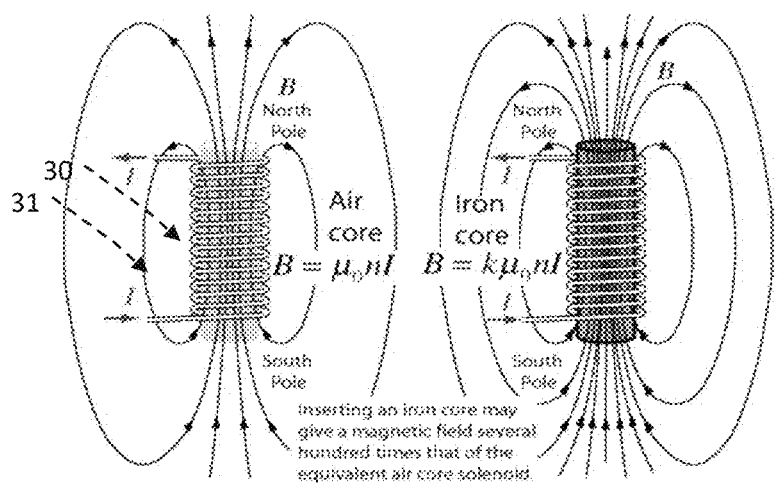

As highlighted in FIGS. 21A-F and 22A-C, the radial coil relative the MRE form factor might include embedding coil 30 at least partially in MRE 20. Selection of MRE, coil, and operating parameters can produce beneficial flux density for effective control of stiffness of MRE 20. FIGS. 21D-F are diagrams generally depicting the magnetic field produced by a helical coil. MRE 20 could be in block form, and operatively directly or indirectly coupled to a mechanical load needing motion damping or vibration isolation. Active or semi-active control through an appropriate control circuit (see, e.g., FIG. 1) could be operatively included. See U.S. Pat. No. 7,086,507 B2 and U.S. Pat. No. 9,581,214 B2, both incorporated by reference herein, for examples of control circuitry. MRE 20 could, alternatively (FIGS. 22A-C), have a throughbore 22 or other analogous features. As known to those skilled in the art, a part (e.g. axle, structural member, etc.) needing motion damping or vibration isolation, could be operatively positioned through MRE 20 or throughbore 22 and MRE 20 could adhere to it. See method 100B, FIG. 22C, for one example regarding FIGS. 22A-B. See also a possible non-limiting example of a device geometry in the cross-sectional view of FIG. 22D, which includes inner sleeve 60, outer case 50, and coil 30 and MRE 20 therebetween.

Specific Example 3

Figure 24A:
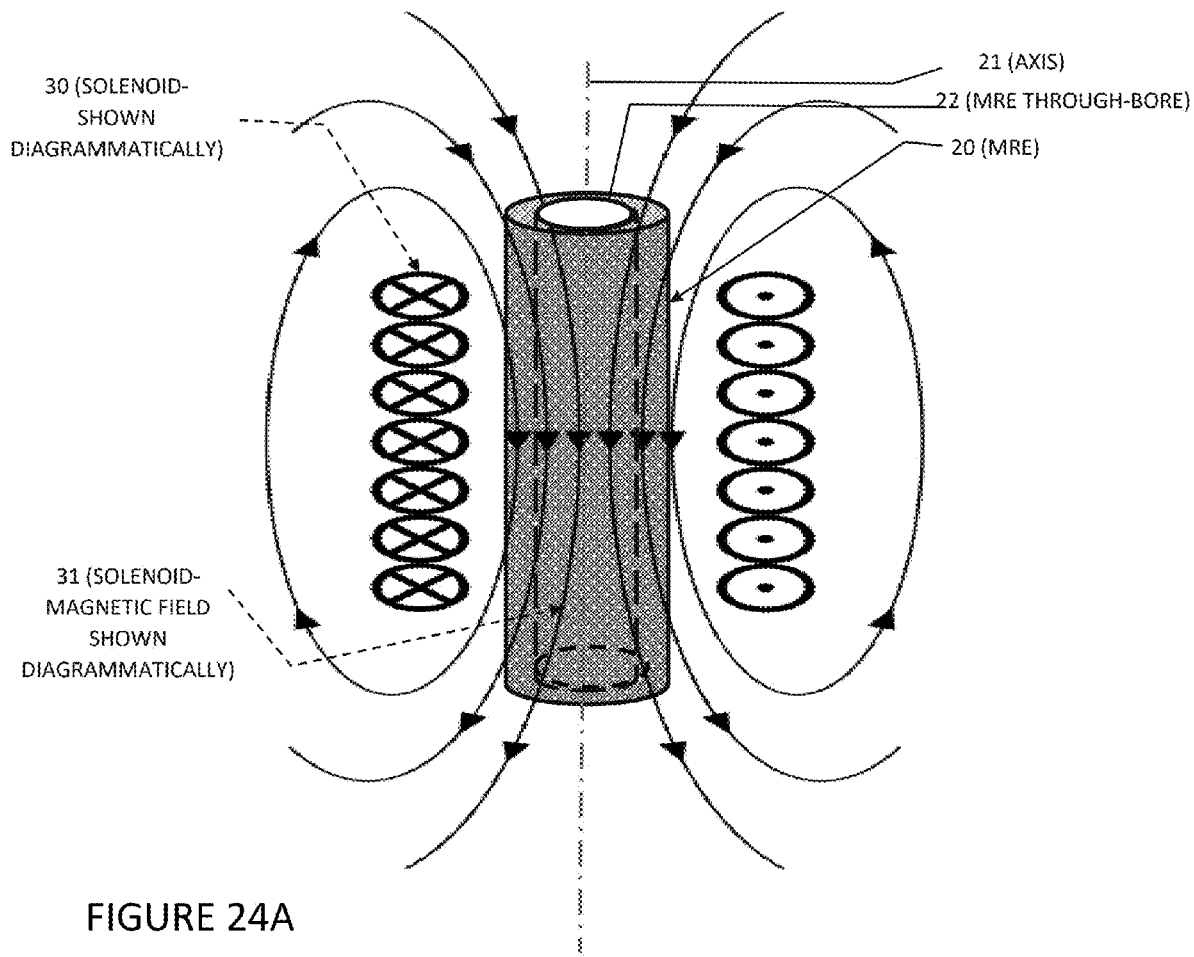
Figure 24B:
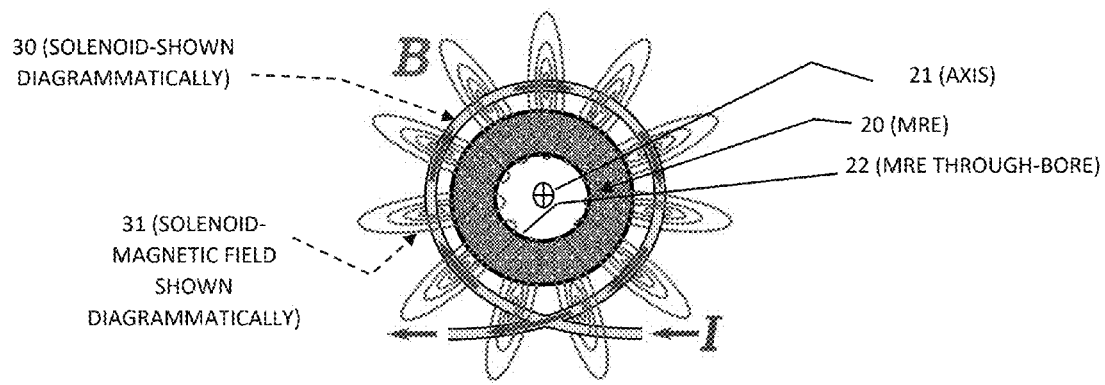
Figure 24C:
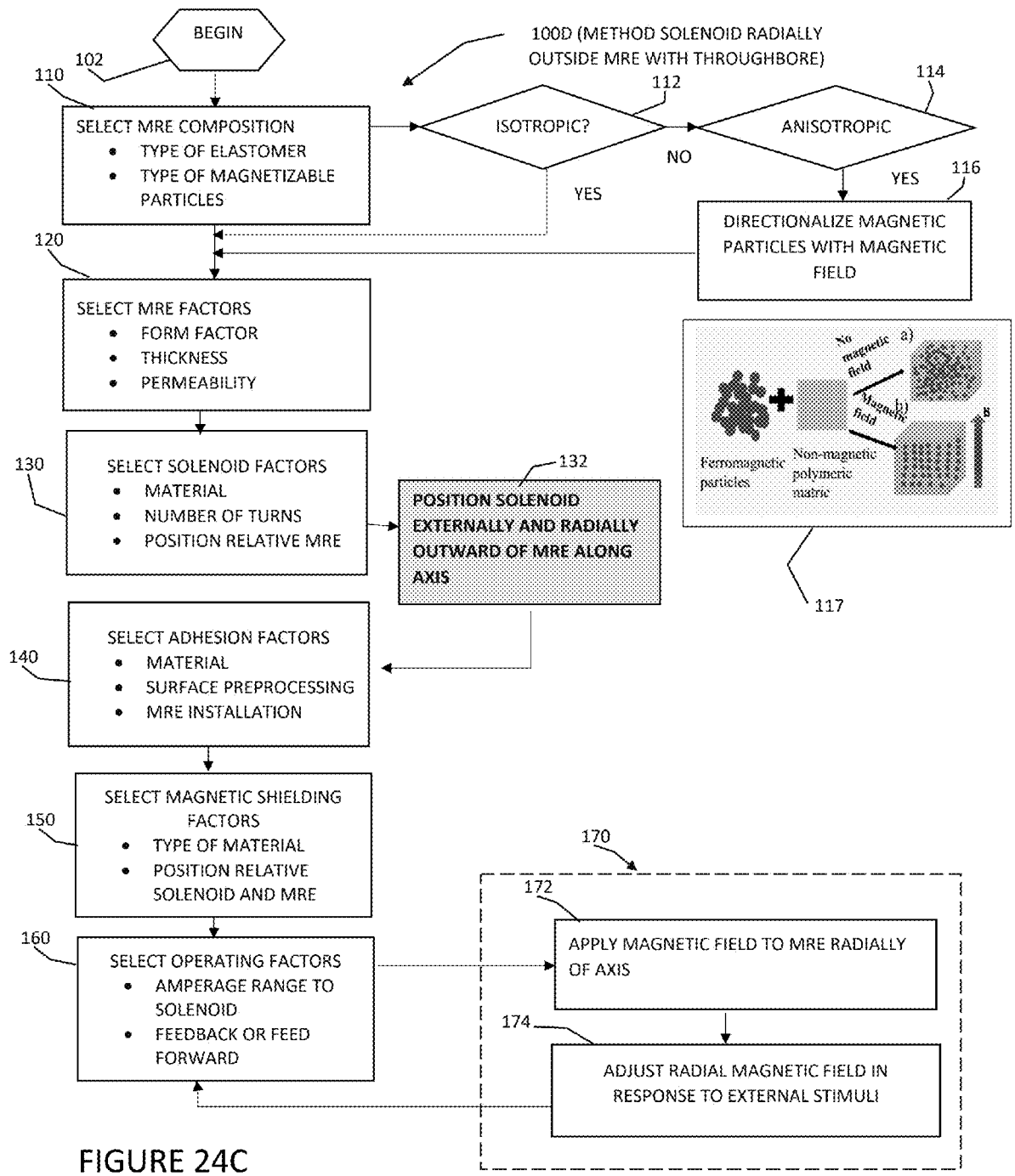

As highlighted in FIGS. 23A-C and 24A-C, in the alternative, coil 30 could be radially outwardly of MRE 20, whether in block form (FIGS. 23A-C) or with throughbore 22 (or analogous) (FIGS. 24A-C). In common with the prior examples 10(V2) and 10(V3), the magnetic field is thus radial and axial to MRE 20 axis 21. Selections such as discussed in prior examples could be considered individually or in combination for a final assembly and operation. See possible methods 100C relative to FIGS. 23A-C, and 100B relative to FIGS. 24A-C. The yellow highlighted variations from method 100A include positioning coil 30 external of MRE 20 (Step 132).

Specific Example 4

Figure 25A:
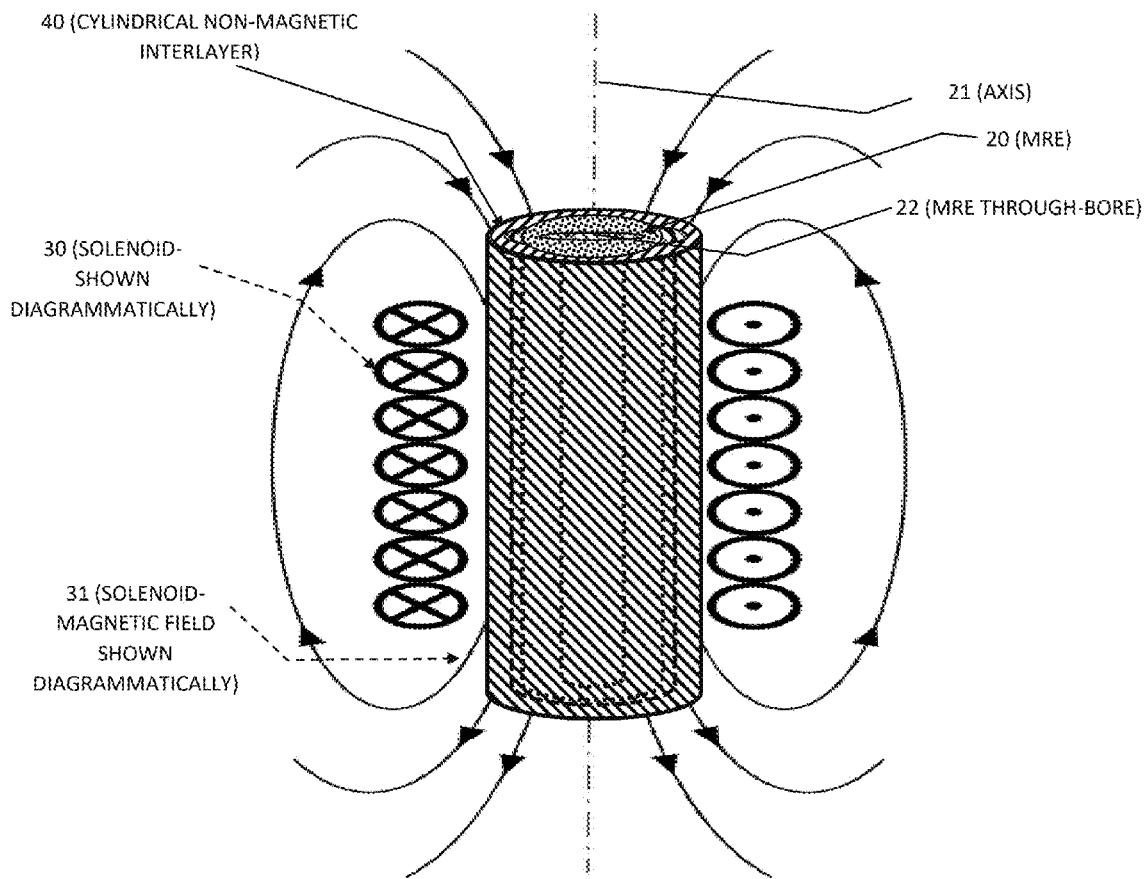
Figure 25B:
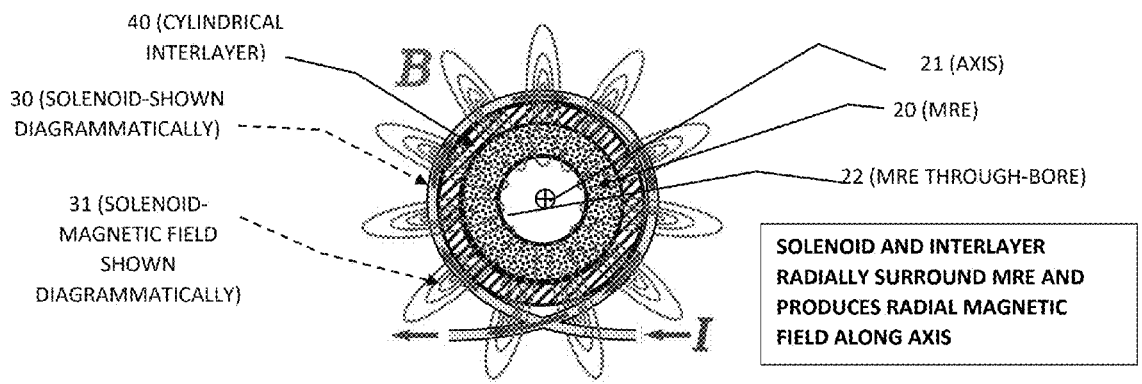
Figure 25C:
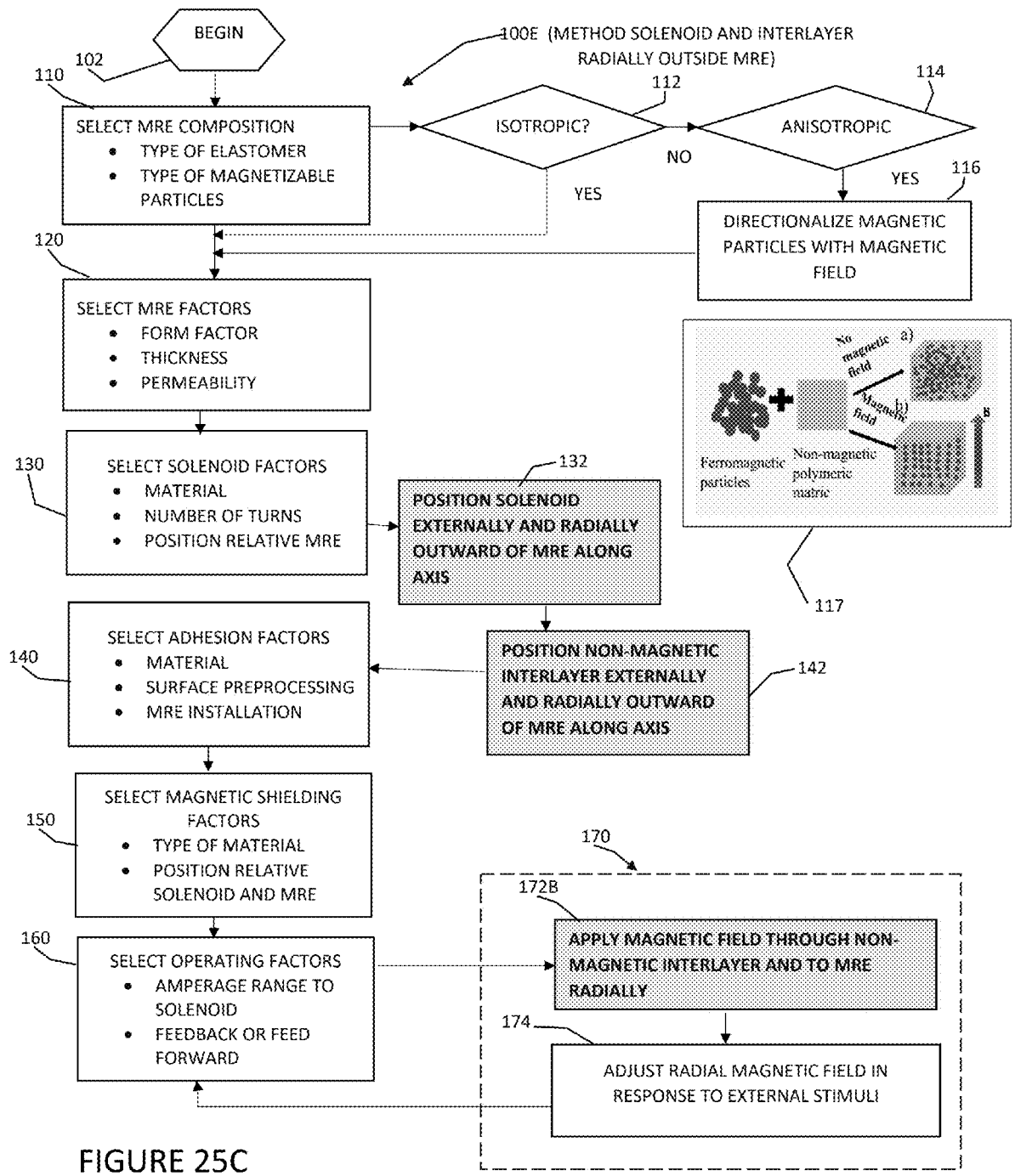

As highlighted in FIGS. 25A-C, in the alternative, a non-magnetic interlayer 40 could be positioned between coil 30 and MRE 20. Interlayer would thus be transparent to magnetic field 31 but provide a surface for adhesion of MRE 20, and to constrain MRE 20. The benefits of a radial magnetic field can be utilized. See, e.g. method 100E where coil 30 and an interlayer 40 are radial to the axis 21 of MRE 20 (see steps 132 and 142).

Specific Example 5

Figure 26A:
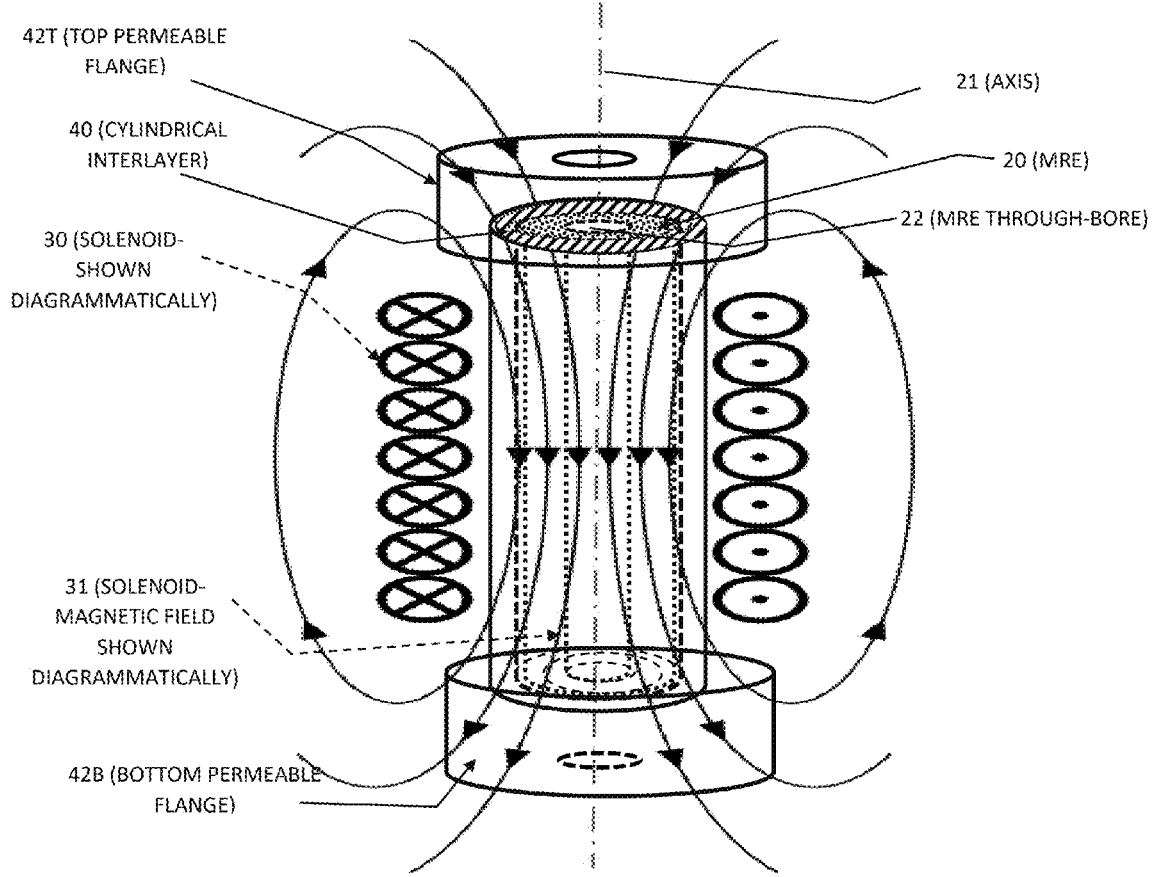
Figure 26B:
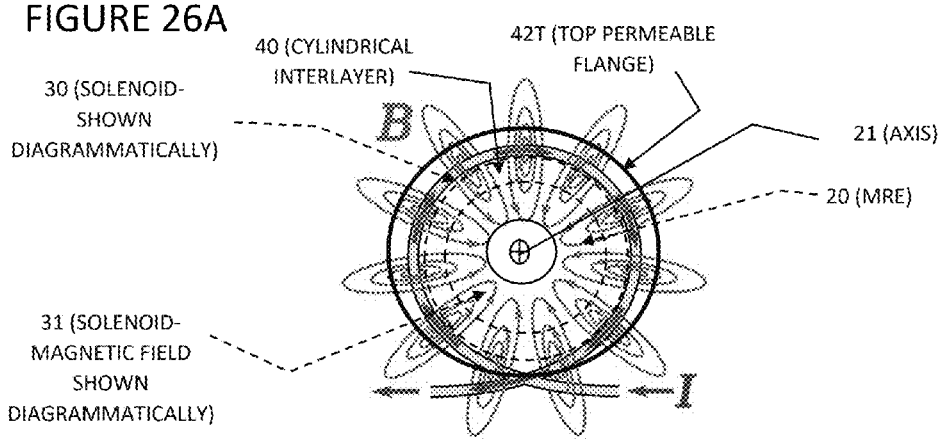
Figure 26C:
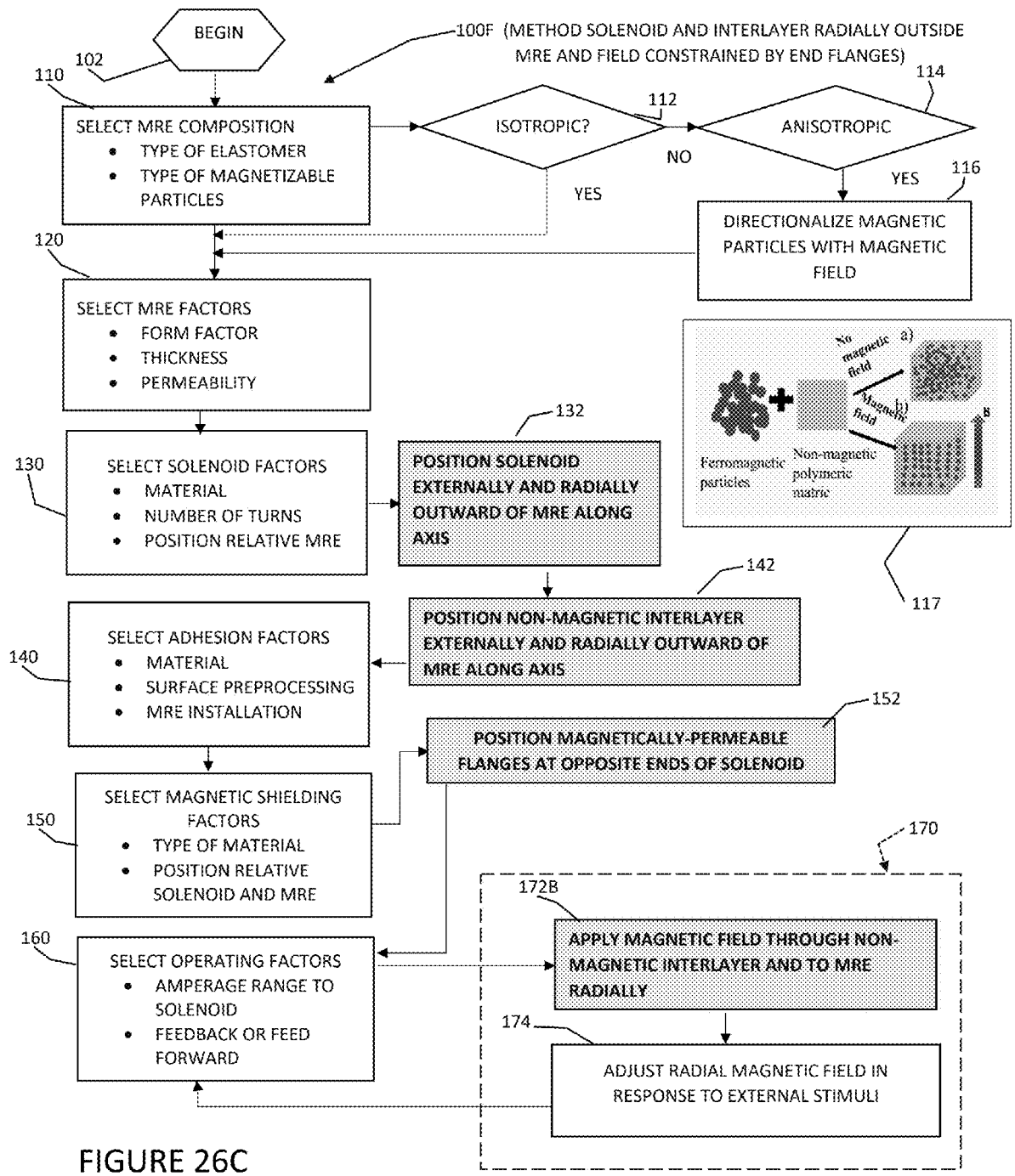

As highlighted in FIGS. 26A-C, in the alternative, magnetically-permeable flanges 42T (top) and 42B (bottom) can be operatively combined with interlayer 40. This essentially forms a bobbin 49 configuration around which coil 30 can be wound and constrained. Coil 30 can have multiple turns (e.g. thousands) in one or more layers of turns, as is known to those skilled in the art. This bobbin configuration can improve magnetic flux density in MRE 20. Also, it can essentially be a sub-assembly that can be manufactured efficiently according to desired parameters, and then installed with other needed components to create a final device assembly. See, e.g., method 100F with yellow highlighted step 152 of a radial coil 30 and interlayer 40 (relative to MRE 20), and end flanges 50 at opposite ends of coil 30 to form the frame for bobbin (step 152).

Specific Example 6

As highlighted in FIGS. 27A-C, in the alternative, magnetically permeable outer cylindrical case 50, with magnetically permeable end caps 52T (top) and 52B (bottom) encapsulate bobbin 49. Bobbin 49 can be fastened inside with case end caps 52. MRE 20 can be installed between an inner magnetically permeable tube 60 and interlayer 40, before end caps 52T and B are finally fastened. Case 50 and case end caps 52 can benefit magnetic flux density to the MRE, as well as inner tube 60. See also, e.g., method 100G which follows the steps of method 100F but also adds the positioning of an outer case 50 and case end caps 52 to enclose the bobbin and MRE (step 154).

As will be appreciated, the examples of combinations and methods of FIGS. 21-27 indicate how a designer can mix and match one or more features for beneficial results in operation.

It will be understood that the combination of FIGS. 27A-C can have benefits that can optimize such things as both magnetic flux density and thermal management. For some applications, including an SSB, this can be a preferred combination.

Options and Alternatives

It will be appreciated by those skilled in the art that the invention and its features and aspects can take many forms and embodiments. The invention is not necessarily limited to those in this detailed description.

As mentioned, the form factor and added components a designer selects for a given end use can be varied while using the generalized embodiment of at least a portion of the MRE at and along a coil for the assembled apparatus. Still further, the specific composition of the MRE can vary according to need or desire. See, e.g., U.S. Pat. Nos. 7,086,507, 9,581,214, and Yu, et al. Smart Mater. Struct., 25 (2016) 115039, all incorporated by reference herein, for background information on MRE, MRE compositions (including elastomers and magnetic particles), and control sub-systems to change magnetic fields at the MRE.

FIG. 27 illustrates other possible non-limiting variations. A variety of techniques can be used to emplace the MRE. As mentioned, uncured pourable MRE can be poured into the desired space of the apparatus and, using molding techniques, contained, and cured. In one non-limiting example, a mold that allows pouring of uncured MRE into the space it is to be emplaced in the apparatus, and contain it is the correct form factor, and then allow curing according to appropriate process parameters can be used. The mold can also, if needed, hold any components in position during molding. One example in the embodiments herein is to hold inner tube 60 in axial position during curing of the MRE around it.

Adhesion of MRE to desired surfaces can be promoted. One option is etching of such surfaces prior to molding the MRE in place. Physical and chemical etching are possibilities dependent on the material to be etched.

FIG. 28 illustrates diagrammatically that in embodiments with an inner component in the MRE, various loads or parts to be vibrationally damped or isolated are, of course possible. In the case of inner tube 60, a variety of parts 90 as well as ways to attach tube 60 to part(s) 90 are possible.

What is claimed is:

1. An apparatus to provide adjustable stiffness comprising:
  a. a coil having a core, opposite ends, and a pre-selected number of turns and/or layers along a central magnetic axis;
  b. a magnetorheological elastomer (MRE) with a form factor having at least a portion substantially along and at or near the coil and without appreciable magnetic shielding between the coil and the MRE;
  c. a non-magnetic interlayer radially positioned along the central magnetic axis of the coil between the MRE and the coil, and magnetically permeable flanges spaced apart along the central magnetic axis along the interlayer and at or near opposite ends of the coil, wherein the interlayer and flanges are positioned within a casing and end caps of the casing; and
  d. a control circuit operatively electrically connected to the coil and adapted to control electrical current through the coil to adjust stiffness of the MRE.

2. The apparatus of claim 1 wherein the MRE is within the core of the coil.

3. The apparatus of claim 1 wherein MRE extends along at least a substantial amount of the central magnetic axis of the coil.

4. The apparatus of claim 1 wherein there is no substantial magnetic shielding between the coil and the MRE.

5. The apparatus of claim 1 further comprising an outer magnetically permeable cylindrical case positioned radially outwardly from the MRE and the coil.

6. The apparatus of claim 5, wherein the outer cylinder has an interior annular surface that is etched or abraded to promote adhesion of the MRE to the interior annular surface.

7. The apparatus of claim 1 further comprising an inner magnetically permeable cylindrical member positioned radially inwardly of the coil and either through or along the MRE and generally co-axial or parallel to the central magnetic axis.

8. The apparatus of claim 7 further comprising an exterior annular surface of the inner magnetically permeable cylindrical member that is etched or abraded to promote adhesion of the MRE to the interior annular surface.

9. The apparatus of claim 1 further comprising magnetically permeable end caps at or near the opposite ends of the coil.

10. The apparatus of claim 1 adapted for operative installation as a vibration isolator or damper.

11. The apparatus of claim 1 adapted for operative installation as a bushing.

12. The apparatus of claim 1 further comprising a sensor operatively connected to the control circuit to generate a feed-back or feed-forward signal related to a force indicative of a need for adjustment of current through the coil for semi-active or active motion control or vibration damping of external stimuli or a mechanical load.

13. The apparatus of claim 1 wherein the coil has a plurality of layers of turns.

14. A semi-active or active damping or vibration isolation apparatus comprising:
 a. an MRE material having a length and width;
 b. a coil having a magnetic axis and positioned radially outward from of and surrounding the MRE material along the magnetic axis; and
 c. a non-magnetic interlayer between the MRE material and the coil;
 d. wherein the coil and non-magnetic interlayer comprise a coil bobbin with the coil wound around the non-magnetic interlayer and magnetically permeable flanges mounted at opposite ends of the non-magnetic interlayer.

15. The apparatus of claim 14 further comprising:
 a. an outer magnetically permeable cylindrical case positioned radially outwardly from the MRE and the coil, and
 b. the non-magnetic layer comprises an inner magnetically permeable cylindrical member positioned radially inwardly of the coil and either through or along the MRE and generally co-axial or parallel to the central magnetic axis.

16. The apparatus of claim 15 further comprising magnetically permeable end caps of the outer case at or near the opposite ends of the coil.

17. A method of damping or vibration isolation comprising:
 a. placing an MRE material in a damping or vibration isolation position;
 b. controlling stiffness of the MRE material by a magnetic field generated by a coil radially positioned relative to the MRE with a non-magnetic radial interlayer between the coil and the MRE material wherein the coil and non-magnetic radial interlayer comprise a coil bobbin with the coil wound around the non-magnetic interlayer and magnetically permeable flanges mounted at opposite ends of the non-magnetic interlayer.

18. The method of claim 17 further comprising influencing the containment of the magnetic field to the MRE material.

19. The method of claim 18 wherein influencing the containment of the magnetic field comprises one or more of:
 a. placing magnetically-permeable members at or near opposite ends of the coil;
 b. placing a magnetically-permeable outer casing radially outward of the coil; and
 c. placing a magnetically-permeable inner member radially inward from the MRE.

20. An active or semi-active bushing comprising:
 a. a magnetically-permeable inner cylinder having an exterior surface along an axis and adapted to interface with at least one part requiring vibrational damping;
 b. wherein the coil and non-magnetic interlayer comprise a coil bobbin with the coil wound around the non-magnetic interlayer and magnetically permeable flanges mounted at opposite ends of the non-magnetic interlayer, the coil bobbin comprising:
  i. a hollow non-magnetic cylinder spaced radially outwardly from the inner cylinder along the axis to create an annular space therebetween, and having internal and external surfaces along the axis;
  ii. magnetic end flanges at opposite ends of the non-magnetic cylinder;
  iii. a coil wound radially around the external surface of the non-magnetic cylinder;
 c. an MRE material at least substantially filling the annular space between the exterior surface of the inner cylinder and the interior surface of the non-magnetic cylinder;
 d. an outer casing comprising:
  i. a hollow magnetically-permeable outer cylinder positioned radially around the bobbin along the axis; and
  ii. magnetically-permeable end caps at opposite ends of the outer cylinder along the axis; and
 e. a control circuit operatively connected to the coil adapted to control current to the coil based on external stimulus.

* * * * *